(12) United States Patent
Fujimoto et al.

(10) Patent No.: US 8,069,493 B2
(45) Date of Patent: Nov. 29, 2011

(54) ATOMIC FORCE MICROSCOPE APPARATUS

(75) Inventors: Hiroshi Fujimoto, Yokohama (JP);
Takashi Ooshima, Yokohama (JP)

(73) Assignee: Yokohama National University,
Yokohama-shi (JP)

( * ) Notice: Subject to any disclaimer, the term of this patent is extended or adjusted under 35 U.S.C. 154(b) by 138 days.

(21) Appl. No.: 12/529,903

(22) PCT Filed: Mar. 4, 2008

(86) PCT No.: PCT/JP2008/053869
§ 371 (c)(1),
(2), (4) Date: Sep. 3, 2009

(87) PCT Pub. No.: WO2008/111433
PCT Pub. Date: Sep. 18, 2008

(65) Prior Publication Data
US 2010/0115674 A1    May 6, 2010

(30) Foreign Application Priority Data

Mar. 5, 2007   (JP) ................................ 2007-054615
Sep. 13, 2007  (JP) ................................ 2007-238220

(51) Int. Cl.
*G01Q 60/24* (2010.01)

(52) U.S. Cl. ......... 850/33; 850/1; 850/6; 850/8; 850/11; 850/37

(58) Field of Classification Search .................. 850/1–6, 850/8, 10, 11, 33, 37, 38
See application file for complete search history.

(56) References Cited

U.S. PATENT DOCUMENTS

| | | | | | |
|---|---|---|---|---|---|
| 4,992,711 | A | * | 2/1991 | Sugita et al. | 318/561 |
| 5,051,646 | A | * | 9/1991 | Elings et al. | 310/317 |
| 5,180,956 | A | * | 1/1993 | Oaki et al. | 318/568.11 |
| 5,400,647 | A | * | 3/1995 | Elings | 73/105 |
| 5,729,015 | A | * | 3/1998 | Tong | 850/1 |
| 5,955,660 | A | * | 9/1999 | Honma | 73/105 |

(Continued)

FOREIGN PATENT DOCUMENTS

JP         8-262037 A      10/1996

(Continued)

OTHER PUBLICATIONS

Kengo Aoki et al. "Nano Scale Servo Control of Atomic Force Microscope Based on Surface Topography Observer", Institute of Electrical Engineers of Japan, IIC-06-132, (2006), p. 1-6.

(Continued)

*Primary Examiner* — Michael Maskell
(74) *Attorney, Agent, or Firm* — Venable LLP; Michael A. Sartori

(57) ABSTRACT

An object of the present invention is to provide an atomic force microscope apparatus allowing tracking errors to be made as close to zero as possible to reduce images obtained through high-speed scanning from being degraded. To accomplish the object of the present invention, the present invention provides an atomic force microscope apparatus imaging a surface topography of a sample in a contact mode, the apparatus including a cantilever having a probe interacting with the sample surface via an atomic force and being subjected to a deflection by the atomic force, laser light provision means for allowing first laser light to enter the cantilever, light detection means, a controller estimating the surface topography of the sample surface, and data storage means for recording the estimated surface topography.

4 Claims, 109 Drawing Sheets

U.S. PATENT DOCUMENTS 6,427,345 B1 *  8/2002  Alvis ............................... 33/121

FOREIGN PATENT DOCUMENTS

| JP | 8-292196 A | 11/1996 |
| JP | 08292196 A * | 11/1996 |

OTHER PUBLICATIONS

"Introduction to Nano-Probe Technique", (2001), Kogyo Chosakai Publishing, Inc.
"Scanning Probe Microscope", MARUZEN Co., Ltd.
H. Kogo et al. "Introduction to System Control Theories", (1979), Jikkyo Shuppan Co., Ltd.
Hiroshi Fujimoto et al. "Perfect Tracking Control Method Based on Multirate Feedforward Control", Society of Information and Control Engineers, (2000) p. 766-772, vol. 36, No. 9.
Hiroshi Fujimoto et al. "RRO Compensation of Hard Disk Drive Based on Switching Control and PTC", IIC-04-69, (2004), p. 13-18, Instute of Electrical Engineers of Japan.
A. Sebastian et al. "Harmonic Analysis Based Modeling of Tapping Mode AFM", Proceedings of the American Control Conference, San Diego, CA (1999) p. 232-236.
"System Identification for Control Based on MATLAB", (1996) p. 1-202, Tokyo Denki University Press.
"Advanced System Identification for Control Based on MATLAB", (2004), p. 1-326, Tokyo Denki University Press.
"High-Speed Video Rate AFM", Instrumentation and Control, Journal of the Society of Instruments and Control Engineers, (2006), vol. 45, No. 2, p. 99-104.
Takashi Oshima et al. "Proposal of Nanoscale Servo System of Atomic Force Microscope Based on Surface Topography Learning with PTC", Institute of Electrical Engineers of Japan, IIC-07-37, (2007), p. 1-7.
G. Schitter et al. "Robust Two-Degree-of-Freedom Control of an Atomic Force Microscope", Asian Journal of Control, (2004), vol. 6, No. 2, p. 156-163.
Abu Sebastian et al. "Robust Control Approach to Atomic Force Microscopy", Proceedings of the $42^{nd}$ IEEE Conference on Decision and Control; Maui, Hawaii USA, (Dec. 2003), p. 3443-3444.
Osamah M. El Rifai et al. "On Automating Atomic Force Microcscopes: An Adaptive Control Approach", $43^{rd}$ IEEE Conference on Decision and Control, (Dec. 14-17, 2004), p. 1574-1579.
Kok Kia Chew et al. "Digital Control of Repetitive Errors in Disk Drive Systems", IEEE Control Systems Magazine, (1990), vol. 10, No. 1, pp. 16-20.
Noriyuki Kodera et al. "Active Damping of the Scanner for High-Speed Atomic Force Microscopy", Review of Scientific Instruments (2005) vol. 76, p. 053708-1-053708-5.
Toshio Ando et al. "A High-Speed Atomic Force Microscope for Studying Biological Macromolecules", PNAS, (Oct. 23, 2001), vol. 98, No. 22, p. 12468-12472.
N. Nilius et al. "Influence of a Heterogeneous $Al_2O_3$ Surface on the Electronic Properties of Single Pd Atoms", Physical Review Letters, (2003), vol. 90, No. 4, p. 046808-1-046808-4.
Takayuki Shiraishi et al. "Proposal of Surface Topography Observer for Tapping Mode AFM", IIC-07-117 (2007), p. 1-6.
Takashi Oshima et al. "Proposal of Surface Topography Learning Observer for Contact Mode AFM", IIC-07-119, (2007) p. 1-6.
Masayoshi Tomizuka "Zero Phase Error Tracking Algorithm for Digital Control", Journal of Dynamic Systems, Measurement, and Control, (Mar. 1987), vol. 109, p. 65-68.
K. J. Åström et al. "Zeros of Sampled Systems", Automatica, (1984), vol. 20, No. 1, p. 31-38.

* cited by examiner

|  | WITHOUT LEARNING CONTROL [nm] | WITH LEARNING CONTROL [nm] |
|---|---|---|
| ±3σ | 5.55 | 2.83 |

FIG.21

|  | WITHOUT LEARNING CONTROL [nm] | WITH LEARNING CONTROL [nm] |
|---|---|---|
| ±3σ | 45.5 | 13.9 |

FIG.24

| (SCANNING SPEED) | CONVENTIONAL METHOD [nm] | IMPROVED STL-PTC [nm] | STLO [nm] |
|---|---|---|---|
| ±3σ(32.2 μm/s) | 29.3 | 13.3 | 9.34 |
| ±3σ(322 μm/s) | 175 | 52.9 | 33.2 |

FIG.57

ATOMIC FORCE MICROSCOPE APPARATUS

TECHNICAL FIELD

The present invention relates to an atomic force microscope apparatus.

BACKGROUND ART

An atomic force microscope (AFM) is an apparatus using a probe to perform scanning along the surface of a sample to measure displacement of a cantilever caused by recesses and protrusions on the surface and forming the measured displacement into an image of the surface, thus measuring the surface of the sample on a nano scale. In general, a force is inevitably exerted between two objects (in this case, a probe tip and a sample) arranged in proximity to each other. Thus, since the AFM measures a variation in force caused by recesses and protrusions on the surface of the sample, as the displacement of the cantilever, the AFM in principle imposes no restrictions on the sample. Consequently, the AFM can observe even the structure of an insulator surface which an STM (scanning tunnel microscope) cannot observe.

The accuracy of observation images obtained with the AFM depends on the performance of a feedback controller. With classical control such as PI control that is a conventional control scheme, the relevant frequency band is limited by the resonance frequency of the mechanism. Thus, various efforts have been made to improve the performance of the feedback controller.

For example, the following have been introduced into the control of the AFM in order to allow the z piezo elements in the AFM to be quickly driven: a counter balance method and an active damping method (Non-Patent Document 17 and Non-Patent Document 18), a method of feedforward-compensating information for every shift mode or line (Non-Patent Document 13), and Q value control for a cantilever. However, most of these methods are based on the classical control such as the PI control and implemented in analog circuits (Non-Patent Document 20). Alternatively, an $H_\infty$ loop shaping method (Non-Patent Document 21), an adaptive control method (Non-Patent Document 15), and the like may be applied. However, the feedback control system may inevitably be restricted by a Bode's integral theorem.

AFM operation schemes include a contact mode, a non-contact mode, and a tapping mode. The contact mode is based on a contact scheme in which a probe is contacted with the sample surface for scanning. The non-contact mode is based on a non-contact scheme in which the probe is not contacted with the sample surface and the surface topography is measured based on a variation in the oscillation frequency of a cantilever. The tapping mode is based on a periodic contact scheme in which the probe is periodically contacted with the sample surface to measure the surface topography based on a variation in the oscillation amplitude of the cantilever (see Non-Patent Documents 2 and 3). An analysis method for the surface topography based on the contact mode generally controls a piezo Z axis so as to maintain the displacement of the cantilever constant and records a manipulating quantity u(t) for the axis as a surface topography. However, in the analysis method, the relevant frequency band may disadvantageously be limited by the resonant frequency of the mechanism as described above.

Thus, Non-Patent Document 1 proposes a method for estimating the surface of a sample using a disturbance observer (the method is simply referred to as STO). In connection with this control method, Non-Patent Document 1 clarifies that modeling a plant allows the surface topography of an object to be estimated using an estimation mechanism similar to the disturbance observer. Thus, for the STO, the relevant frequency band is not limited by a closed loop. Consequently, the STO is demonstrated to be more advantageous than the conventional method even though the manipulating quantity u(t) does not actually track the surface topography.

In Non-Patent Document 10, hardware is improved to increase the operation speed of the AFM. However, in embodiments according to the present invention described below, control is improved to prevent possible degradation of images obtained with the AFM through high-speed scanning.

[Non-Patent Document 1] "Study of Production and Control of Nano-scale Servo Apparatus for Atomic Force Microscope", Industrial Instrumentation and Control Workshop of the Institute of Electrical Engineers of Japan, IIC-06-132, p. 1-6 (2006)

[Non-Patent Document 2] "Introduction to Nano-Probe Technique", Kogyo Chosakai Publishing, Inc. (2001)

[Non-Patent Document 3] "Scanning Probe Microscope", MARUZEN Co., Ltd.

[Non-Patent Document 4] "Introduction to System Control Theories", Jikkyo Shuppan Co., Ltd.

[Non-Patent Document 5] "Perfect Tracking Control Method Using Multirate Feedforward Control", Collection of Papers for the Society of Instrumentation and Control Engineers, 36, p. 766-772 (2000)

[Non-Patent Document 6] "PRO Compensation of Magnetic Disk Apparatus Based on Switching Control and PTC, Industrial Instrumentation and Control Workshop of the Institute of Electrical Engineers of Japan, IIC-04-69, p. 13-18 (2004)

[Non-Patent Document 7] "Harmonic analysis based modeling of tapping mode AFM", Processings of the American Control Conference, p. 232-236 (1999)

[Non-Patent Document 8] "System Identification for Control Based on MATLAB", Tokyo Denki University Press (1996)

[Non-Patent Document 9] "Advanced System Identification for Control Based on MATLAB", Tokyo Denki University Press (2004)

[Non-Patent Document 10] "High-Speed Video Rate AFM", Instrumentation and Control, Vol. 45, No. 2, p. 99-104 (2006)

[Non-Patent Document 11] "Proposal of Nano-Scale Servo for Atomic Force Microscope Based on Surface Topography Learning with PTC", Industrial Instrumentation and Control Workshop of the Institute of Electrical Engineers of Japan, IIC-07-52, p. 7-12 (2007)

[Non-Patent Document 12] "Study of Production and Control of Nano-scale Servo Apparatus for Atomic Force Microscope", Industrial Instrumentation and Control Workshop of the Institute of Electrical Engineers of Japan, IIC-06-132, p. 1-6 (2006)

[Non-Patent Document 13] "Robust Two-Degree-of-Freedom Control of an Atomic Force Microscope", Asian Journal of Control, Vol. 6, Bo. 2, p. 156-163 (2004)

[Non-Patent Document 14] "Robust Control Approach to Atomic Force Microscopy", Conf. Decision Contr., p. 3443-3444 (2003)

[Non-Patent Document 15] "On Automating Atomic Force Microcscopes: An Adaptive Control Approach", Conf. Decision Contr., p. 1574-1579 (2004)

[Non-Patent Document 16] "Digital control of repetitive errors in disk drive system", IEEE Contr. Syst. Mag., Vol. 10, No. 1, pp. 16-20 (1990)

[Non-Patent Document 17] Rev. Sci. Instrum., 76, 053708 (2005)

[Non-Patent Document 18] Proc. Natl. USA. Sci. USA, 98, 12468 (2001)

[Non-Patent Document 19] Phys. Rev. Lett. 90, 046808 (2003)

[Non-Patent Document 20] "Proposal of Surface Topography Observer for Tapping Mode AFM", IIC-07-119 (2007)

[Non-Patent Document 21] "Robust Control Approach to Atomic Force Microscopy", Conf. Decision Contr., p. 3443-3444 (2003)

[Non-Patent Document 22] "Proposal of Surface Topography Learning Observer for Contact Mode AFM", IIC-07-117, p. 7-12 (2007)

[Non-Patent Document 23] "Zero Phase Error Tracking Algorithm for Digital Control", Trans. ASME, Journal of Dynamic Systems, Measurement, and Control, Vol. 109, p. 65-68 (1987)

[Non-Patent Document 24] "Zeros of sampled system", Automatica, 20, 1, p. 31-38 (1984)

[Non-Patent Document 25] "Perfect Tracking Control Method Based on Multirate Feedforward Control", Trans. SICE, Vol. 36, No. 9, p. 766-772 (2000)

DISCLOSURE OF THE INVENTION

However, the STO disadvantageously precludes accurate measurements when the plant suffers large modeling errors.

To solve the above-described problems, the present invention provides an atomic force microscope apparatus imaging a surface topography of a sample in a contact mode, the apparatus comprising a cantilever having a probe interacting with the sample surface via an atomic force and being subjected to a deflection by the atomic force, laser light provision means for allowing first laser light to enter the cantilever, light detection means for detecting second laser light corresponding to the first laser light reflected by the cantilever, a piezo element on which the sample is placed, a controller inputting an input voltage to the piezo element to control the distance between the sample surface and the probe, detecting the deflection of the cantilever as an output voltage based on a relative change in intensity of the second laser light, then during a forward scan, measuring and storing the surface topography, and during a backward scan of the same line as that for the forward scan, using the stored surface topography for control to estimate the surface topography of the sample surface based on the output voltage, and data storage means for recording the estimated surface topography.

The present invention can make tracking errors as close to zero as possible to reduce images obtained through high-speed scanning from being degraded.

BRIEF DESCRIPTION OF THE DRAWINGS

FIG. 21 is a diagram showing a standard deviation in error signal;

FIG. 24 is a diagram showing a standard deviation in error signal;

FIG. 57 is a diagram showing standard deviations;

BEST MODE FOR CARRYING OUT THE INVENTION

First Embodiment

Figure 1:
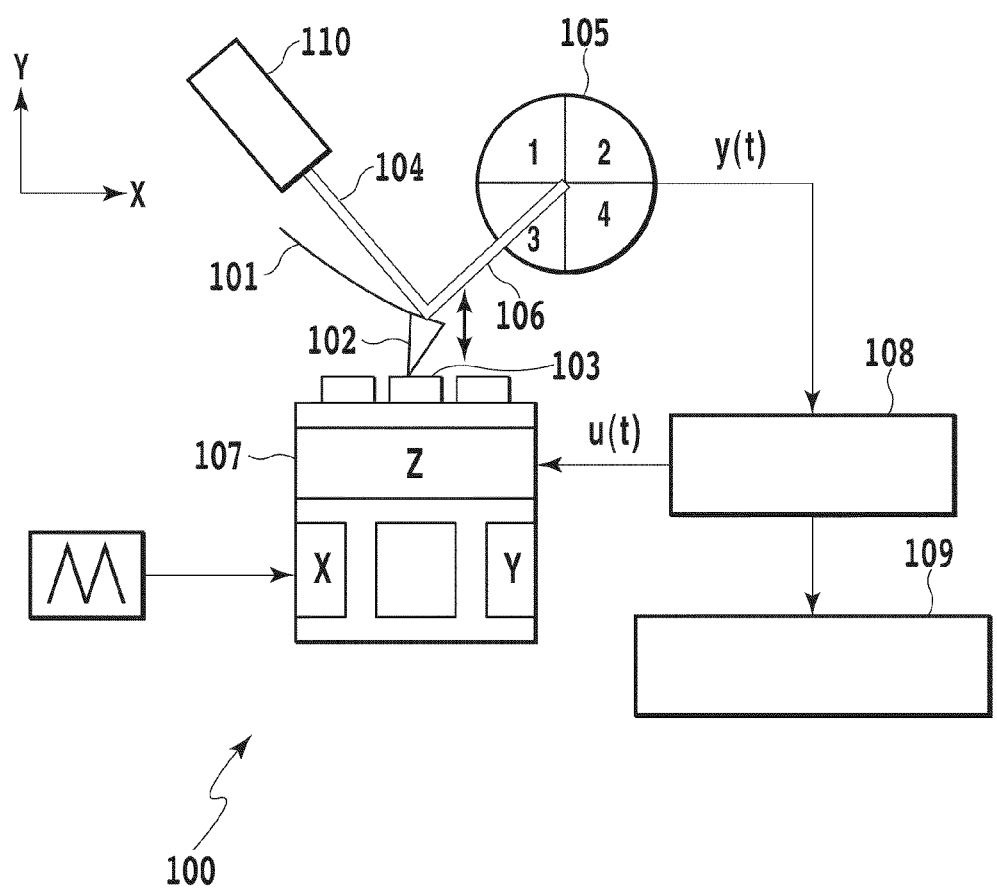
FIG. 1 is a diagram schematically showing an atomic force microscope (AFM) according to the present invention.

FIG. 1 is a schematic diagram showing an AFM 100 according to the present invention by way of example. In FIG. 1, in the AFM 100, a probe 102 attached to a cantilever 101 performs scanning along a sample surface 103 to measure deflection of the cantilever 101 caused by an atomic force exerted between the sample surface 103 and the probe 102 as well as distortion of the cantilever 101 caused by a friction force exerted between the sample surface 103 and the probe 102. The structure of the sample surface 103 is measured on a nano-scale.

In the AFM 100 shown in FIG. 1, laser light provision means 110 allows laser light 104 to obliquely enter the rear surface of the cantilever 101. Then, a change in the reflection angle of the laser light 104 caused by displacement of cantilever 101 resulting from deflection and distortion thereof is detected based on a relative change in the intensity of laser light 106 entering a four-piece photodiode 105. Finally, the AFM 100 can detect the deflection and distortion of the cantilever 101 based on a change in the intensity of the laser light 106 to measure the structure of the sample surface 103.

The aspect shown herein is only an example. The apparatus detecting a relative change in the intensity of the laser light 106 is not limited to the four-piece photodiode but may be light detection means capable of detecting a relative change in the intensity of the laser beam. Alternatively, for example, a visible-light semiconductor laser may be used as the laser light provision means 110.

In the AFM 100 shown in FIG. 1, a controller 108 controls a piezo 107 so as to maintain the displacement of the cantilever 101 constant. An output from the controller 108 is converted, and the converted output is recorded in the data storage means 109 as the surface topography of the sample surface 103.

(1: Light Detection Scheme for the AFM)

Schemes of measuring the "displacement of the cantilever" caused by surface recesses and protrusions include a scheme of measuring the interference of the laser light (light interference scheme) and a light leverage scheme of measuring a change in the reflection angle of the laser light caused by the displacement of the cantilever. The present embodiment uses the light leverage scheme, which is more common.

The light leverage scheme measures a relative change in the intensity of light entering diodes 1 to 4. The light leverage scheme is based on the deflection of the tip of the leverage (the tip of the cantilever) in a Y direction and the twist of the tip of the leverage in an X direction. For the deflection, a relative change (1+2)−(3+4) is detected. For the twist, a relative change (1+4)−(2+3) is detected. In particular, for the twist, the friction force is measured. In this case, the microscope is called an FEM (Friction Force Microscope) instead of the AFM. The AFM according to the present embodiment measures only the deflection and thus corresponds to the former AFM detection method.

(2: Modeling in the Contact Mode)

Figure 2:
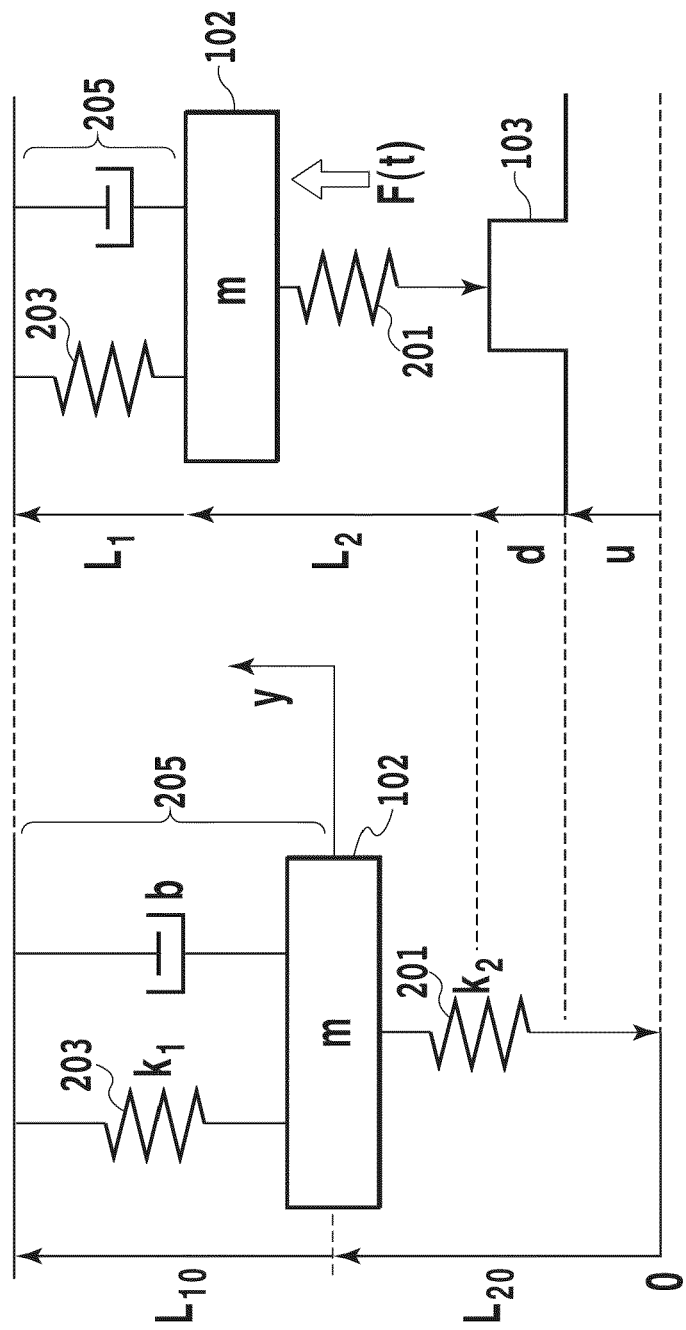
FIG. 2 is a diagram showing an interactive force exerted between the tip of a cantilever and a sample surface based on a contact mode.

If a disturbance observer is used for the AFM or in order to design the controller, a controlled object needs to be modeled. Thus, a model of the AFM is based on the cantilever and the interaction between the probe and the sample. Such a model as shown in FIG. 2 is adopted (see Non-Patent Documents 1 and 7). As a measurement mode, the contact mode is used for measurement in order to simplify the modeling.

The moment when a spring comes into contact with the sample, the spring has a natural length. Thus, the spring coefficient of a spring 203 is defined as $k_1$, and the natural length of the spring 203 is defined as $L_{10}$. The spring coefficient of a spring 201 is defined as $k_2$, and the natural length of the spring 201 is defined as $L_{20}$. Furthermore, reference character (b) denotes the damper coefficient of a friction force generation source 205. The current lengths of the springs 203 and 201 are defined as $L_1$ and $L_2$, respectively. Reference character (u) denotes a manipulating quantity for the piezo. Reference character (d) denotes the recesses and protrusions of the sample. In this case, the interaction between the sample and the cantilever is expressed as shown in FIG. 2. F(t) denotes a force that the cantilever receives from the spring 201, that is, an atomic force from the sample.

Based on the model shown in FIG. 2, a motion equation for a cantilever with a mass (m) is expressed as:

[Expression 1]

$$y = \frac{k_2 \times g(u+d)}{ms^2 + bs + (k_1 + k_2)} \quad (1)$$

Non-Patent Document 1 indicates that based on the model, the recesses and protrusions of the sample can be modeled as an input disturbance. In actual experiments, the displacement (y) of the cantilever is measured using the photodiode and laser light. Thus, the displacement (y) is determined by multiplying a transfer function for a plant by a given gain (g). The relationship between the gain (g) and the output will be described in the next chapter. The details of a method for deriving Formula (1) are described in, for example, Non-Patent Document 1.

(3: System Identification)

(3-1: Construction of the AFM)

The AFM according to the present invention may be constructed by connecting an interface for required input signals to a JSPM-5200 manufactured by JEOL Ltd. and using a controller board such as a Dspace 1104 to improve an algorithm and hardware for a control system. The details of the algorithm for the control system are described in, for example, Non-Patent Documents 8 and 9.

Figure 3:
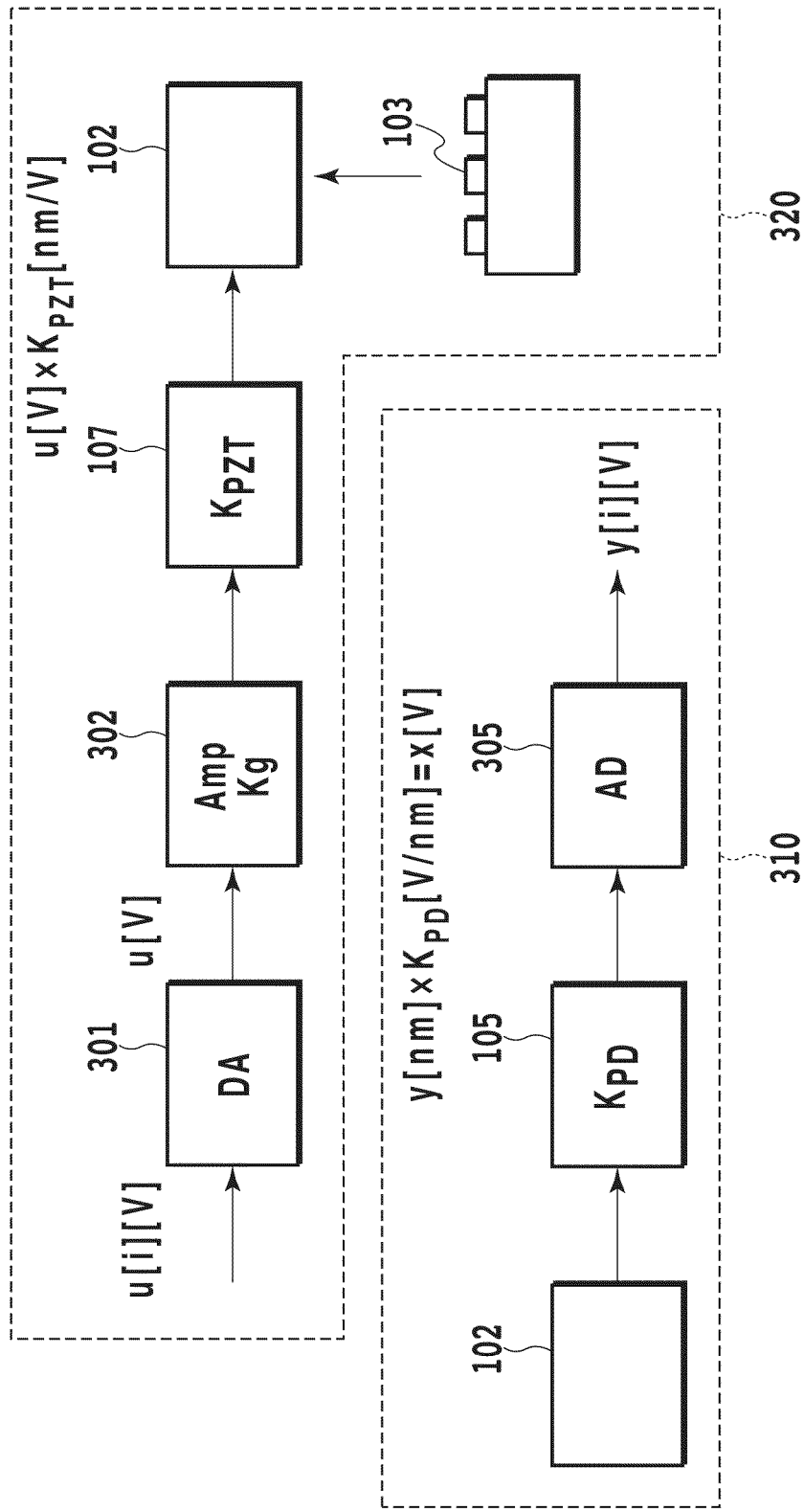
FIG. 3 is a block diagram showing the flow of a signal in the AFM according to the present invention.

FIG. 3 is a block diagram showing the flow of signals in the AFM according to the present invention. In FIG. 3, when the sample is scanned, the displacement of the cantilever 101 is output by the PD (PhotoDiode) 105. This signal is converted by an AD 305, and the resulting signal is input to a DSP (Digital Signal Processor) as y[i]. Furthermore, in the DSP, a DA 301 converts a manipulating quantity u[i], and an amplifier 302 amplifies the converted manipulating quantity u[i]. The amplified signal is applied to the PZT (piezo) 107 as a driving voltage. A gain obtained by the amplifier is $K_g=20$. A driving voltage for the PZT is $K_{PZT}=15.59$ [nm/V]. Furthermore, the gain of AD/DA in the DSP is adjusted to 1.

An output x [V] from the PD is output as a voltage indicating the displacement of the cantilever and varying depending on a force curve. Thus, to convert the displacement x [V] of the cantilever into y [nm], a relational expression for the driving voltage for the PZT and the output from the PD is determined based on the force curve. As a result, $K_{PD}=3.61 \times 10^{-2}$ [V/nm].

The $K_{PD}$ is determined from the first-order approximation of measurement data of the force curve obtained by the JSPM-5200. The force curve is described in, for example, Non-Patent Document 1.

(3-2 Identification Experiments)

In system identification experiments, a model is estimated using a least squares method based on experimentally obtained I/O data. For identification conditions, an M-sequence signal is used as an identification input (pseudo disturbance). An ARX model is used to estimate a model (see Non-Patent Document 8). With the least squares method, transfer functions at discrete times are each expressed by a second-order denominator and a first-order numerator. A zeroth-order hold is used to convert the transfer functions into a continuous time. A transfer function from formula (1) can be expressed as formula (2). It should be noted that the M-sequence signal cannot be provided directly to the cantilever, so that in FIG. 3, the M-sequence signal is input to the PZT via the DA 301, with estimation performed based on an output from the AD 305.

[Expression 2]

$$P(s) = \frac{10.034 \times 10^9}{s^2 + 8219s + 1.274 \times 10^9} \quad (2)$$

Figure 8:
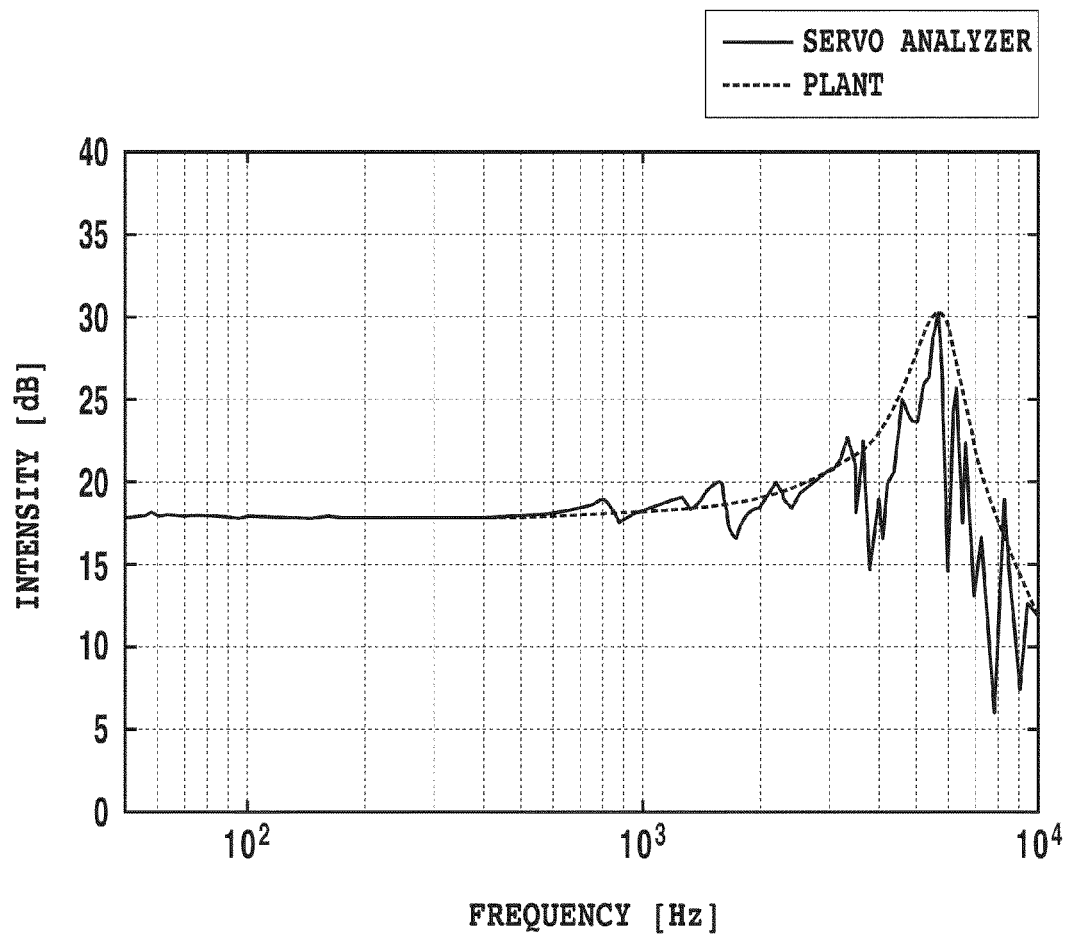
FIG. 8 is a Bode diagram.

FIG. 8 is a Bode diagram in which the frequency characteristics of a plant in the above-described model based on formula (2) are compared with those identified by a servo analyzer. The identified plant exhibits a significant resonance at 5,610 [Hz] and has a high gain even in a low frequency region.

Figure 9:
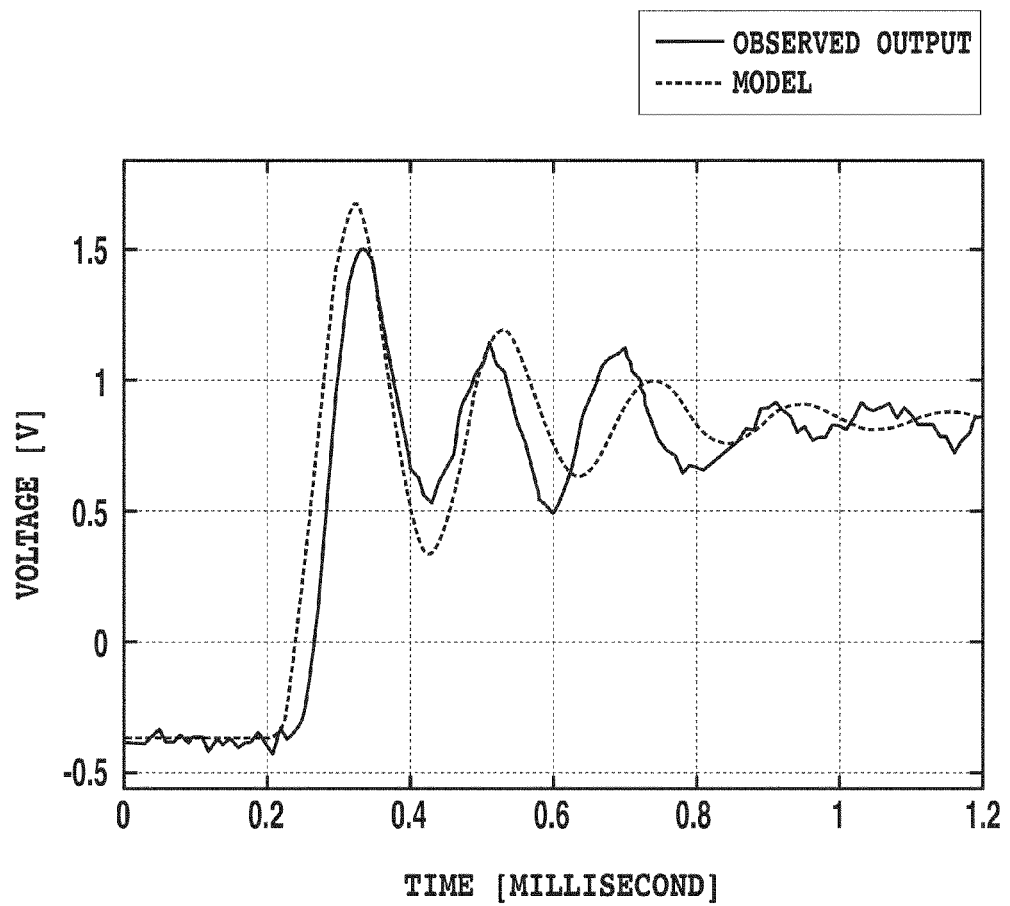
FIG. 9 is a diagram showing a temporal variation in output voltage.

Furthermore, FIG. 9 shows a comparison of a temporal variation in voltage observed with the AFM according to the present invention, with a temporal variation in voltage provided by the above-described model. FIG. 9 shows that model outputs allow measurement outputs (actual outputs) to be reproduced to some degree.

(4: Design of the Controller)
(4-1: Design of the Controller Using the Conventional Method)

A controller used for comparison with the proposed method is provided in an actual product. The controller is defined as a conventional method. An expression for the controller is given as follows.

[Expression 3]

$$C(s) = \frac{\omega_c}{s + \omega_c} k_p \quad (3)$$

Figure 10:
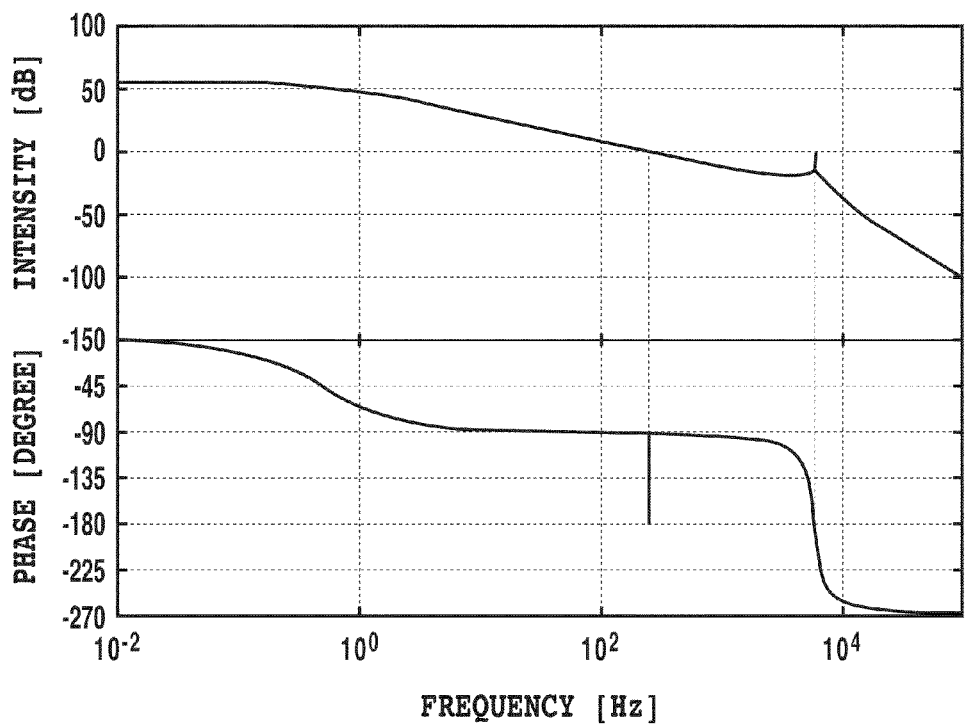
FIG. 10 is a diagram showing a loop transfer function.

Tuning was performed until the experimental apparatus started to oscillate as described in the manual. The controller was thus designed with a proportional gain $k_p$ set to 64 and (O set to $2\pi f_c$ ($f_c$=0.5 [Hz]). FIG. 10 shows a loop transfer function for the plant and the controller. FIG. 10 shows that the conventional method has a cutoff frequency of 252 [Hz], indicating that proportional control and a low pass filter can deal with up to this frequency band. Furthermore, a gain margin is 14.3 [dB], and a phase margin is 89.5 [deg].

(4-2: Surface Topography Observer (STO))

Figure 11:
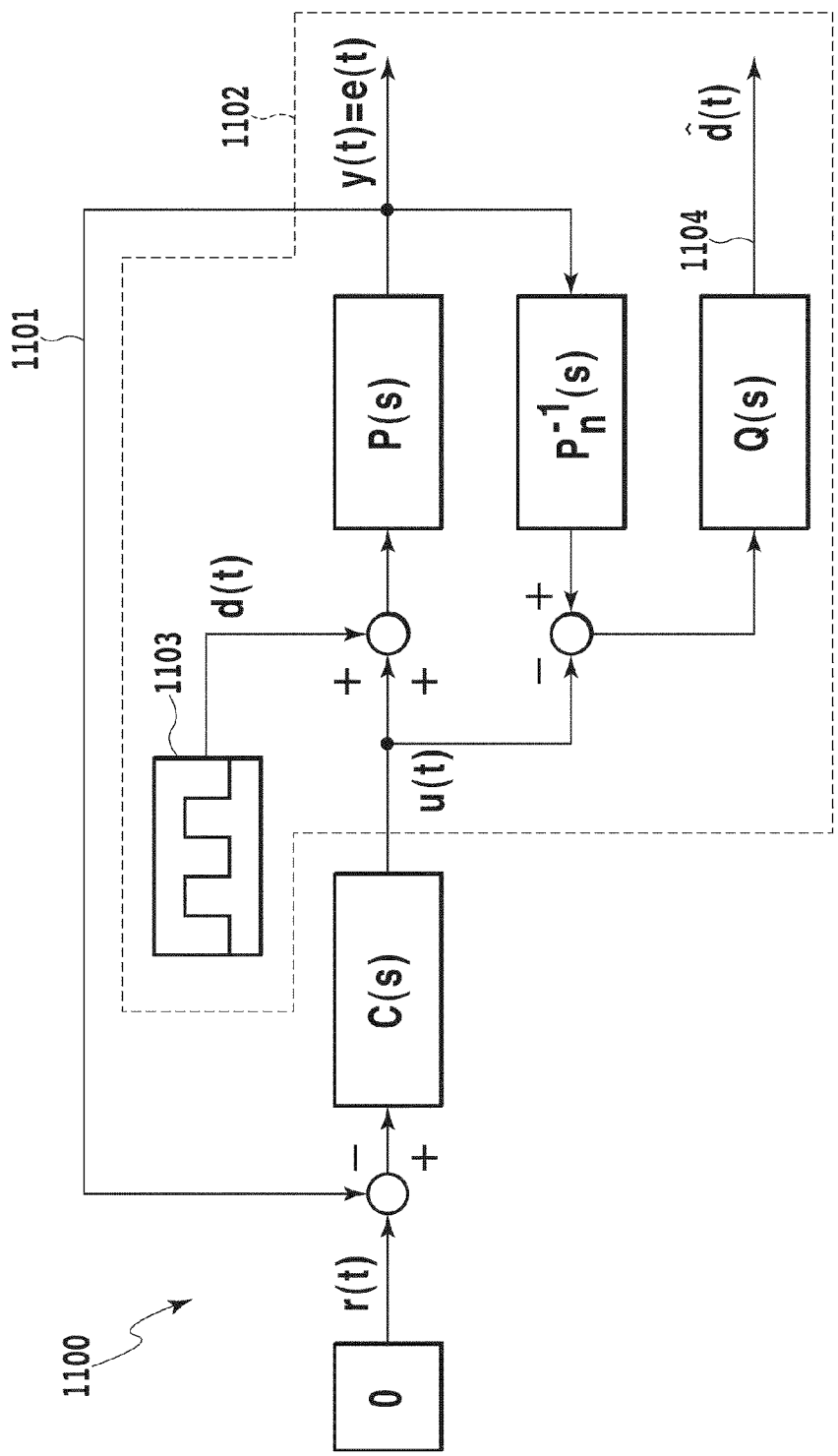
FIG. 11 is a block diagram of a surface topography observer (STO)

Based on the manipulating quantity (u) and the measurement output (y), recesses and protrusions (d) on the sample surface, corresponding to a disturbance, are estimated using an observer. The estimated value:

$$\hat{d} \quad \text{[Expression 4]}$$

is obtained by passing a signal passed through the inverse model of a nominal plant:

$$P_n^{-1}(s) \quad \text{[Expression 5]}$$

and from which the manipulating quantity u(t) is subtracted, through a low pass filter Q(s) for the cutoff frequency $\omega_c$. FIG. 11 is a block diagram of estimation in the STO. In FIG. 11, an estimation block 1102 in an estimation block 1100 is characterized by being implemented as a disturbance observer for an open loop independently of a feedback loop 1101. In FIG. 11, a surface topography 703 is considered to be an input end disturbance d(t) at time (t). The estimated value for the surface topography is obtained from an output 1104.

In Non-Patent Document 1, this special disturbance observer is referred to as a surface topography observer (STO). The STO is composed of an open loop and is thus not limited to the frequency band of a closed loop. The frequency band of Q(s) can be increased up to a Nyquist frequency. Thus, even if u(t) does not actually track recesses and protrusions, that is, even if a tracking error (e) is not zero, provided that the nominal plant has no modeling error, the recesses and protrusions (d) of the sample can be accurately estimated at a frequency equal to or lower than $\omega_c$. Furthermore, a frequency response from the observer is:

[Expression 6]

$$\hat{d}/d = P(s) \times P_n^{-1}(s) \times Q(s) \approx Q(s) \quad (4)$$

Based on a second-order low pass filter, Q(s) can be expressed as:

[Expression 7]

$$Q(s) = \left(\frac{\omega_c}{s + \omega_c}\right)^2 \quad (5)$$

(4-3: Design of the Controller According to the Proposed Method)

The STO described in the preceding chapter is composed of an open loop. Thus, increasing the frequency band of Q(s) above that of a closed loop is considered to be preferable. However, since the observer is an open loop, when the tracking capability of u(t) is significantly degraded, an error in the modeling of the plant increases owing to a Lennard-Jones potential (see Non-Patent Document 1). This significantly degrades robust stability. Thus, adjusting the tracking error (e) to 0 resulting in a modeling error is expected to avoid the disadvantages of the STO. Consequently, the present embodiment applies a PTC method to allow a target trajectory (described below) generated from the learned tracking error (e) to be perfectly tracked. Therefore, the tracking error (e) is reduced in a feedforward manner, thus improving the control performance.

Figure 4:
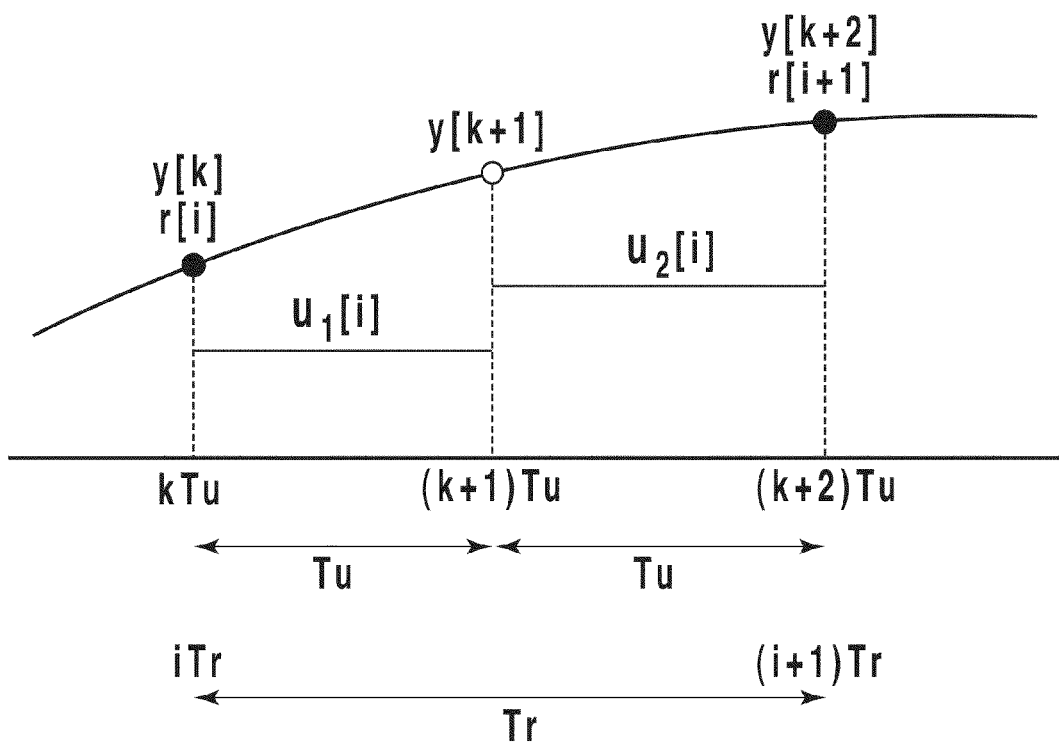
FIG. 4 is a diagram showing multirate control.

As shown in FIG. 4, the PTC method corresponds to a two-degree-of-freedom control system in which a sampling period $T_r$ for the target trajectory is different from a control period $T_u$ for the target trajectory. In the control method, during one sampling period $T_r$ for a command value, a control input is switched (n) times at the intervals of $T_u$. In this case, (n) denotes the order of the plant. Normally, when the reverse system of the plant is constructed at a single rate, the feedforward controller becomes unstable under the effect of unstable zeroes generated when the plant based on a linear continuous-time system is discretized at a short sampling period. Therefore, multirate control allows the feedforward controller to create the stable reverse system of the plant (see Non-Patent Document 5).

(4-3-1: Discretization of the Controlled Object)

It is assumed that a modeled second-order controlled object is discretized. When a state variable is defined as (x), a state equation for the continuous-time system is given as follows:

[Expression 8]

$$\dot{x} = A_c x(t) + b_c u(t) \quad (6)$$

[Expression 9]

$$y(t) = c_c x(t) \quad (7)$$

A state equation that discretizes the controlled object at the shorter sampling period $T_u$ is expressed as:

[Expression 10]

$$x[k+1]=A_s x[k]+b_s u[k] \qquad (8)$$

[Expression 11]

$$y[k]=c_s x[k] \qquad (9)$$

In this case, $x[k]=x(kT_u)$, and

[Expression 12]

$$A_c = e^{A_c T_u}, \; b_c = \int^{T_u} e^{A_c \tau} b_c d\tau \qquad (10)$$

(4-3-2: Surface Topography Learning with PTC)

Now, description will be given of surface topography learning with PTC for an AFM in which a cantilever is reciprocated over a sample to measure the surface topography of the sample; the surface topography learning with PTC involves measuring and storing a tracking error during a forward scan and using the stored tracking error to increase tracking accuracy during a backward scan.

First, when the normal PTC method is used to control the AFM, a set point corresponds to the balanced position of the cantilever and is thus zero. Thus, scanning in the current condition results in only feedback control, corresponding to the conventional control method. According to Non-Patent Document 6, although a repetitive PTC method of reducing a possible periodic disturbance for every sample point is applicable, selecting only samples with periodic surface topographies for measurements by the AFM is impossible.

Thus, focusing on the scan method for the AFM, the surface topography learning with PTC (STL-PTC) learns and controls the surface of the sample during the forward and backward scans. In the present embodiment, a grating element is used to observe the sample. However, it should be noted that any element other than the grating element are applicable.

Figure 12:
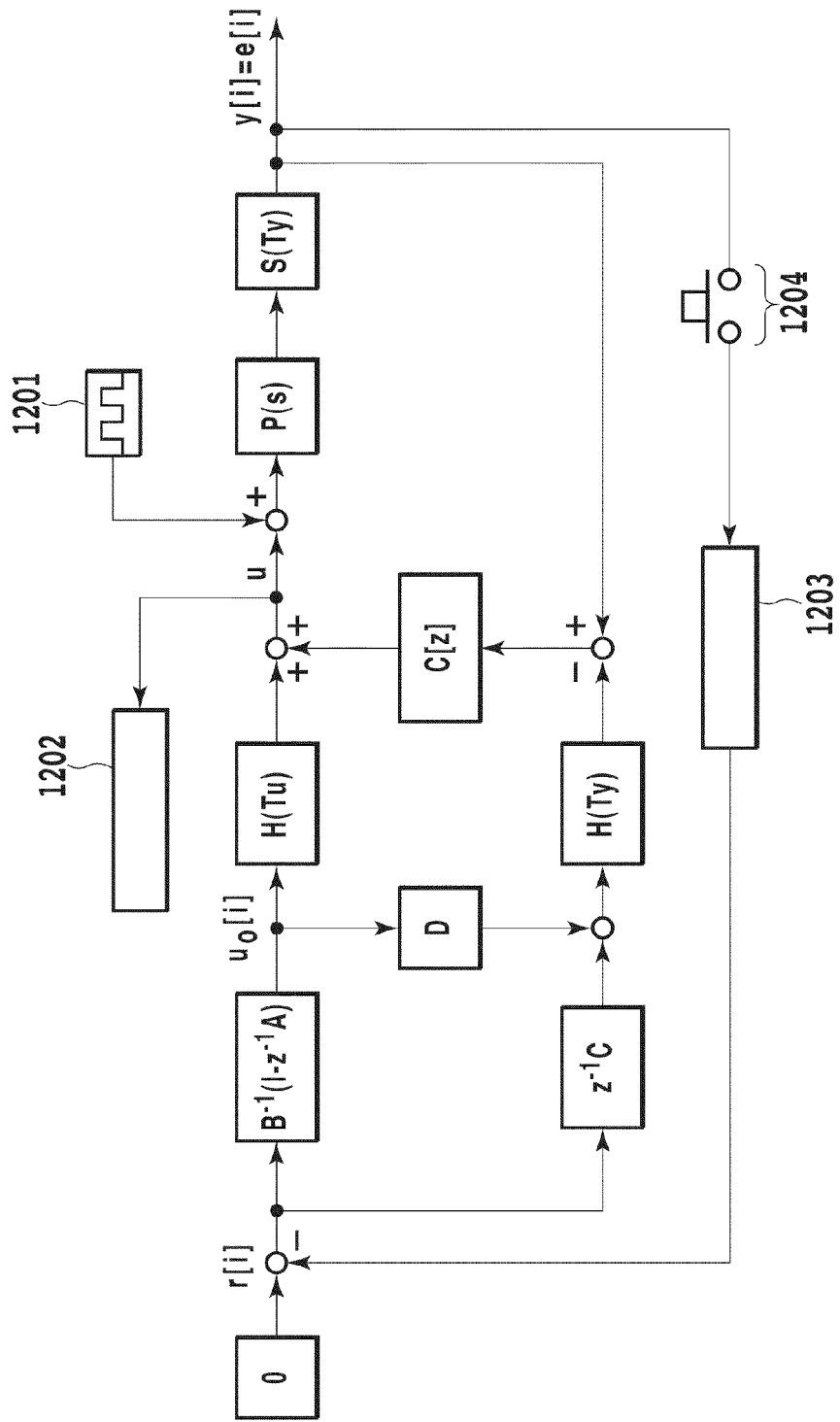
FIG. 12 is a block diagram of surface topography learning with PTC (STL-PTC)

FIG. 12 is a block diagram of STL-PTC. In the estimation blocks of the STL-PTC shown in FIG. 12, a surface topography 1201 is input, and an estimated surface topography is stored in data storage means 1202. Furthermore, reference numeral 1203 denotes a signal generator, and reference numeral 1204 denotes a switch. The manipulating quantity (u) indicates surface topography data. Since the set point is zero, an output (voltage) (y) is an error signal (e). A smaller value of the error signal (e) means a more accurate image resulting from the current manipulating quantity (u). That is, the error signal (e) corresponds to a tracking error used for the surface topography learning with PTC.

Figure 6:
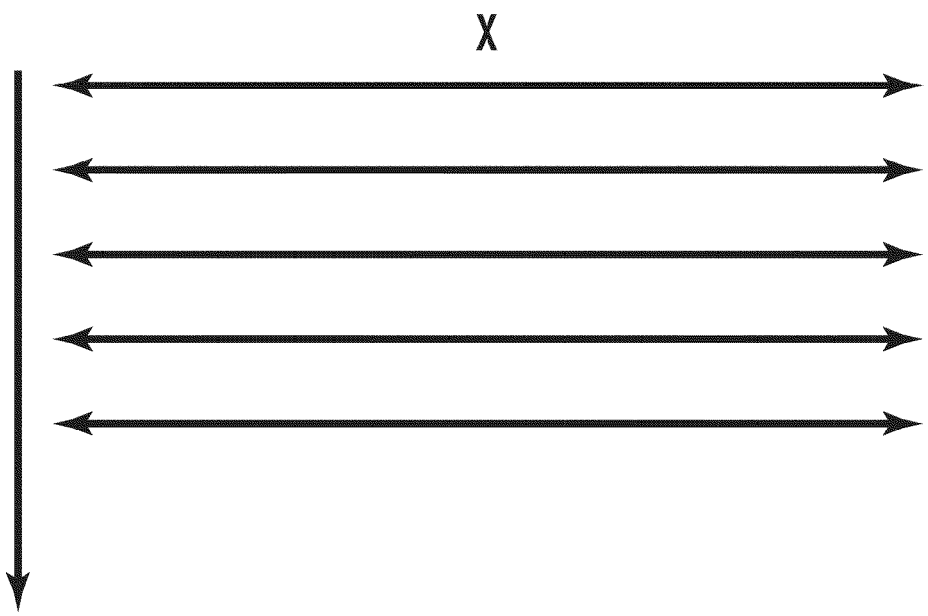
FIG. 6 is a diagram showing a surface scan path.

FIG. 6 shows a surface scan path of the probe of the AFM according to the present invention. As shown in FIG. 6, to measure a sample in an image, a CPU mounted in the AFM according to the present invention reads and executes a program stored in a storage device to perform the STL-PTC. The probe performs a rightward X-direction scan over a scan width from a start position. The probe then performs a leftward X-direction scan along the scan path to return to the scan start position. Then, the probe similarly performs a scan in the Y direction. Thus, a surface scan is achieved.

The rightward scan in the X direction is called a forward scan (FWS). The leftward scan in the X direction is called a backward scan (BWS). The two scans allow the image to be measured. Provided that the probe follows the same path both during the FWS and during the BWS, error signals appearing during the scans are ideally exactly the same.

Thus, in the surface topography learning with PTC, during the FWS, error signals are measured and stored and then learned, and based on the learned error signals, learning control is performed so as to cancel a possible error signal during the BWS. Consequently, error signals (e) (tracking errors) for feedback control can be reduced to improve the tracking capability.

Figure 5:
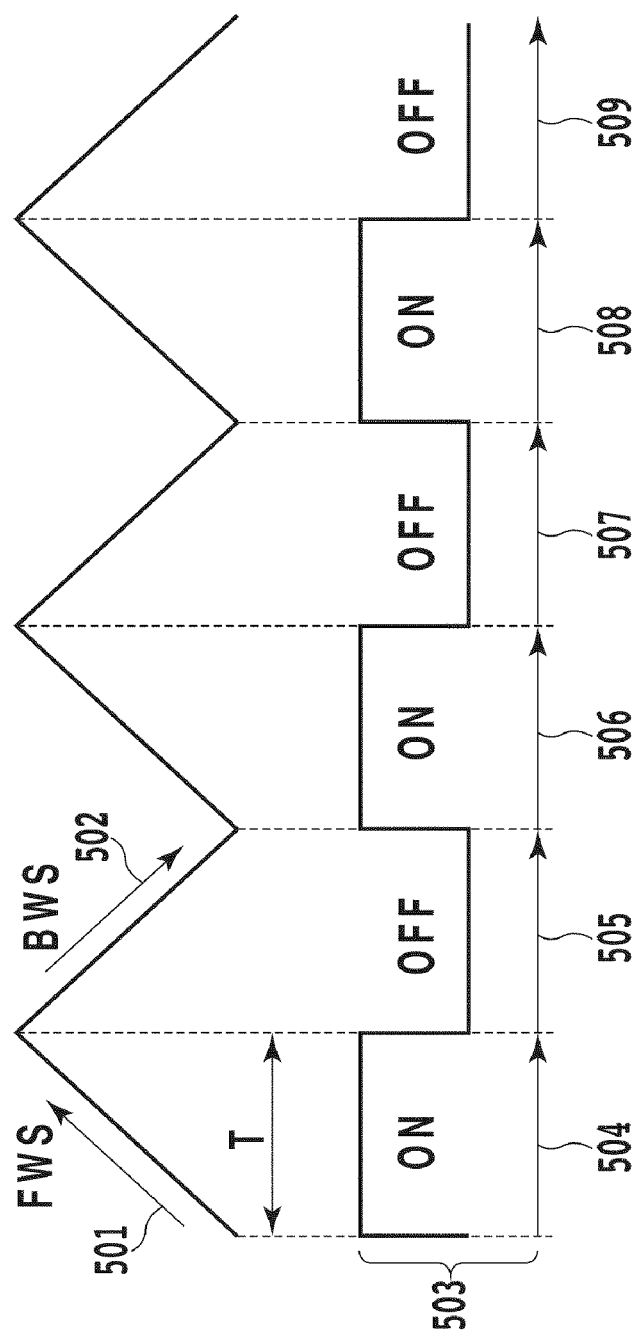
FIG. 5 is a diagram showing the procedure of control.
Figure 13:
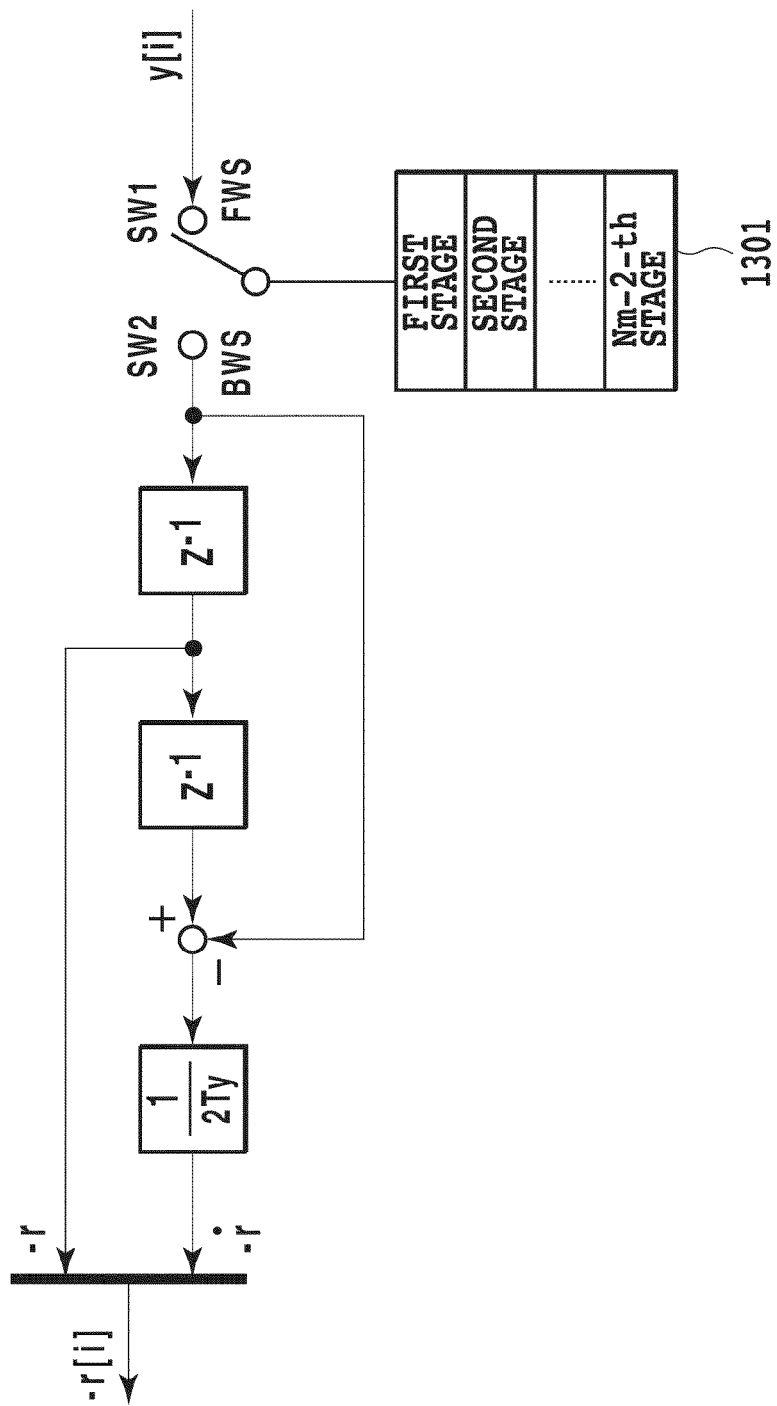
FIG. 13 is a diagram showing a signal generator for error signals.

FIG. 5 shows a procedure of control for the AFM according to the present invention. As shown in FIG. 5, an X scan waveform is triangular. Each image is measured during an FWS 501 and during a BWS 502. During the FWS, a switch 1 (SW1) in FIG. 13 is kept on for T (=the number $N_m$ of stages in the memory×the sampling period $T_y$ of an output signal) seconds (switch-on and switch-off are shown by the height of a graph shown at reference numeral 503). Error signals are stored in a signal generator composed of a stack memory 1301 shown in FIG. 13. During the BWS, a switch 2 (SW2) is turned on to allow the signal generator to generate a target trajectory allowing the error to be adjusted to 0. Then, the PTC adjusts the error to 0. Thus, the $N_m$ memory rows can serve as a feedforward compensator. This enables possible error signals to be reduced for every sample point. However, during the FWS, the signal generator provides no output.

In FIG. 5, reference numerals 504, 506, and 508 denote learning processes. Reference numerals 505, 507, and 509 denote control processes.

Here, since the controlled object is of a second order, when a state variable (x) is:

$$x=[y,\dot{y}] \qquad \text{[Expression 13]}$$

the signal generator can be designed for error signals as shown in FIG. 13 (see Non-Patent Document 6). However, r[i] and $$\dot{r}[i] \qquad \text{[Expression 14]}$$

are as follows:

[Expression 15]

$$r[i] = -\frac{z}{z^{N_m}-1} y[i] \qquad (11)$$

[Expression 16]

$$\dot{r}[i] = \frac{r[i+1]-r[i-1]}{2T_y} \qquad (12)$$

Furthermore, the STO is an open loop, and a modeling error may thus degrade the robustness of the STO. However, the proposed method compensates for the degraded robustness by the feedback control.

(4-3-3: PTC (Perfect Tracking Control) Method)

The PTC method is based on multirate control provided by a feedforward controller and a feedback controller to achieve perfect tracking in contrast to a method based on single-rate control (see Non-Patent Document 5).

Now, the design of the feedforward controller will be described. Since the order (n) of the plant is 2, formulas (8) and (9) are used for the second sample. Furthermore, when time $(t)=iT_r=kT_u$, the following are given.

[Expression 17]

$$x[i+1]=Ax[i]+Bu[i] \qquad (13)$$

$$A=A_s^2 \qquad \text{[Expression 18]}$$

$$B=[A_s b_s, b_s] \qquad \text{[Expression 19]}$$

Based on a discrete-time state equation for the controlled object expressed by formula (13), a stable reverse system is obtained which is expressed by:

[Expression 20]

$$u[i]=B^{-1}(I-z^{-1}A)x[i+1] \quad (14)$$

Provided that the controlled object in formula (8) is controllable, the regularity of a matrix B is ensured. Furthermore, in formula (14), poles are present at the origin of a (z) plane, indicating that the reverse system is stable. Thus, a predicted value r [i]=$x_d$[i+1] for the target trajectory of the controlled object is given as a reference value r[i]. Then, a feedforward control output is given as shown in formula (15). As a result, the nominal plant is perfectly tracked on the sample points. Any variation in disturbance or plant is compensated for by a feedback controller C[z]. Furthermore, a nominal output obtained when the PTC is established is expressed by formula (16).

[Expression 21]

$$u_0[i]=B^{-1}(I-z^{-1}A)x_d[i+1] \quad (15)$$

[Expression 22]

$$y_0[i]=z^{-1}Cx_d[i+1]+Du_0[i] \quad (16)$$

(5: Simulation and Experiments)
(5-1: Simulation of the STO)

FIG. 14 to FIG. 17 show disturbances estimated by the conventional method and the observer, as simulation of a rectangular wave-like sample.

Figure 14:
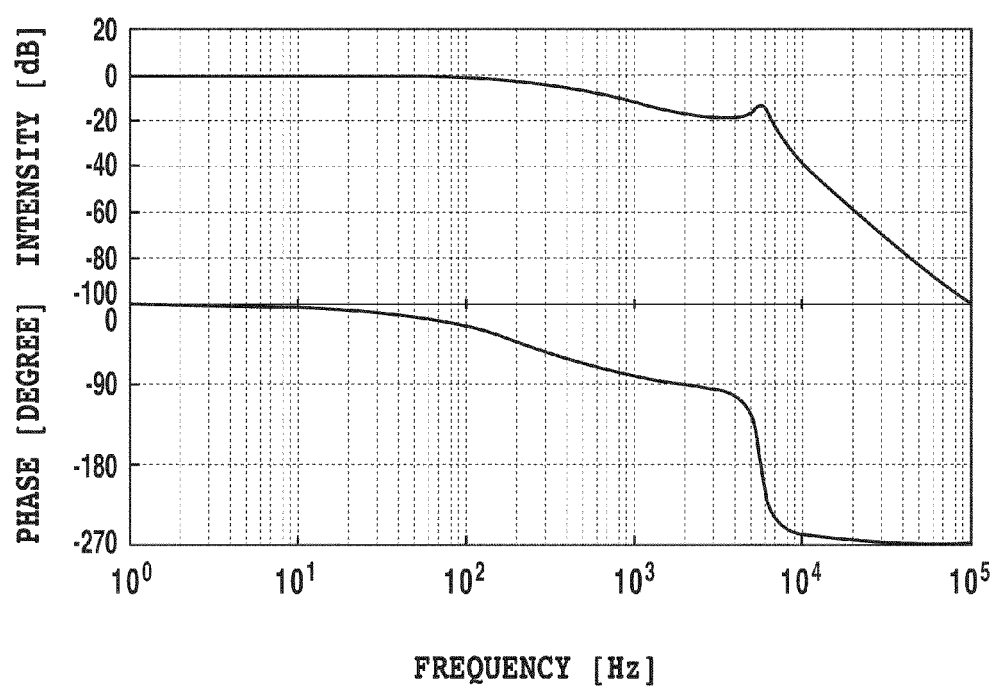
FIG. 14 is a diagram showing a complementary sensitivity function.

FIG. 14 shows a complementary sensitivity function obtained by the conventional method.

Figure 15:
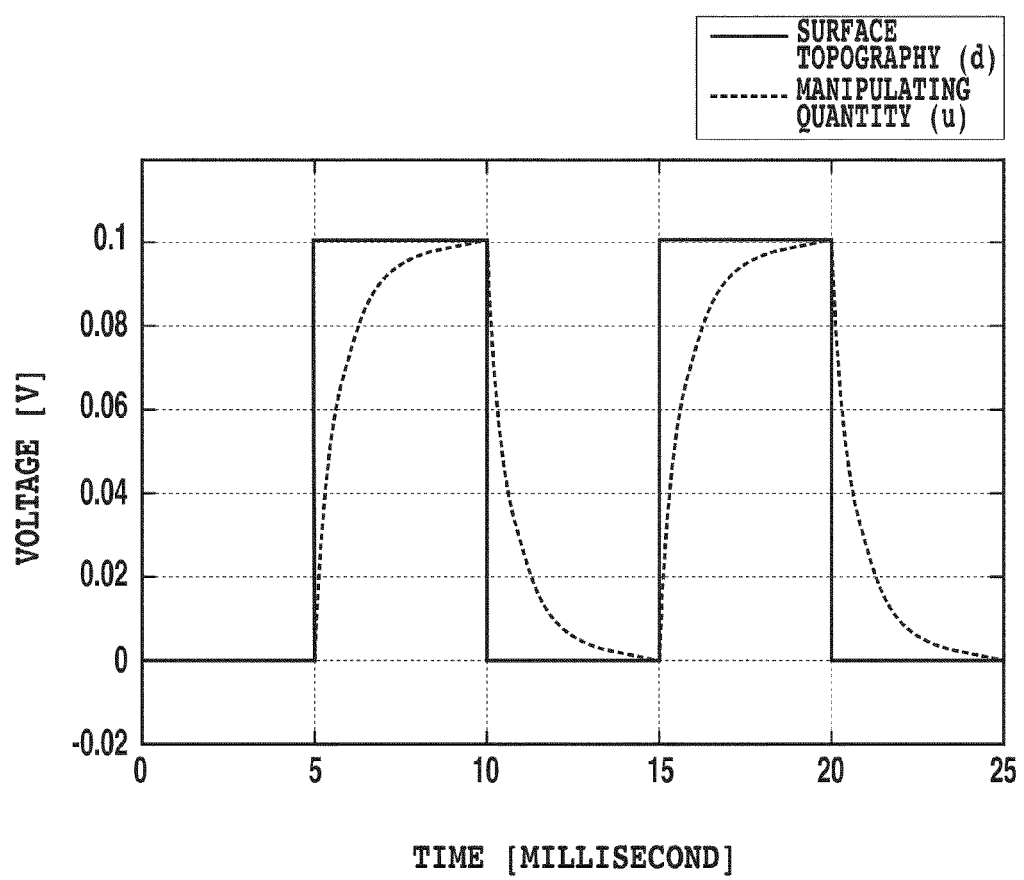
FIG. 15 is a diagram showing the results of simulation of an output voltage obtained when the AFM according to the present invention adopts the conventional method to scan a rectangular wave-like sample surface.

FIG. 15 is a diagram showing the results of simulation of an output voltage obtained when the AFM according to the present invention adopts the conventional method to scan a rectangular wave-like sample surface.

Figure 16:
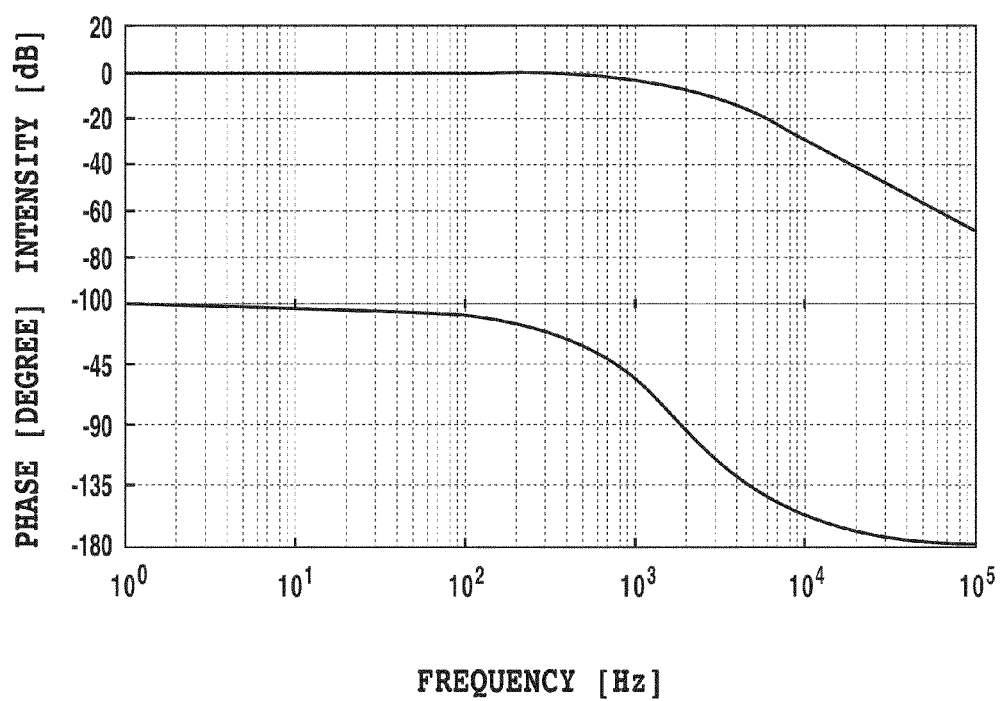
FIG. 16 is a diagram showing a frequency response from Q(s) in the STO.

FIG. 16 is a diagram showing a frequency response from Q(s) in the STO.

Figure 17:
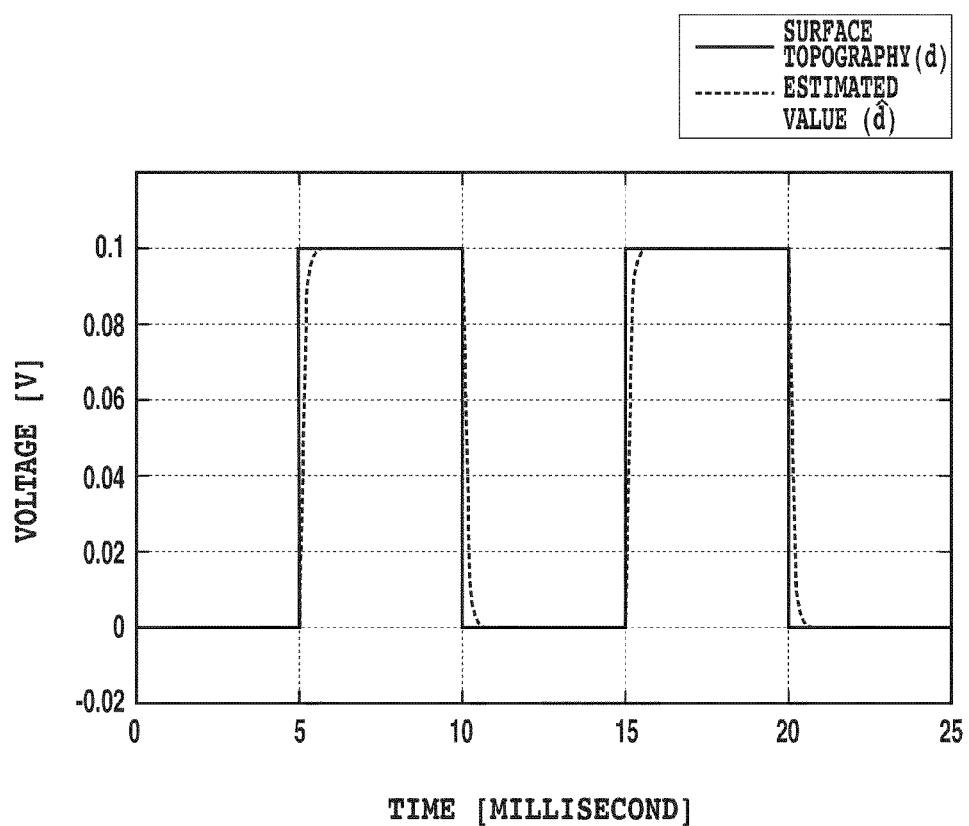
FIG. 17 is a diagram showing the results of simulation of an output voltage obtained when the AFM according to the present invention adopts the STO to scan the rectangular wave-like sample surface.

FIG. 17 is a diagram showing the results of simulation of an output voltage obtained when the AFM according to the present invention adopts the STO to scan the rectangular wave-like sample surface.

FIG. 14 shows that the conventional method limits the poles of the closed loop to the resonant frequency of the plant. However, FIG. 16 shows that the observer of the STO does not depend on the resonant frequency of the plant but depends on the poles of the low pass filter unless the observer is limited by the Nyquist frequency. Thus, compared to the manipulating quantity (u) in FIG. 15, the estimated value:

$$\hat{d} \quad \text{[Expression 23]}$$

in FIG. 17 allows the surface topography (d) of the sample to be accurately reproduced.

Description will be given below of verification performed through experiments using the AFM according to the present invention, to check the behavior of the AFM.

(5-2: Observation of the Grating Element)

Figure 18A:
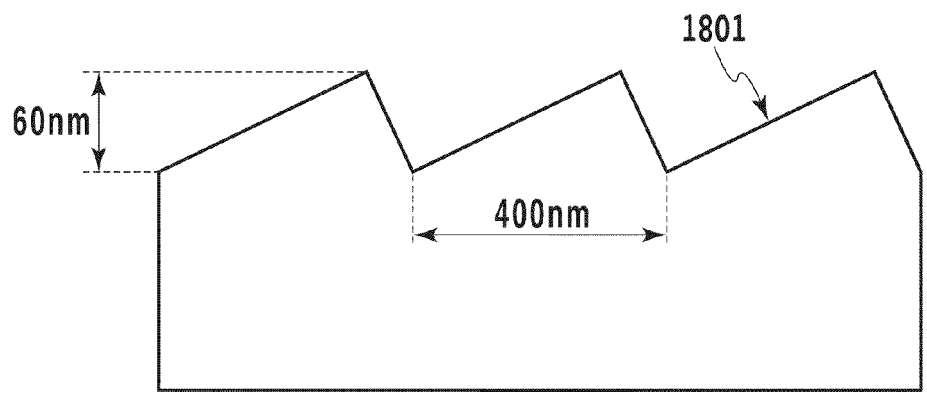
FIG. 18A is a diagram showing the shape of a grating element.
Figure 18B:
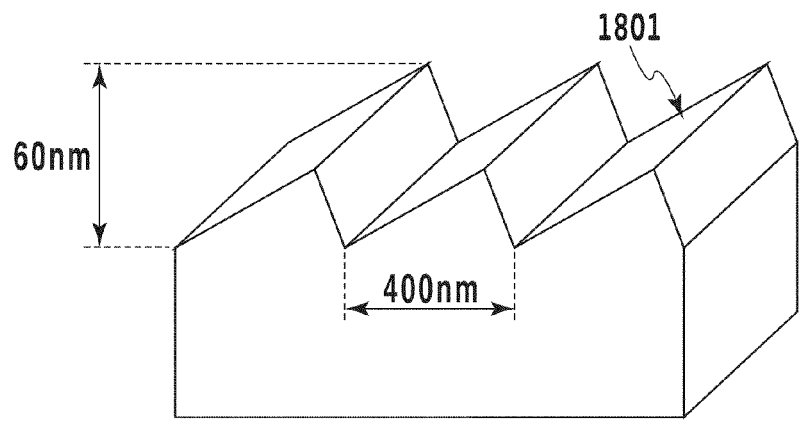
FIG. 18B is a diagram showing the shape of the grating element.
Figure 19:
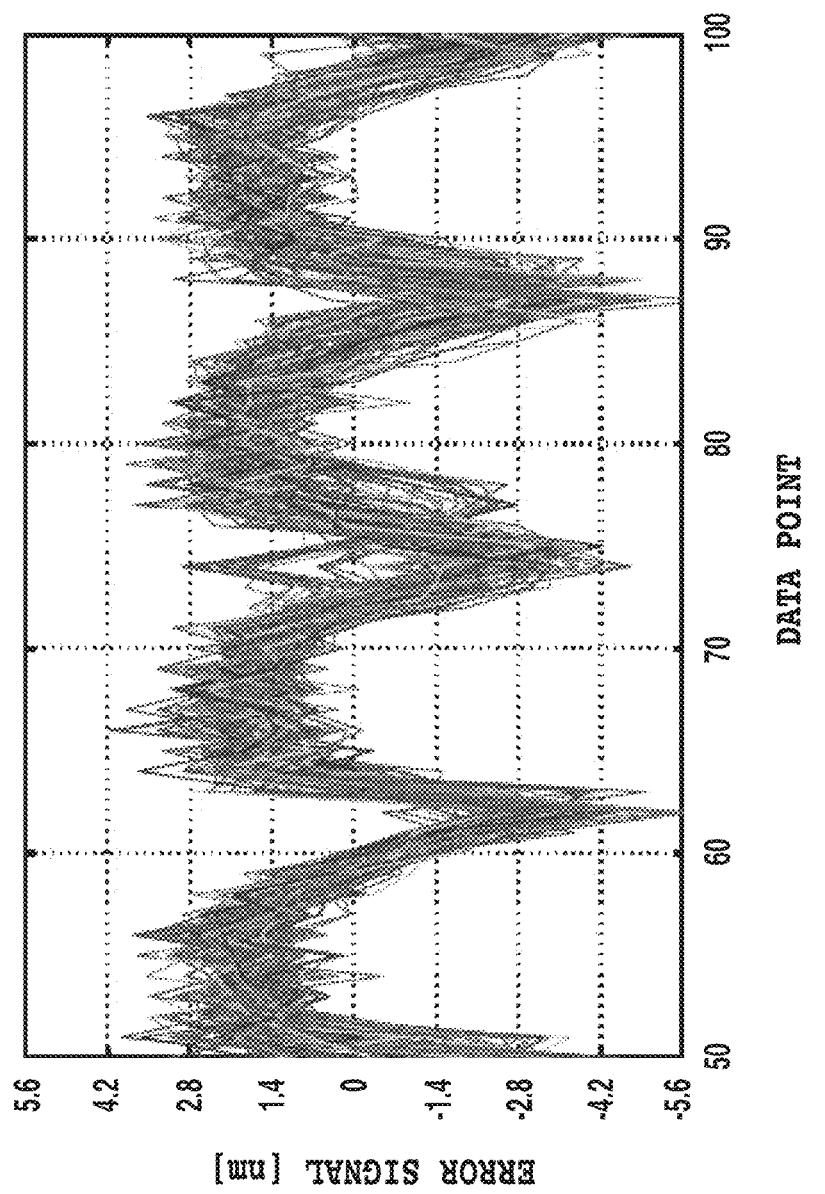
FIG. 19 is a diagram showing superimposed error signals in one image of a sample measured with the AFM according to the present invention.
Figure 20:
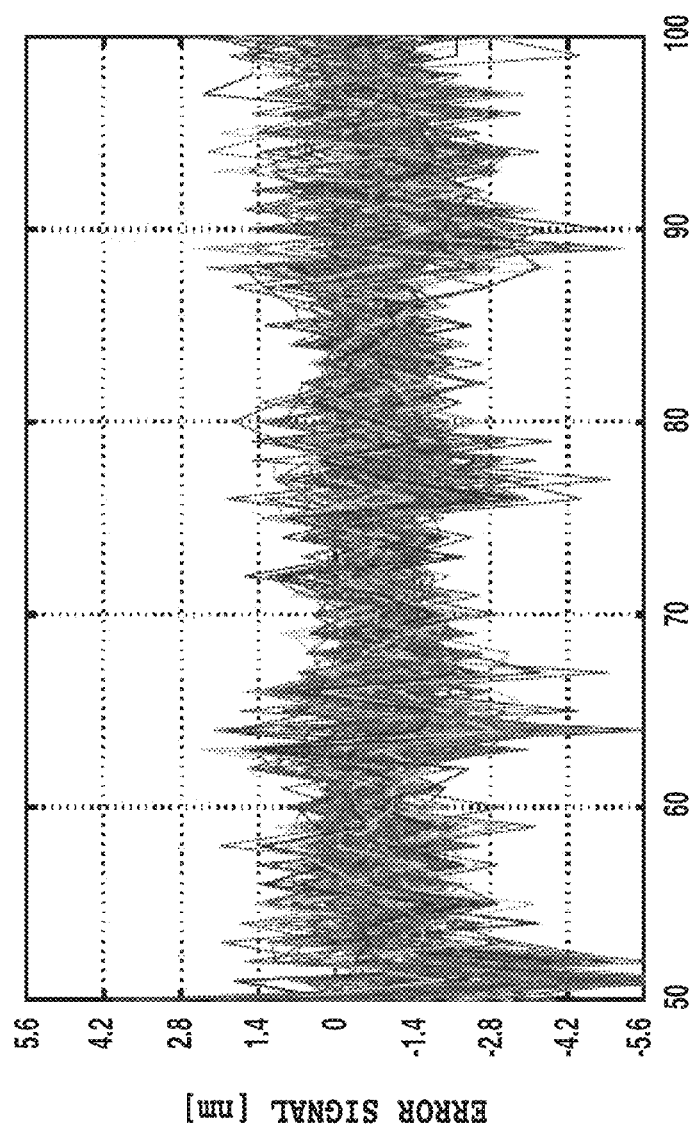
FIG. 20 is a diagram showing superimposed error signals in one image of the sample measured with the AFM according to the present invention.
Figure 22:
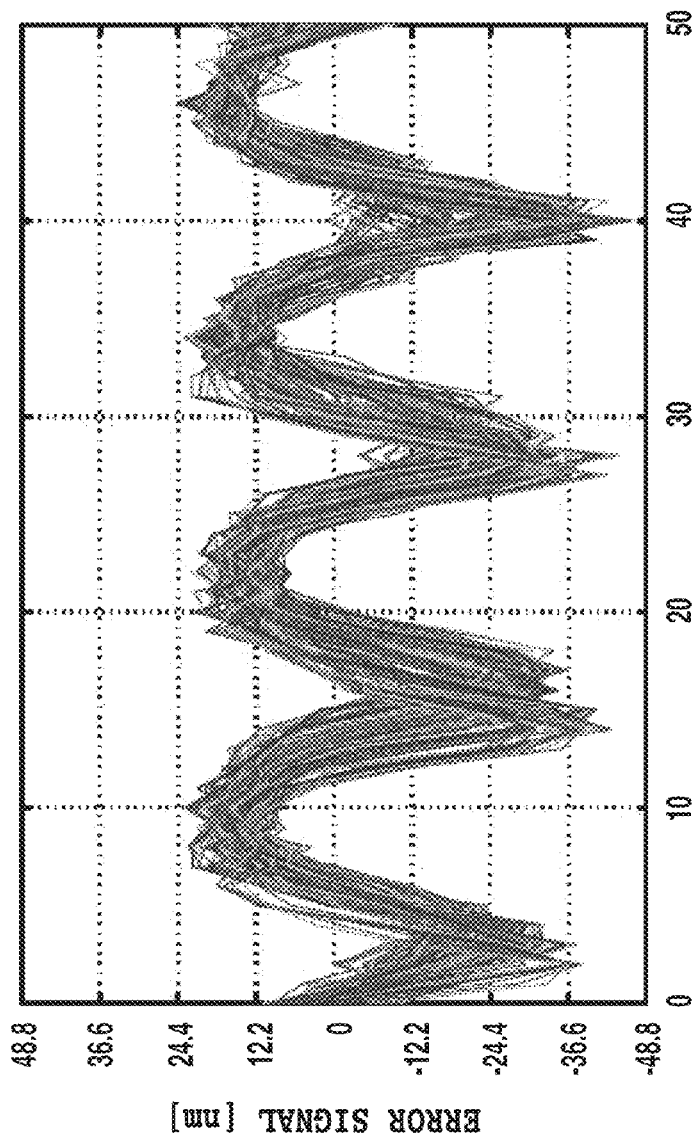
FIG. 22 is a diagram showing superimposed error signals in one image of a sample measured with the AFM according to the present invention.
Figure 23:
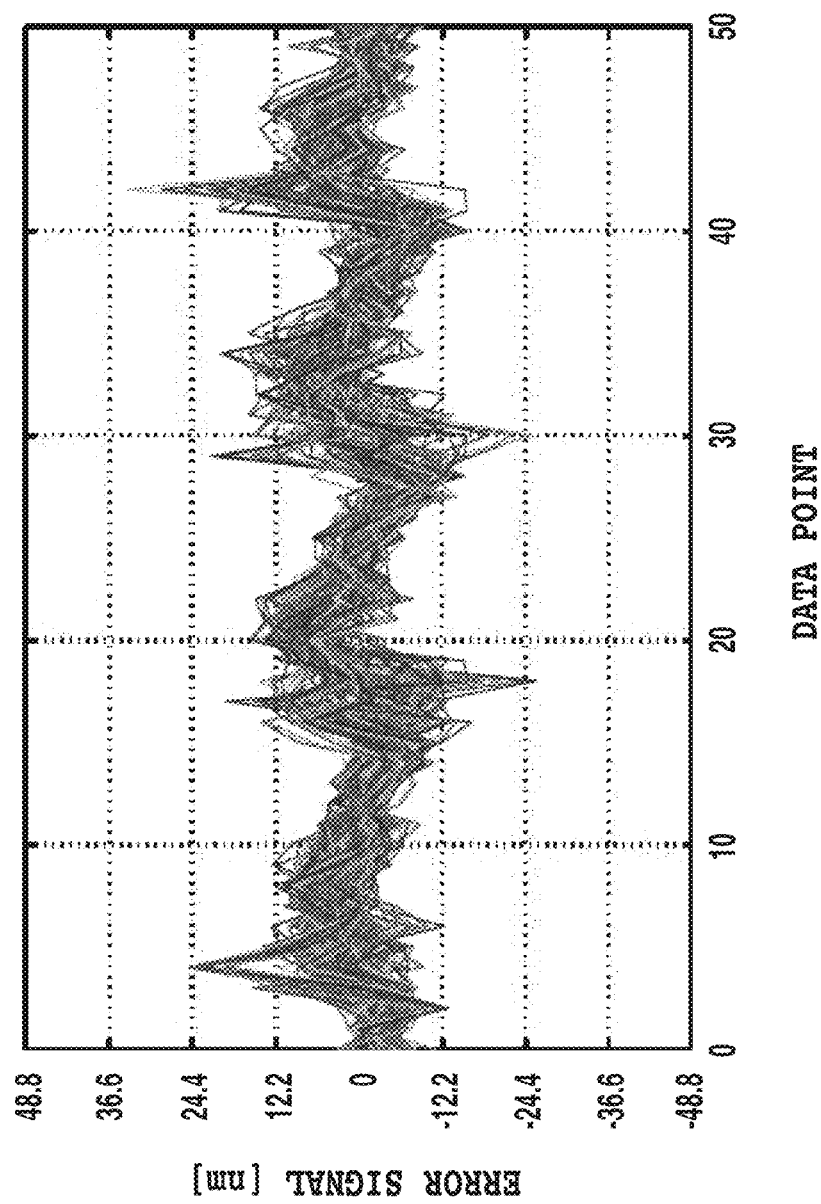
FIG. 23 is a diagram showing superimposed error signals in one image of the sample measured with the AFM according to the present invention.

FIGS. 18A and 18B show the shape and size of a grating element 1801 observed with the AFM according to the present invention. Such a grating element may be, by way of example, a planar brazed holographic grating standard article manufactured by Shimadzu Corporation. The grating element shown in FIG. 18A and FIG. 18B is characterized by being shaped like saw teeth-like grooves. Grating grooves are formed on a glass substrate of resin. The grooves are coated with a reflection film of Al or the like.

(5-3: Experiments)

The sampling frequency of a DSP in the AFM according to the present invention is set to 10 [kHz] by way of example. Then, the results described below were obtained.

Figure 25:
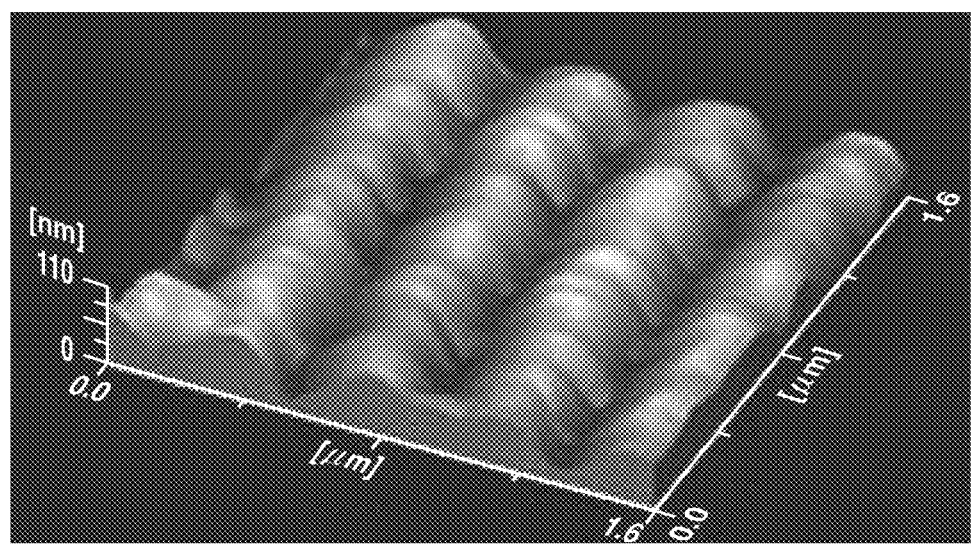
FIG. 25 is a diagram showing an image of a sample measured with the AFM according to the present invention.

FIG. 25 shows an image of the surface of the above-described grating element obtained by allowing the AFM according to the present invention to scan the surface of the grating element using the conventional method.

Figure 26:
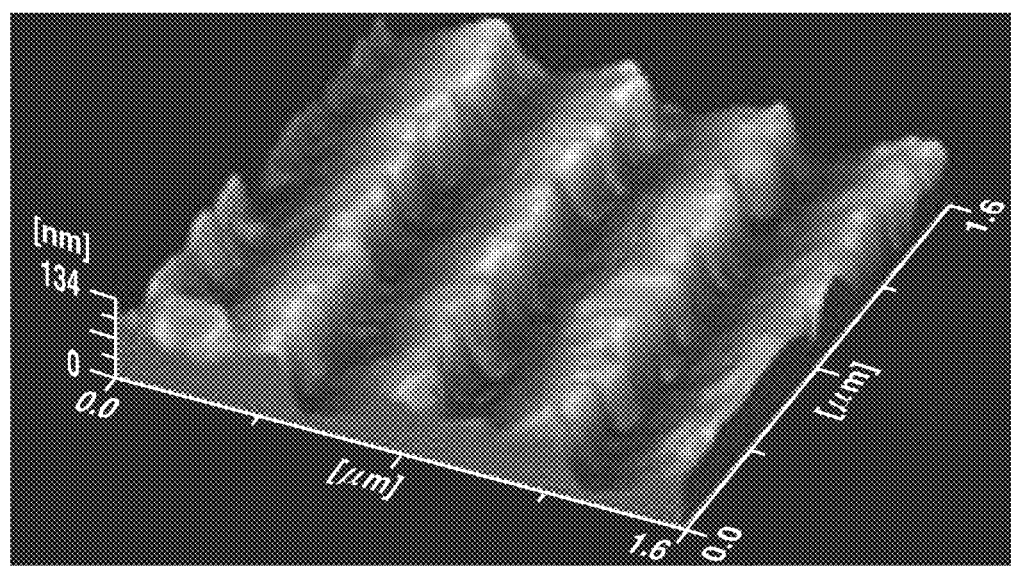
FIG. 26 is a diagram showing an image of the sample measured with the AFM according to the present invention.

FIG. 26 shows an image of the surface the above-described grating element obtained by allowing the AFM according to the present invention to scan the surface of the grating element using the STO.

Figure 27:
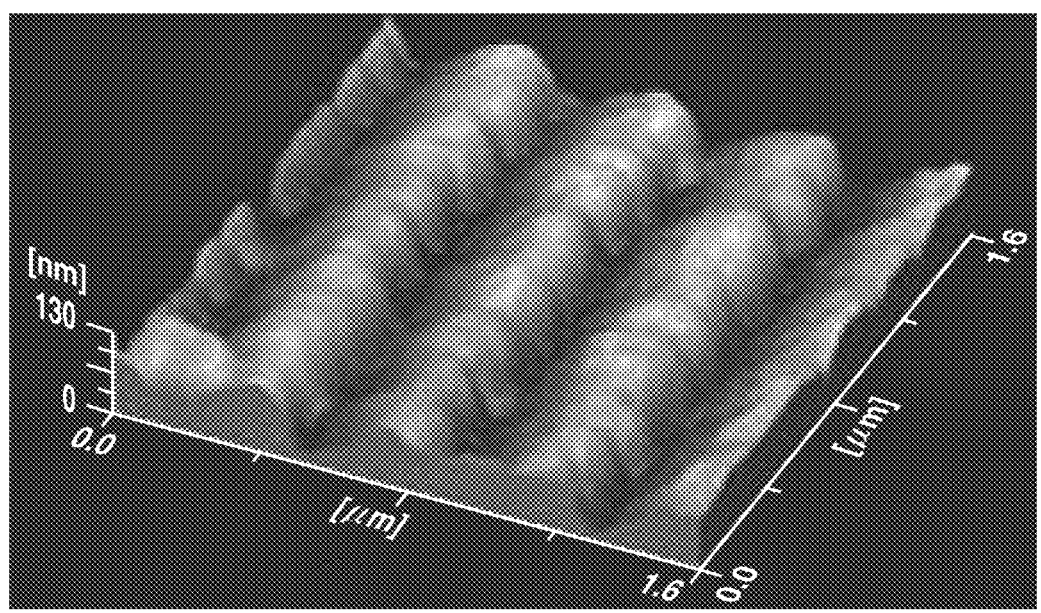
FIG. 27 is a diagram showing an image of the sample measured with the AFM according to the present invention.

FIG. 27 shows an image of the surface the above-described grating element obtained by allowing the AFM according to the present invention to scan the surface of the grating element using the STL-PTC.

Here, in FIG. 25 to FIG. 27, scanning speed is 32.2 µm/s.

Figure 28:
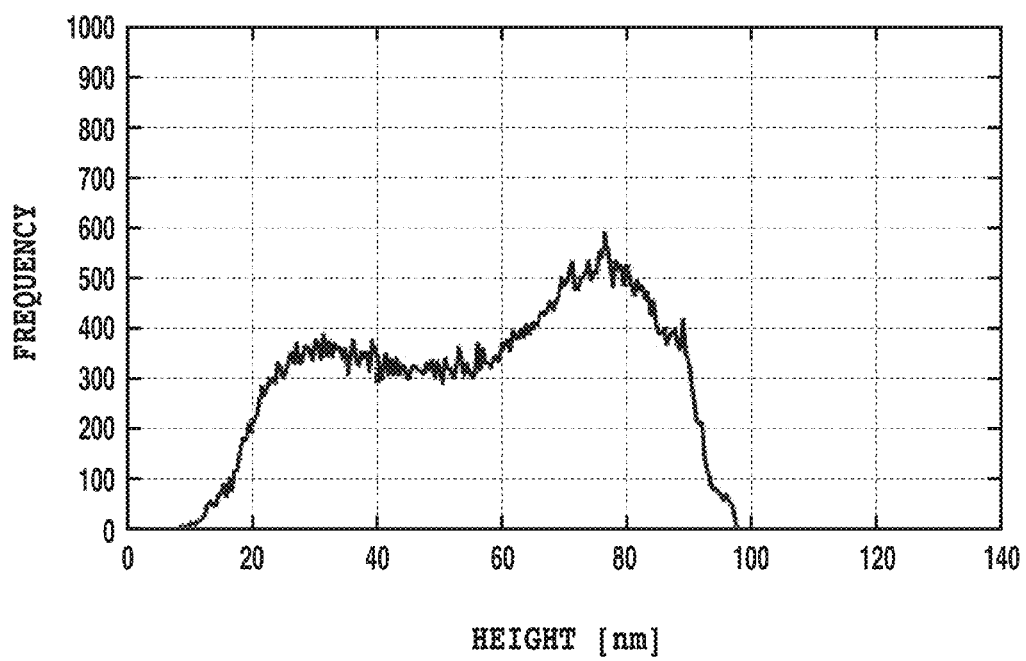
FIG. 28 is a diagram showing the frequency of height of recesses and protrusions on the surface of the sample measured with the AFM according to the present invention.

FIG. 28 is a histogram of the frequency of the height of recesses and protrusions on the surface of the above-described grating element obtained by allowing the AFM according to the present invention to scan the surface of the grating element using the conventional method under the same conditions as those in FIG. 25.

Figure 29:
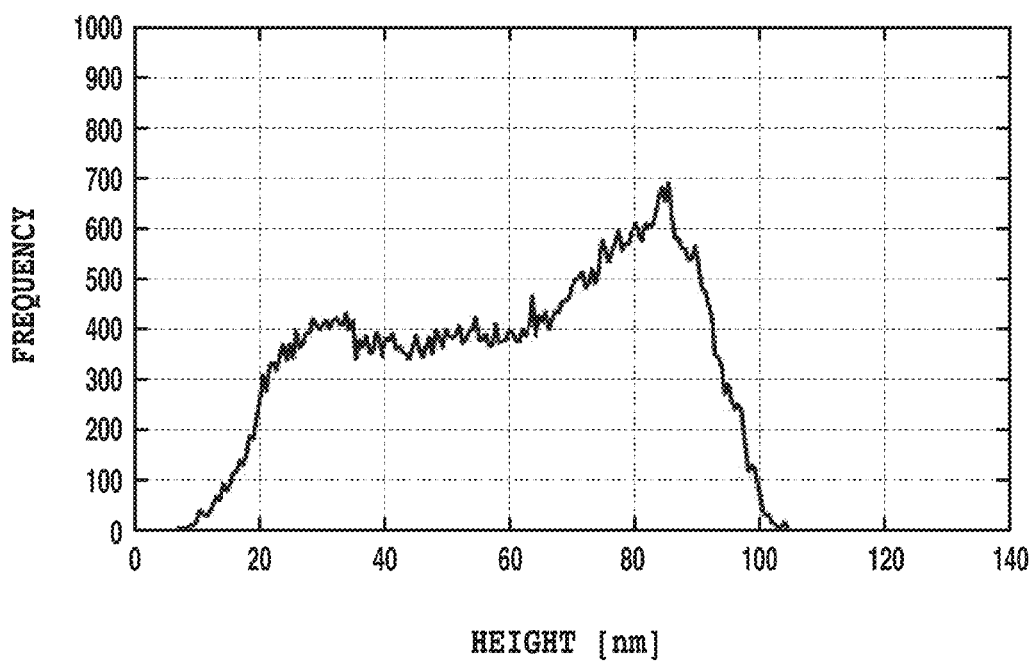
FIG. 29 is a diagram showing the frequency of height of recesses and protrusions on the surface of the sample measured with the AFM according to the present invention.

FIG. 29 is a histogram of the frequency of the height of recesses and protrusions on the surface of the above-described grating element obtained by allowing the AFM according to the present invention to scan the surface of the grating element using the STO under the same conditions as those in FIG. 26.

Figure 30:
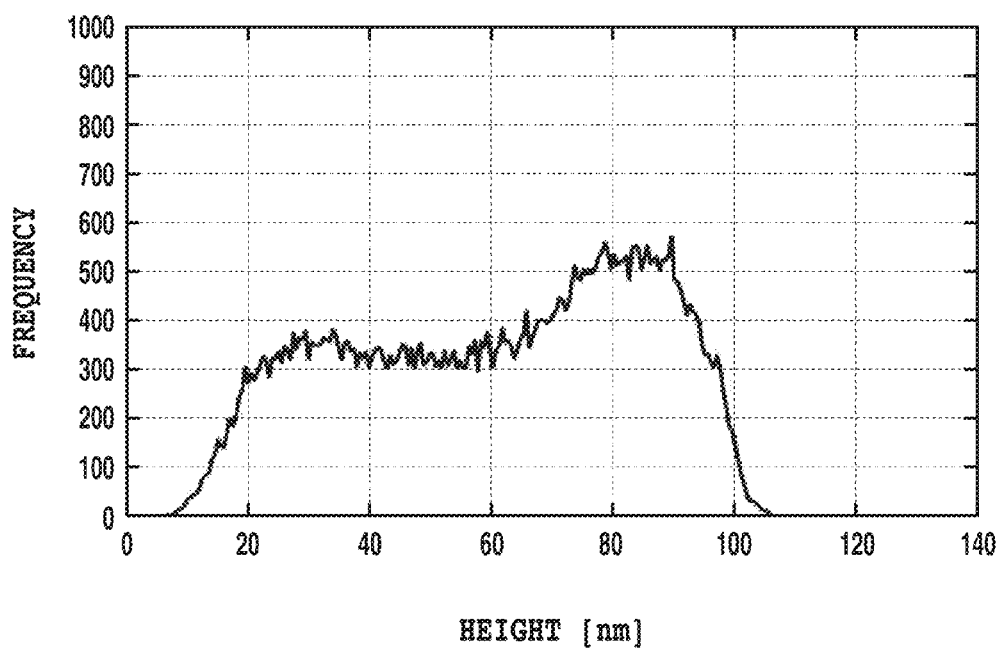
FIG. 30 is a diagram showing the frequency of height of recesses and protrusions on the surface of the sample measured with the AFM according to the present invention.

FIG. 30 is a histogram of the frequency of the height of recesses and protrusions on the surface of the above-described grating element obtained by allowing the AFM according to the present invention to scan the surface of the grating element using the STL-PTC under the same conditions as those in FIG. 27.

Figure 31:
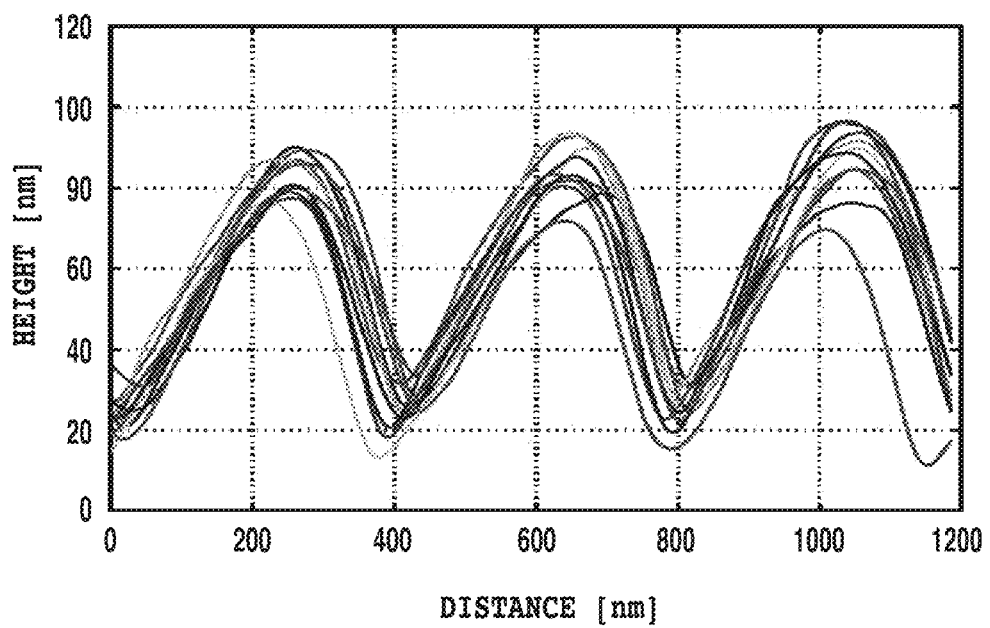
FIG. 31 is a diagram showing the sectional waveform of recesses and protrusions on the surface of the sample measured with the AFM according to the present invention.

FIG. 31 shows a sectional waveform of the above-described grating element obtained by allowing the AFM according to the present invention to scan the surface of the grating element using the conventional method under the same conditions as those in FIG. 25.

Figure 32:
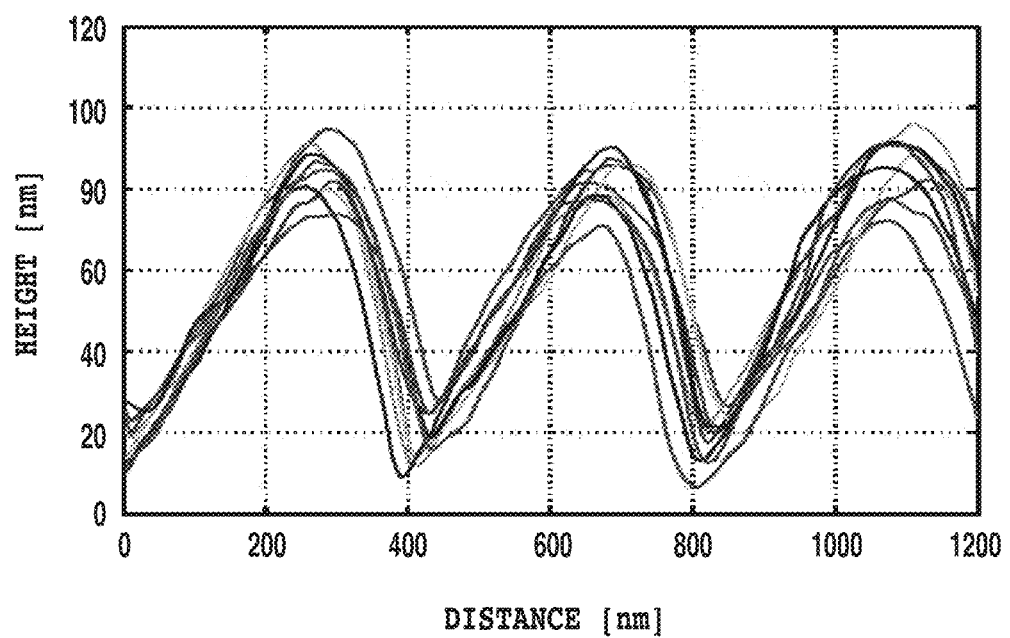
FIG. 32 is a diagram showing the sectional waveform of recesses and protrusions on the surface of the sample measured with the AFM according to the present invention.

FIG. 32 shows a sectional waveform of the above-described grating element obtained by allowing the AFM according to the present invention to scan the surface of the grating element using the STO under the same conditions as those in FIG. 26.

Figure 33:
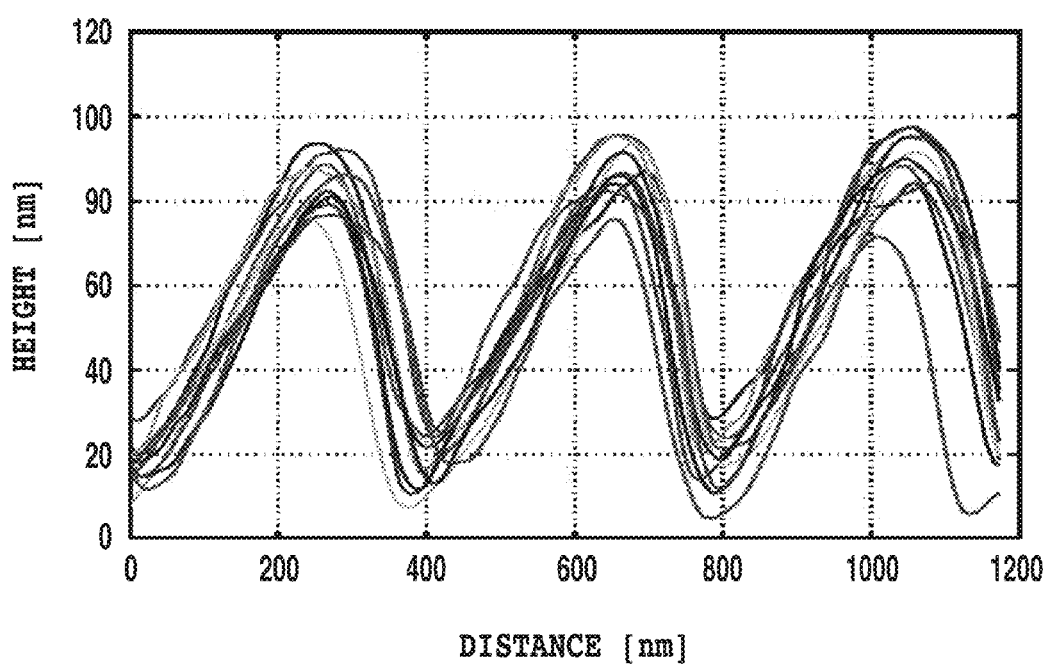
FIG. 33 is a diagram showing the sectional waveform of recesses and protrusions on the surface of the sample measured with the AFM according to the present invention.

FIG. 33 shows a sectional waveform of the above-described grating element obtained by allowing the AFM according to the present invention to scan the surface of the grating element using the STL-PTC under the same conditions as those in FIG. 27.

Figure 34:
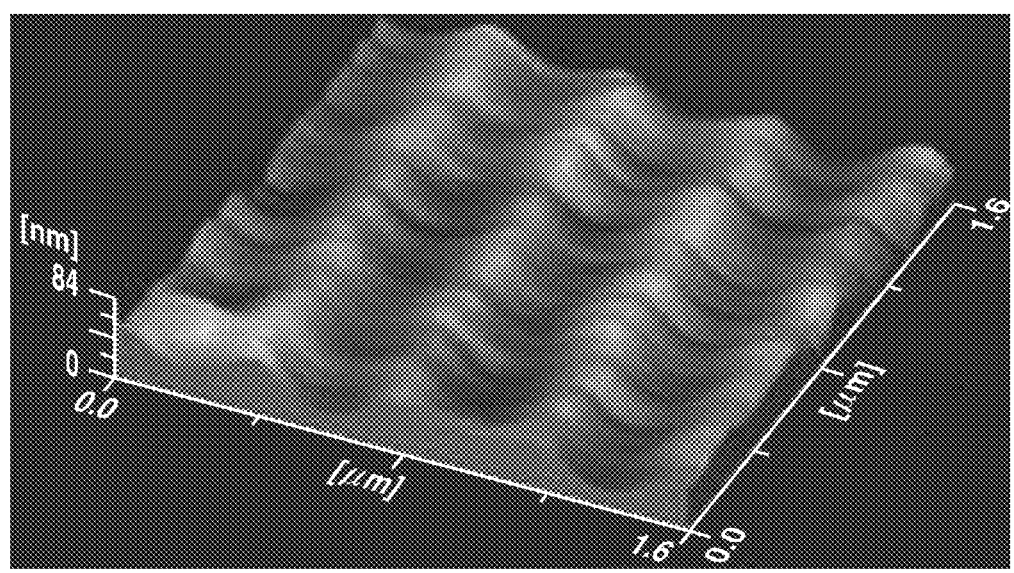
FIG. 34 is a diagram showing an image of the sample measured with the AFM according to the present invention.

FIG. 34 shows an image of the surface of the above-described grating element obtained by allowing the AFM according to the present invention to scan the surface of the grating element using the conventional method.

Figure 35:
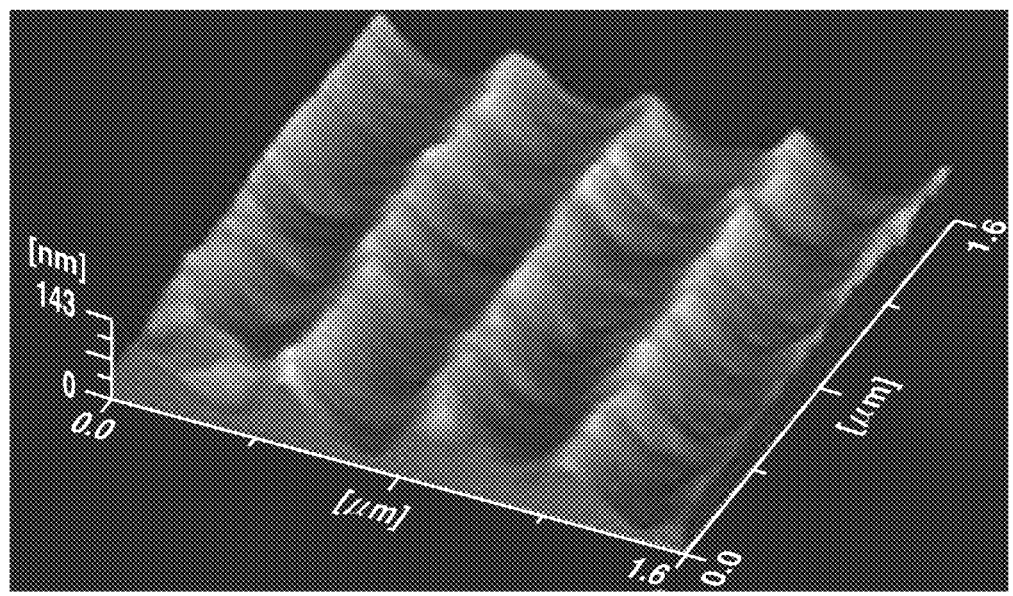
FIG. 35 is a diagram showing an image of the sample measured with the AFM according to the present invention.

FIG. 35 shows an image of the surface of the above-described grating element obtained by allowing the AFM according to the present invention to scan the surface of the grating element using the STO.

Figure 36:
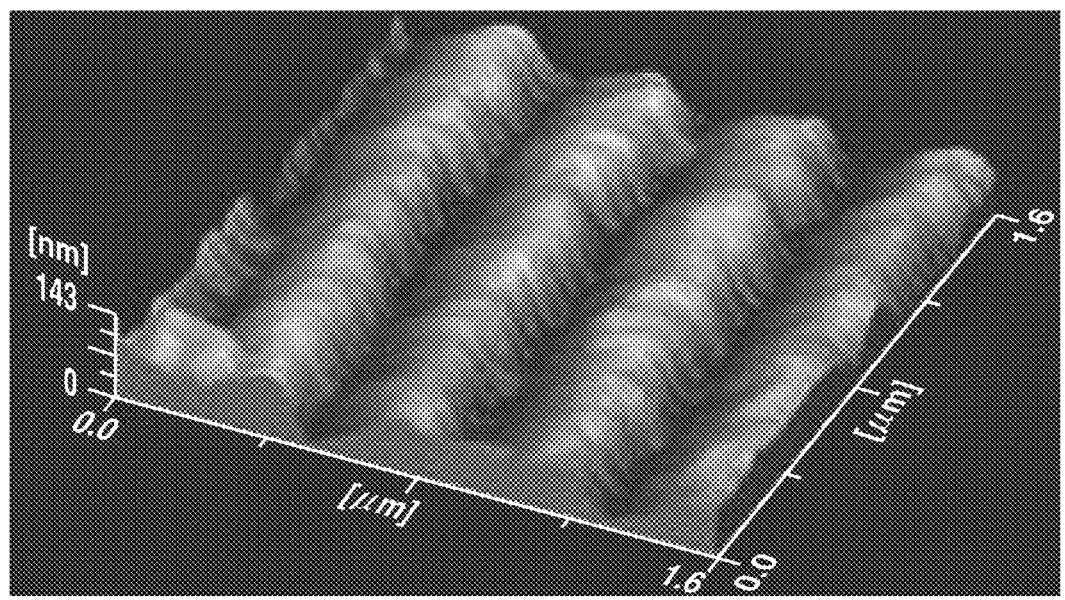
FIG. 36 is a diagram showing an image of the sample measured with the AFM according to the present invention.

FIG. 36 shows an image of the surface of the above-described grating element obtained by allowing the AFM according to the present invention to scan the surface of the grating element using the STL-PTC.

Here, in FIG. 34 to FIG. 36, scanning speed is 161 µm/s.

Figure 37:
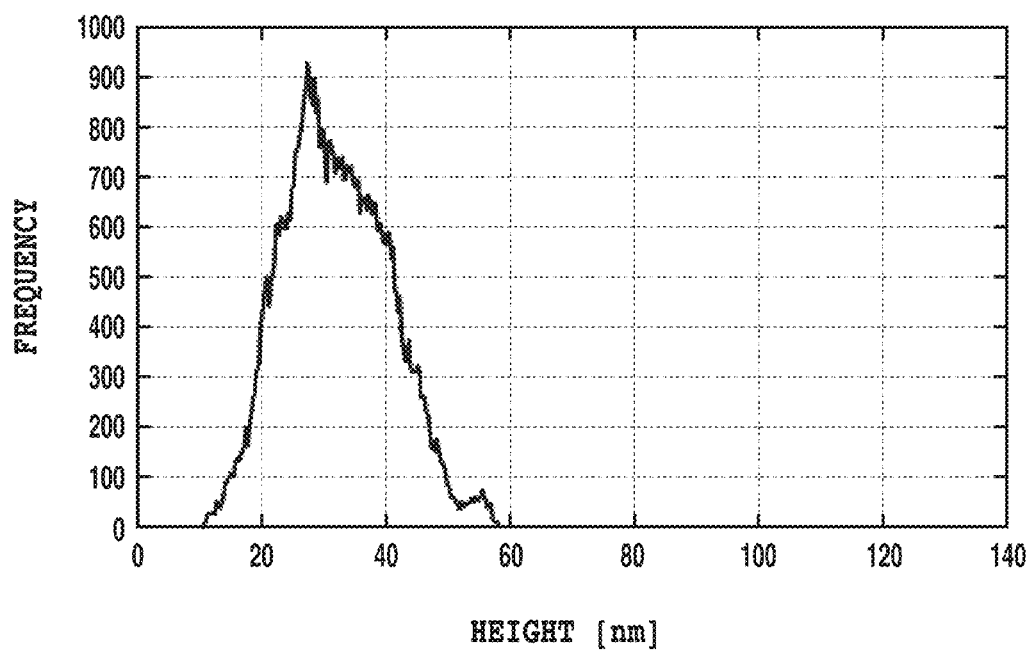
FIG. 37 is a diagram showing the frequency of height of recesses and protrusions on the surface of the sample measured with the AFM according to the present invention.

FIG. 37 is a histogram of the frequency of the height of recesses and protrusions on the surface of the above-described grating element obtained by allowing the AFM according to the present invention to scan the surface of the grating element using the conventional method under the same conditions as those in FIG. 34.

Figure 38:
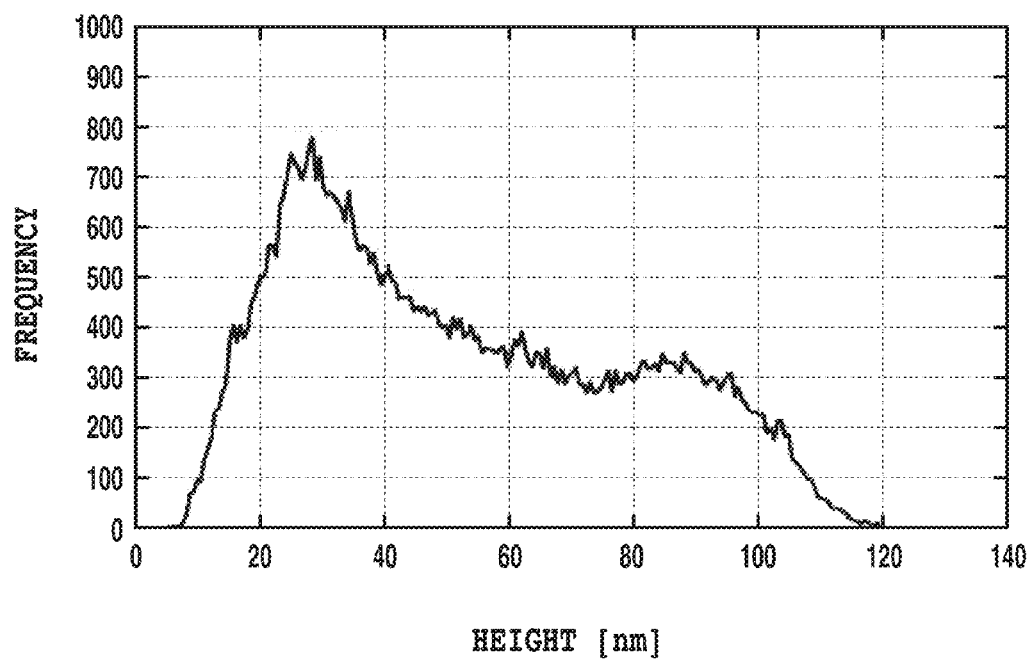
FIG. 38 is a diagram showing the frequency of height of recesses and protrusions on the surface of the sample measured with the AFM according to the present invention.

FIG. 38 is a histogram of the frequency of the height of recesses and protrusions on the surface of the above-described grating element obtained by allowing the AFM according to the present invention to scan the surface of the grating element using the STO under the same conditions as those in FIG. 35.

Figure 39:
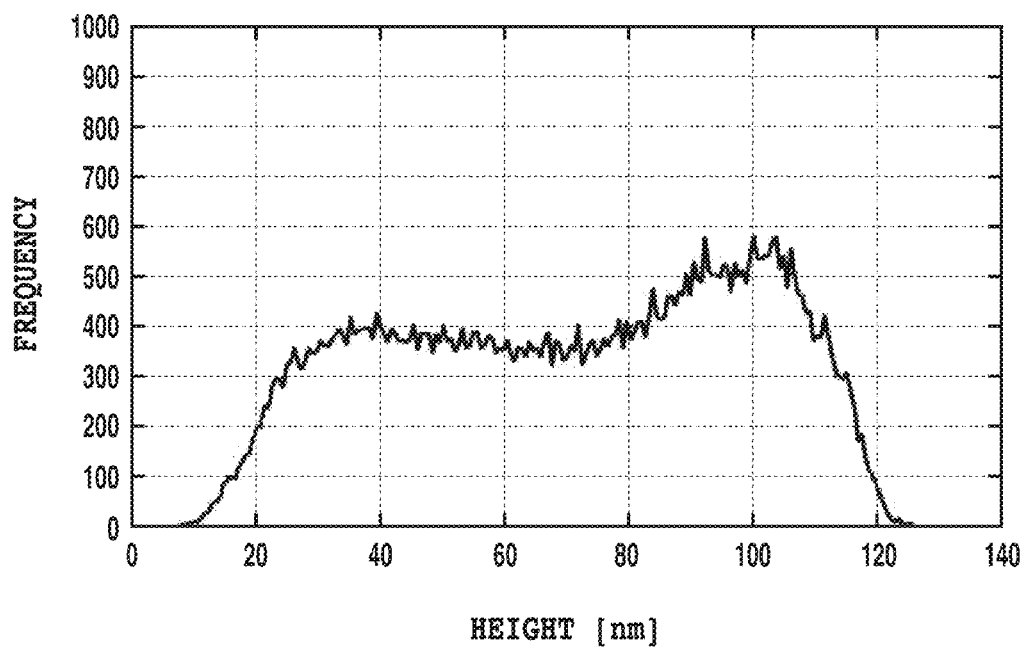
FIG. 39 is a diagram showing the frequency of height of recesses and protrusions on the surface of the sample measured with the AFM according to the present invention.

FIG. 39 is a histogram of the frequency of the height of recesses and protrusions on the surface of the above-described grating element obtained by allowing the AFM according to the present invention to scan the surface of the grating element using the STL-PTC under the same conditions as those in FIG. 36.

Figure 40:
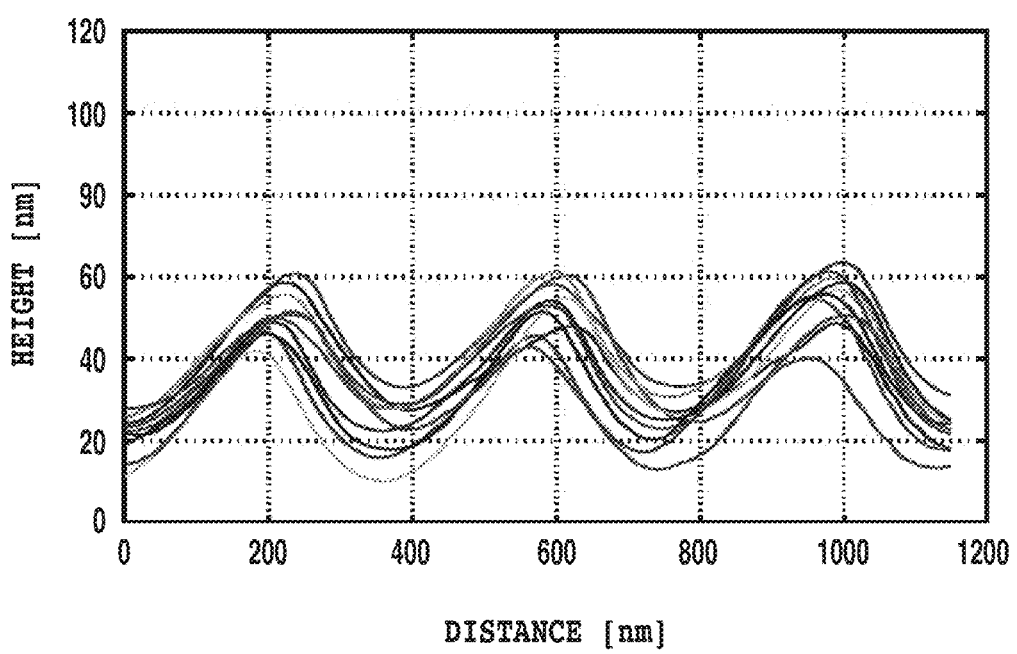
FIG. 40 is a diagram showing the sectional waveform of recesses and protrusions on the surface of the sample measured with the AFM according to the present invention.

FIG. 40 shows a sectional waveform of the above-described grating element obtained by allowing the AFM according to the present invention to scan the surface of the grating element using the conventional method under the same conditions as those in FIG. 34.

Figure 41:
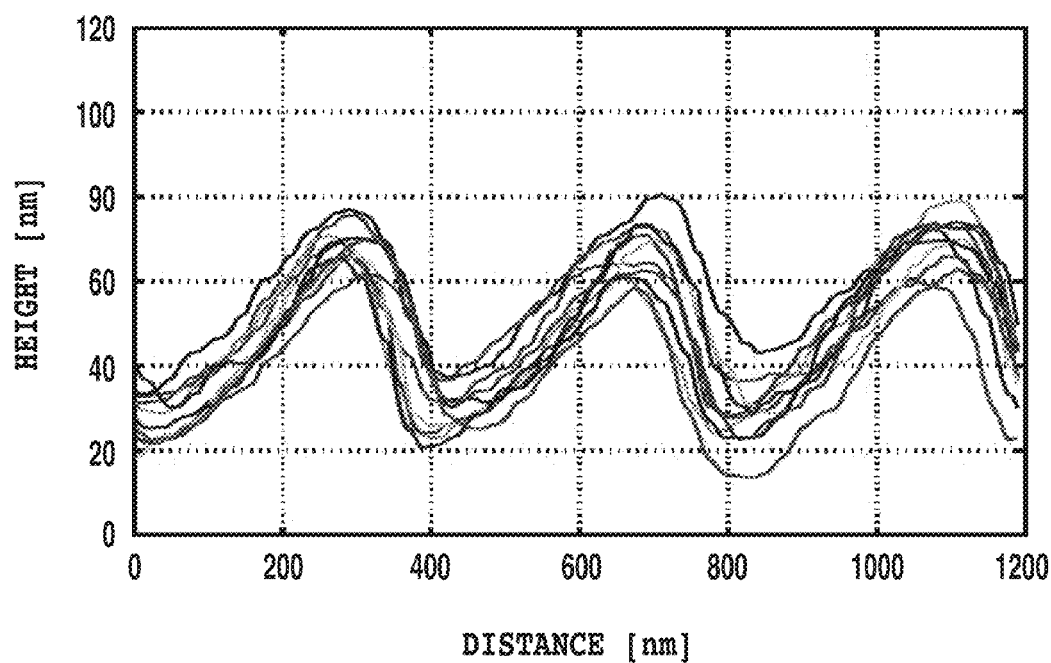
FIG. 41 is a diagram showing the sectional waveform of recesses and protrusions on the surface of the sample measured with the AFM according to the present invention.

FIG. 41 shows a sectional waveform of the above-described grating element obtained by allowing the AFM according to the present invention to scan the surface of the grating element using the STO under the same conditions as those in FIG. 35.

Figure 42:
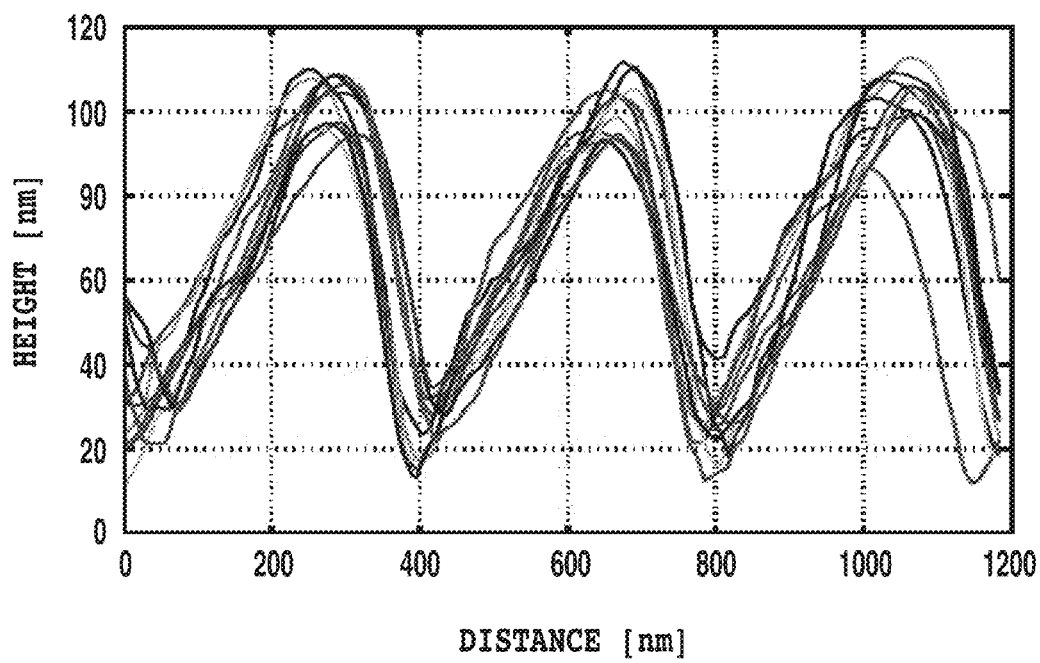
FIG. 42 is a diagram showing the sectional waveform of recesses and protrusions on the surface of the sample measured with the AFM according to the present invention.

FIG. 42 shows a sectional waveform of the above-described grating element obtained by allowing the AFM according to the present invention to scan the surface of the grating element using the STL-PTC under the same conditions as those in FIG. 36.

Here, the histograms in FIGS. 28, 30, 37, and 39 relate to the height of the sample determined from the manipulating quantity u(t). The histograms shown in FIGS. 29 and 38 relate to the height of the sample determined from the estimated value:

$$\hat{a}$$ [Expression 24]

Moreover, FIG. 31 to FIG. 33 and FIG. 40 to FIG. 42 show a waveform obtained by superimposing the 10 cross sections in the images in FIG. 25 to FIG. 27, and FIG. 34 to FIG. 36 on one another at intervals of 0.125 μm.

Furthermore, in FIG. 25 to FIG. 42, the scanning speed indicates the speed of scanning in the (x) direction shown in FIG. 6. Scan range is 5.5 μm×5.5 μm both for a scanning speed of 32.2 μm/s and for a scanning speed of 161 μm/s. Time required for the whole scan is about 3 minutes and about 40 seconds, respectively. FIG. 25 to FIG. 27 are enlarged views of images obtained at a scanning speed of 32.2 μm/s. FIG. 34 to FIG. 36 are enlarged views of images obtained at a scanning speed of 161 μm/s. The range for the enlarged images is 1.6 μm×1.6 μm.

With the conventional method, images obtained at an increased scanning speed as shown in FIG. 34 is significantly degraded compared to those obtained at a low scanning speed as shown in FIG. 25. On the other hand, the STO is determined to reduce the degradation of the image compared to the conventional method when an image obtained at an increased scanning speed as shown in FIG. 35 is compared with that obtained at a low scanning speed as shown in FIG. 26.

Furthermore, with an increased scanning speed, the histogram for the conventional method in FIG. 37 shows an extremely small number of height rates. In contrast, the histogram for the STO shows a relatively large number of height rates. Additionally, the sectional waveform for the STO shown in FIG. 41 shows more rugged recesses and protrusions than that for the conventional method shown in FIG. 32. However, with the conventional method, the u(t) exhibits a significantly degraded property of tracking the surface of the sample. This means that the STO is likely to increase the modeling error to degrade the image. This is also indicated by the fact that images obtained using the STO and shown in FIG. 35 are more significantly degraded than those obtained using the STL-PTC and shown in FIG. 36 and that the STL-PTC is thus superior to the STO.

In the histograms shown in FIG. 28 to FIG. 30, the frequency of protruding areas increases. This means that the protruding areas are round, so that the amount by which these areas are scanned increases. Furthermore, FIGS. 21 and 24 show a comparison of the conventional method with the STL-PTC, with error signals evaluated in terms of ±3σ. FIGS. 21 and 24 show that "without learning control" indicates the results for the conventional method, whereas "with learning control" indicates the results for the STL-PTC. FIG. 21 shows the case of a scanning speed of 32.2 μm/s and indicates 4.53% improvement with respect to the height of the recesses and protrusions (60 nm). On the other hand, FIG. 24 shows the case of a scanning speed of 161 μm/s and indicates 52.5% improvement with respect to the height of the recesses and protrusions (60 nm).

Furthermore, FIGS. 19, 20, 22, and 23 shows superimposed relationships between error signals and data points (data acquisition points) within one image.

(6: Summary)

The above-described embodiment of the present invention indicates the difference between the conventional method and the STO and thus the advantages of the STO over the conventional method. However, disadvantageously, the STO is not robust to errors in the modeling of the plant. Thus, when a point with a rapid change in the recess and protrusion of the sample is observed, a large modeling error occurs. At an increased scanning speed, images obtained using the STL-PTC are less degraded than those obtained using the STO. This is because the STL-PTC allows possible tracking errors to be reduced by the PTC, while allowing modeling errors to be compensated for through feedback, enabling the disadvantages of the STO associated with a rapid change in the recess and protrusion to be avoided.

Second Embodiment

Also in a second embodiment, a model based on a contact mode for the interaction between a sample surface 103 and the tip 102 of a cantilever is used to give a motion equation for the tip of the cantilever with a mass (m), as shown in formula (1).

The method described in Non-Patent Document 2 can be used to convert the above-described model into one to which the recesses and protrusions on the sample surface 103 are input. A transfer function for the plant according to the present embodiment is identified as follows according to a method of system identification described in Non-Patent Document 9.

[Expression 25]

$$P(s) = \frac{7.034 \times 10^9}{s^2 + 9219s + 1.274 \times 10^9} \quad (17)$$

Figure 43:
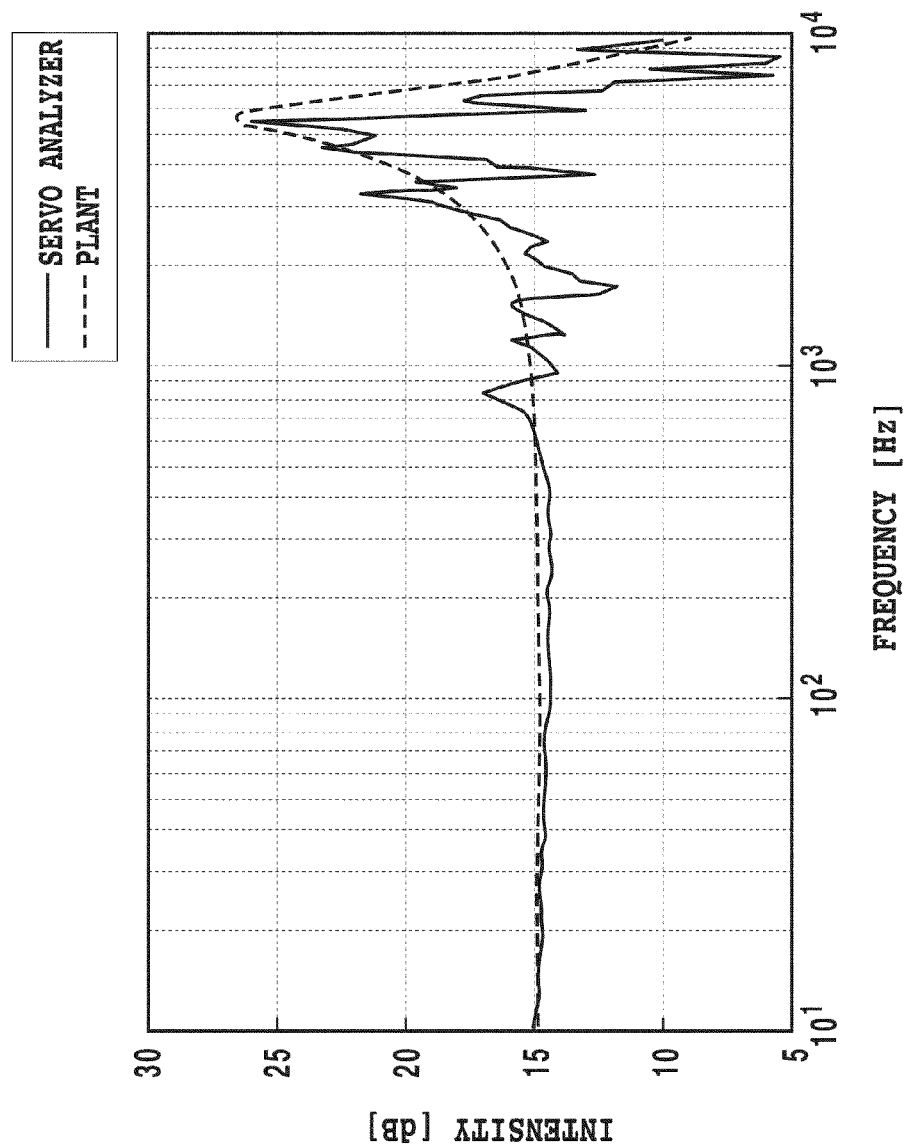
FIG. 43 is a Bode diagram.
Figure 44:
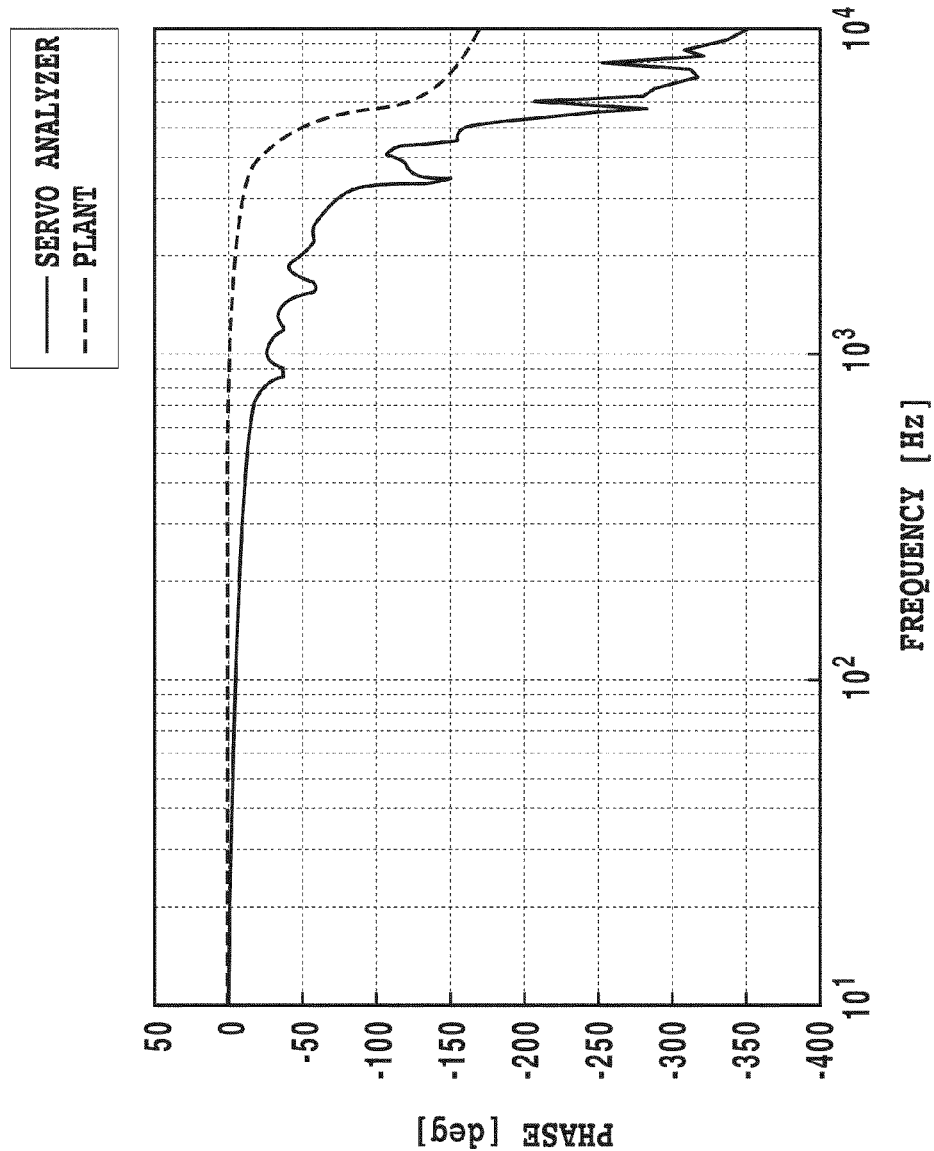
FIG. 44 is a Bode diagram.

FIGS. 43 and 44 show a comparison of the frequency characteristics of a plant based on formula (17) with frequency characteristics identified by a servo analyzer (manufactured by ONO SOKKI Co., Ltd.). The figures show that the plant identified as shown in formula (17) resonates significantly at 5,590 [Hz] and provides a high gain even in a low frequency region.

(Internal Configuration of the Experimental Apparatus)

The AFM according to the present embodiment is a special model of a JSPM-5200 manufactured by JEOL Ltd. However, this is only an example, and any AFM is applicable provided that the present embodiment can be incorporated into the AFM. Alternatively, dSPACE1104 may be used to modify a control mechanism for the AFM so that the control mechanism allows the present embodiment to be implemented.

FIG. 3 is a block diagram showing the flow of signals inside the AFM according to the present embodiment.

As shown by reference numeral 310 in FIG. 3, when the sample surface 103 is scanned, the displacement of the tip 102 of the cantilever is detected by a PD (four-piece PhotoDiode) 105 and is output as a signal. The signal is subjected to AD conversion by an AD (AD converter) 305. The resulting signal is input to a DSP (Digital Signal Processor) as y[i].

First, an output x [V] from the PD (four-piece PhotoDiode) 105 is provided according to a force curve (the relation expression between a force exerted on the tip of the cantilever and the distance between the cantilever tip and the sample). In the present embodiment, the output x [V] from the PD can be converted into the displacement y [nm] of the cantilever using the conversion expression y [nm]×$K_{PD}$ [V/nm]=x [V]. In the present embodiment, based on the force curve, $K_{PD}$=2.44× $10^{-2}$ [V/nm].

In the present embodiment, $K_{PD}$ is determined by first-order-approximating the measurement data of the force curve (Non-Patent Document 2) obtained with the JSPM-5200, by way of example.

Furthermore, as shown by reference numeral 320 in FIG. 3, a manipulating quantity u[i] resulting from DA conversion by the DA (DA converter) 301 in the DSP is amplified by an amplifier 302. The amplified manipulating quantity u[i] is applied to a PZT (piezo) 107 as a driving voltage. A gain provided by the amplifier 302 is $K_g$=20, and the rate of elongation of the PZT subjected to the driving voltage is $K_{PZT}$=15.59 [nm/V]. That is, the calculation u [V]×$K_{PZT}$ [nm/V] allows the u [V] to be converted into the displacement of the piezo.

Additionally, the gain of the AD/DA in the DSP is adjusted to 1.

(Design of the Controller According to the Conventional Method)

The controller according to the conventional method to be compared with the embodiment of the present invention is a phase delay compensator used in a product. A transfer function for the controller according to the conventional method is as shown in formula (3).

Here, the controller according to the conventional method is tuned such that the gain margin and the phase margin are 18.8 [dB] and 81 [deg], respectively, and that the proportional gain $k_p$=64 and $\omega_c$=2π$f_c$ ($f_c$=0.5 [Hz]).

Figure 45:
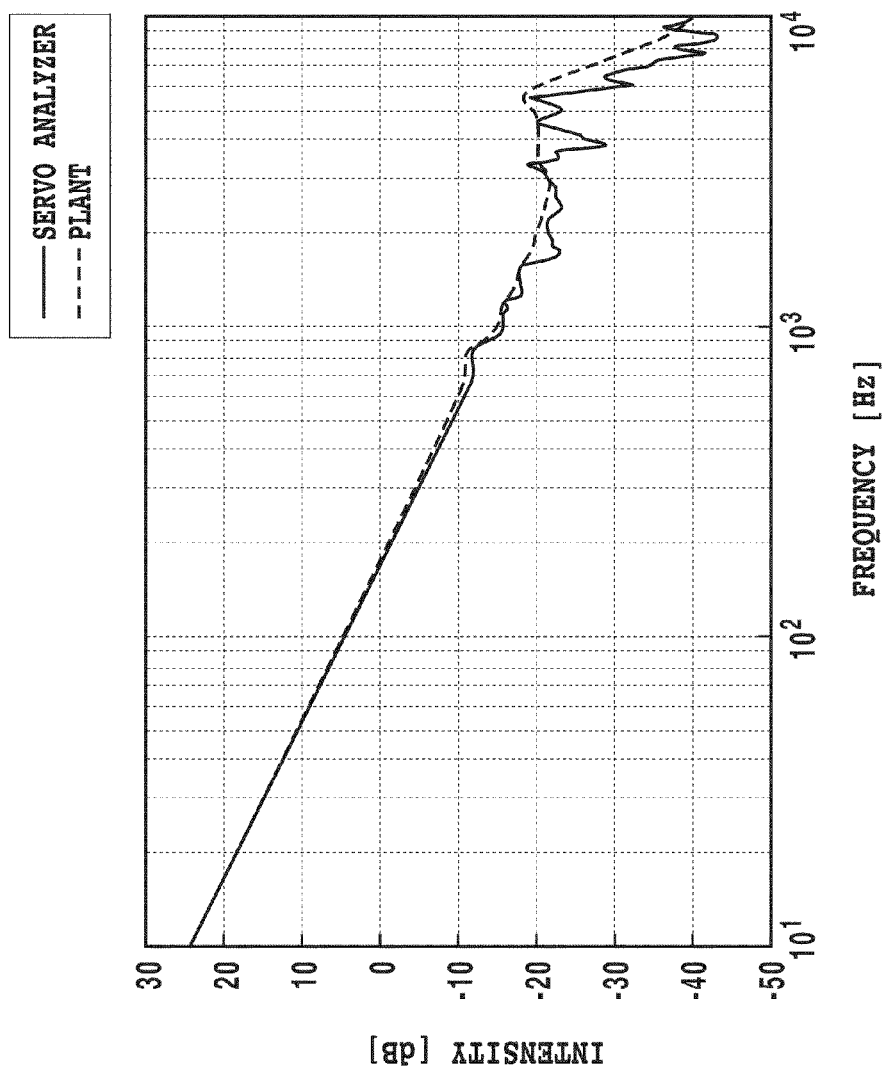
FIG. 45 is a diagram showing a loop transfer function.
Figure 46:
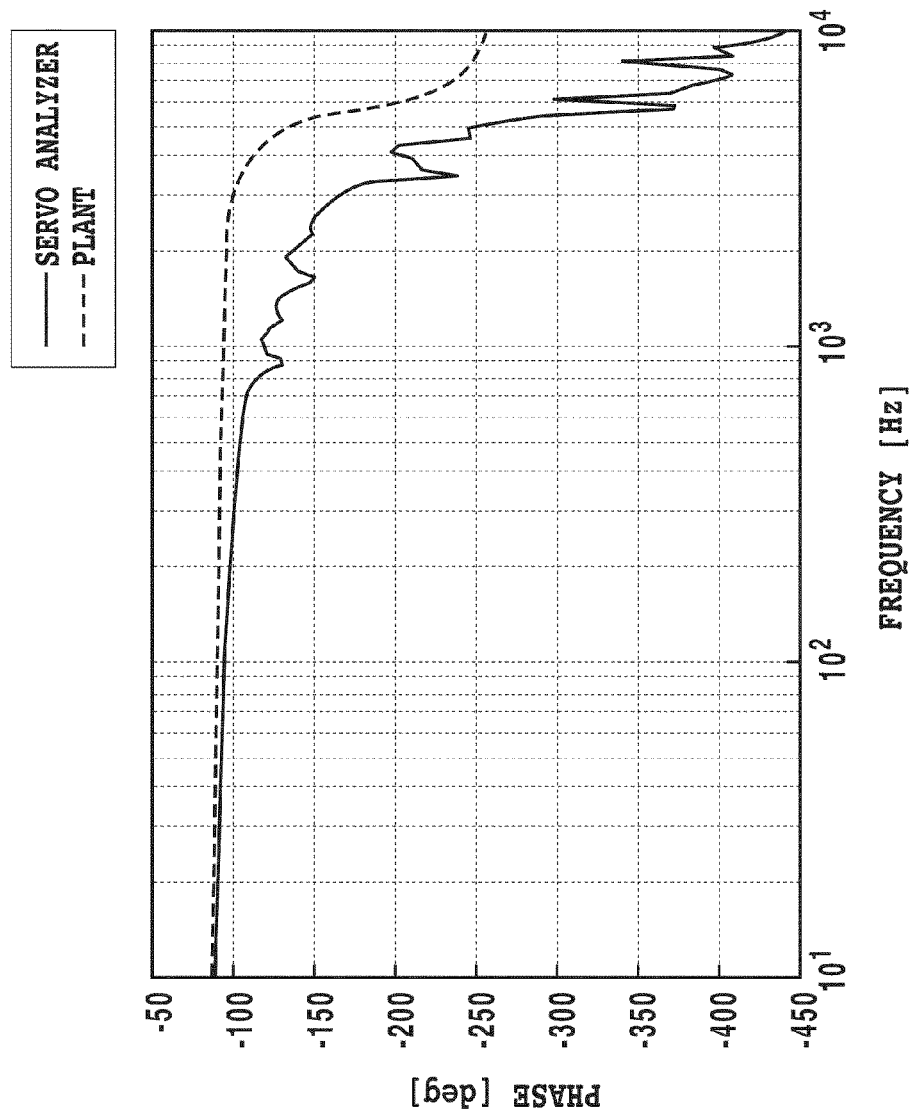
FIG. 46 is a diagram showing a loop transfer function.

FIGS. 45 and 46 show loop transfer functions for the plant and the controller. FIG. 46 shows that the cutoff frequency of the controller according to the conventional method is 177 [Hz].

(Improvement with Improved Surface Topography Learning with PTC)

To avoid the disadvantages of the conventional method and the STO in Non-Patent Document 12, Non-Patent Document 11 proposes the surface topography learning with PTC (STL-PTC). The present embodiment uses an improved STL-PTC obtained by improving the surface topography learning with PTC proposed in Non-Patent Document 11. The learning algorithm of the improved STL-PTC is used to perform perfect tracking based on the learned tracking error (e), thus enabling a surface image observed with the AFM to be accurately estimated.

Also in the improved STL-PTC, a second-order controlled object modeled as shown in FIG. 2 is discretized using formulas (6) to (16).

Figure 47:
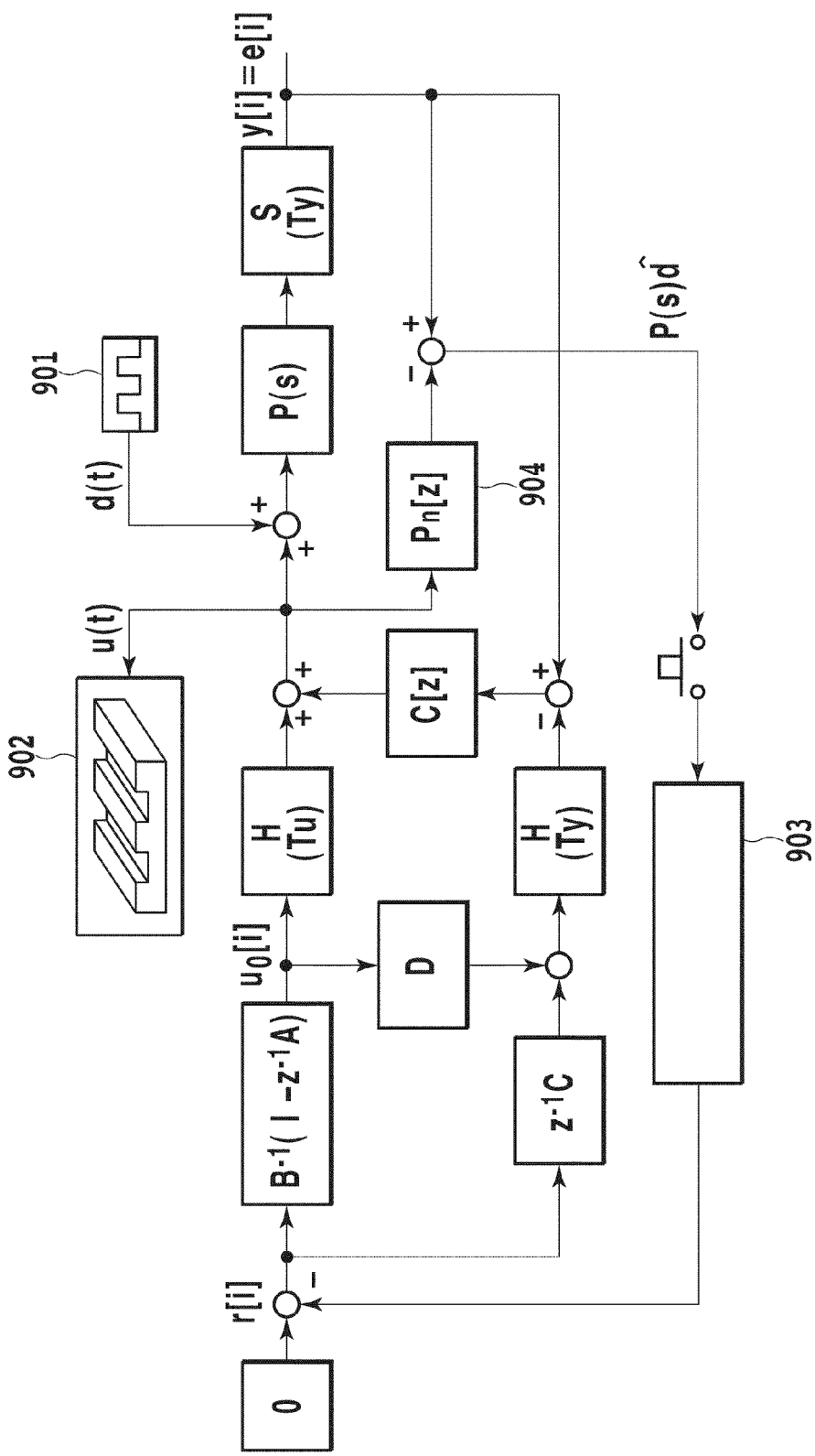
FIG. 47 is a block diagram of improved surface topography learning with PTC (STL-PTC)

FIG. 47 is a block diagram of the improved STL-PTC.

In the estimation blocks of the improved STL-PTC shown in FIG. 47, a surface topography 4701 is input, and an estimated surface topography is stored in data storage means 4702.

The improved STL-PTC performs scanning using an output signal (error) during an FWS as a command value for a BWS. The improved STL-PTC thus requires a signal generator 4703 including a stack memory in which data obtained at the end of the FWS is saved as the first data for the BWS. The block diagram shown in FIG. 47 is characterized in that a calculation 4704 includes a discretized nominal plant $P_n[z]$. Installation of such a disturbance estimation mechanism matches the dynamics of an output signal during the FSW with the dynamics of an output signal during the BWS.

Figure 48:
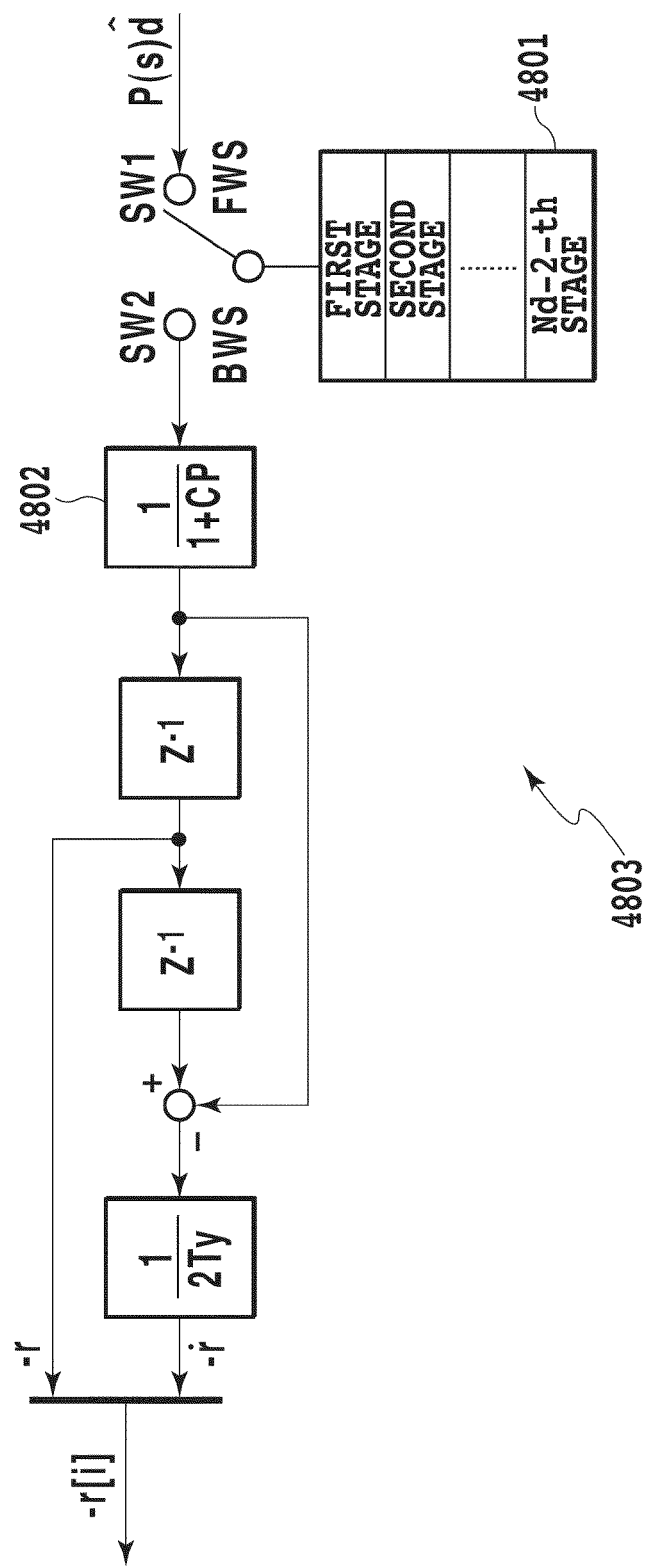
FIG. 48 is a diagram showing a signal generator.

FIG. 48 is a diagram showing the details of the signal generator 4703.

As shown in FIG. 48, a switch 1 (SW1) for the FWS is kept on for T (=the number $N_d$ of stages in the memory×the sampling period $T_y$) seconds. An output end conversion value:

$$P(s)\hat{d} \quad \text{[Expression 26]}$$

for a disturbance estimated value obtained by the disturbance estimation mechanism shown in FIG. 47 passes through a stack memory 4801 and is stored in a stack memory 1301. The output end conversion value:

$$P(s)\hat{d} \quad \text{[Expression 27]}$$

stored in the stack memory passes through a sensitivity function 4802:

$$\frac{1}{1+CP} \quad \text{[Expression 28]}$$

and is thus converted into an output signal for the BWS. During the BWS, a switch 2 (SW2) is turned on to allow the signal generator to generate a target trajectory allowing the error to be adjusted to 0. Thus, the PTC reduces the possible error in a feedforward manner.

FIG. 5 shows the steps of control in the AFM according to the present invention. Switching is controlled by observing the X scan waveform as shown in FIG. 5. As shown in FIG. 5, the X scan waveform is triangular. Each image is measured during an FWS 1101 and during a BWS 1102. During the FWS, the switch 1 (SW1) in FIG. 48 is kept on for T (=the number $N_d$ of stages in the memory×the sampling period $T_y$ of an output signal) seconds (switch-on and switch-off are shown by the height of a graph shown at reference numeral 1103). Error signals are stored in the signal generator 4703 composed of the stack memory 4801 shown in FIG. 48. During the BWS, the switch 2 (SW2) is turned on to allow the signal generator to generate a target trajectory allowing the error to be adjusted to 0. Then, the PTC adjusts the error to 0. Thus, the $N_d$ memory rows can serve as a feedforward compensator. This enables possible error signals to be reduced for every sample point. However, during the FWS, the signal generator provides no output.

In FIG. 5, reference numerals 1104, 1106, and 1108 denote learning processes. Reference numerals 1105, 1107, and 1109 denote control processes.

Here, since the controlled object is of a second order, when the state variable (x) is:

$$x=[y,\dot{y}] \quad \text{[Expression 29]}$$

the signal generator 4703 for error signals can be designed as shown in FIG. 48. Here, a speed command value:

$$\dot{r}[i] \quad \text{[Expression 30]}$$

is as shown in formula (12).

(Surface Topography Learning Observer (STLO))

The STL-PTC according to the present embodiment adjusts the tracking error to 0 at intervals of the sampling period $T_r$ ($=nT_u$) for the command value to enable the tracking capability of the manipulating quantity u(t) to be equivalently improved. However, the STL-PTC includes a complicated control mechanism and the dynamics of the plant $P_n[z]$. Thus, disadvantageously, a learning signal does not perfectly match the error signal during the BWS.

Thus, the present embodiment also uses a surface topography learning observer (STLO). The STLO applies the reverse system of a discretized plant to estimate a disturbance, and reduces the possible disturbance in a feedforward manner without affecting the stability of the system. Thus, a surface image observed with the AFM can be accurately estimated.

Furthermore, during the FWS, the STLO, like the STL-PTC, need not estimate the disturbance in real time. Thus, creating the reverse system of the plant delayed by one sample enables the disturbance (d) to be reduced at intervals of the control period $T_u$ (0.1 msec). However, it should be noted that the disturbance is estimated by a zeroth-order disturbance observer, so that for any waveform, the disturbance theoretically delayed by one sample cannot always be estimated.

Figure 49:
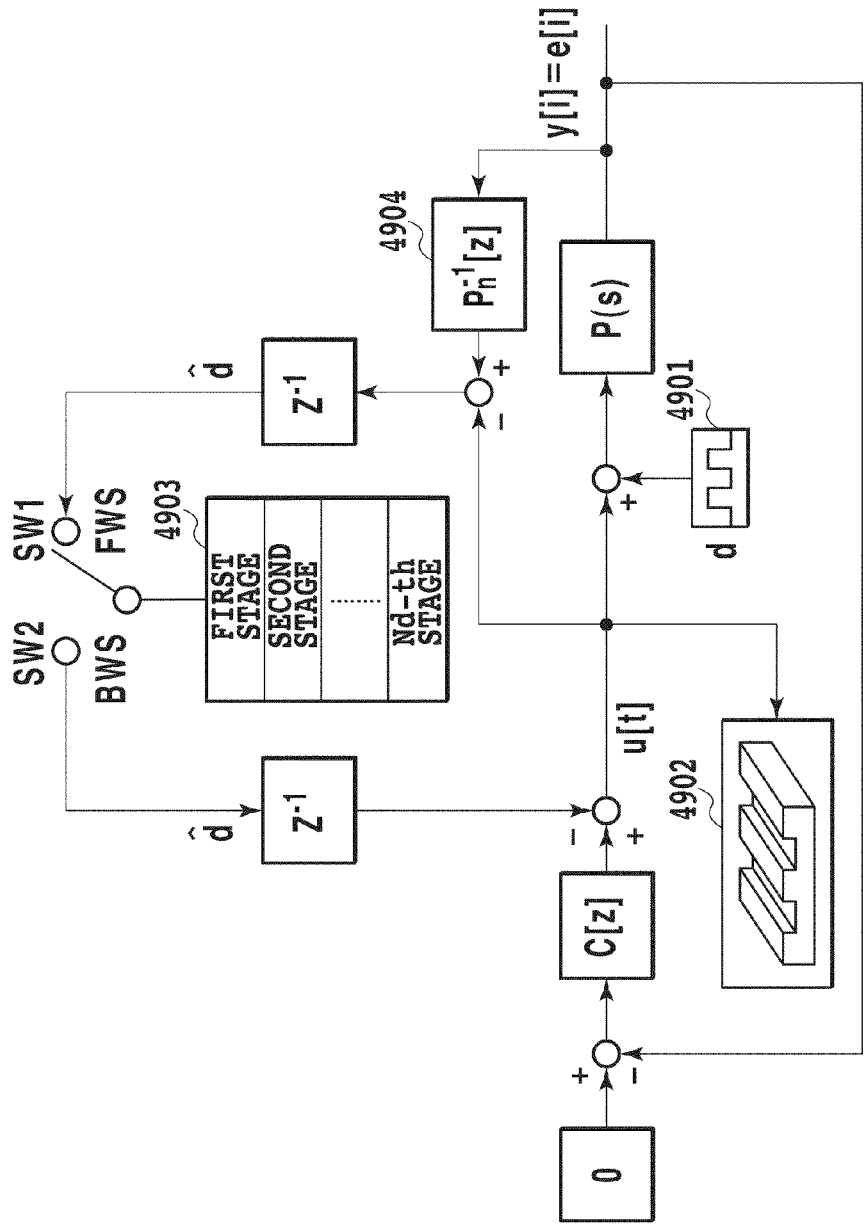
FIG. 49 is a block diagram of a surface topography learning observer (STLO)

FIG. 49 is a block diagram showing control performed by the STLO.

In the estimation blocks of the STLO shown in FIG. 49, a surface topography 4901 is input, and an estimated surface topography is stored in data storage means 4902. The block diagram shown in FIG. 49 is characterized in that a calculation 4904 includes the reciprocal $P^{-1}_n[z]$ of the discretized nominal plant $P_n[z]$.

In the STLO, the disturbance that estimated with one-sample delay based on the reverse system of the discretized plant;

$$\hat{d} \quad \text{[Expression 31]}$$

allows the SW1 to be kept on for T seconds during the FWS. The relevant data is saved to a stack memory 4903. During the BWS, the stack memory delays the output of the estimated disturbance by one sample. This enables the disturbance:

$$\hat{d} \quad \text{[Expression 32]}$$

during the BWS to be reduced for every sample point. In the STLO, if an error or a modeling error following compensation or a disturbance not present during the FWS is input during the BWS, this is compensated for by the feedback controller C[z].

Here, provided that the modeling error is small, the disturbance:

$$\hat{d} \quad \text{[Expression 33]}$$

estimated with one-sample delay is as follows:

[Expression 34]

$$\hat{d} = \frac{P(s)}{zP_n[z]}(1+\Delta)d \approx \frac{1}{z}d \qquad (18)$$

where $\Delta$ denotes a modeling error.

The reverse system of the nominal plant discretized with one-sample delay using the zeroth-order hold is derived from a discrete-time model. Using a (z) conversion for formulas (8), (9), and (10) results in a pulse transfer function expressed by:

[Expression 35]

$$G[z] = c_s(zI - A_c)^{-1}b_s \qquad (19)$$

According to formula (19), formula (17) is discretized, and the result is multiplied by 1/z. Then, the following is given.

[Expression 36]

$$\frac{1}{zP_n(z)} = \frac{z^2 + 1.163z + 0.3978}{8.907z^2 + 5.231z} \qquad (20)$$

Sampling time is 0.1 msec.

In the present embodiment, a low pass filter Q[z] with no phase delay is introduced in order to cut noise. This is called a Q filter (Non-Patent Document 16). When the input of:

$$\hat{d} \quad \text{[Expression 37]}$$

is defined as r[k] and an output from the Q filter is defined $r_f[k]$, a relation expression expressed by formula (21) holds true.

[Expression 38]

$$r_f[k] = \frac{z + \gamma + z^{-1}}{\gamma + 2} r[k] \qquad (21)$$

Figure 50:
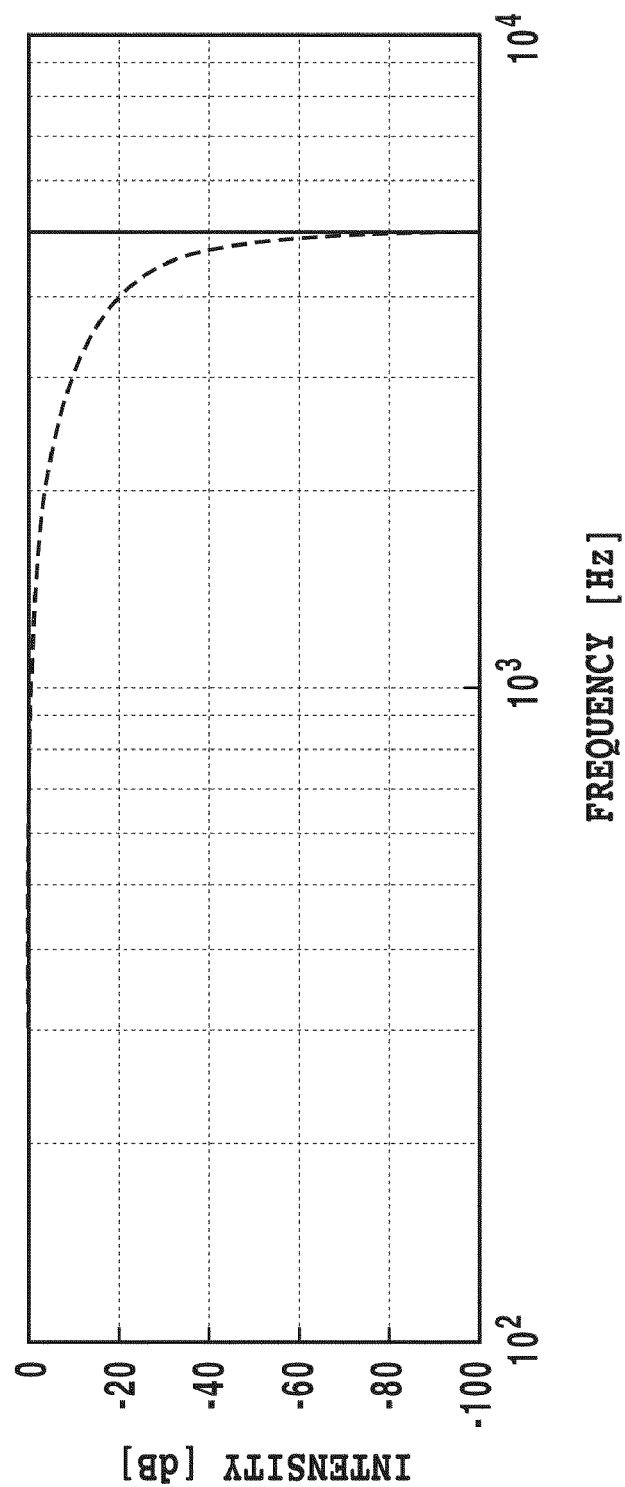
FIG. 50 is a diagram showing a frequency response from a Q filter.
Figure 51:
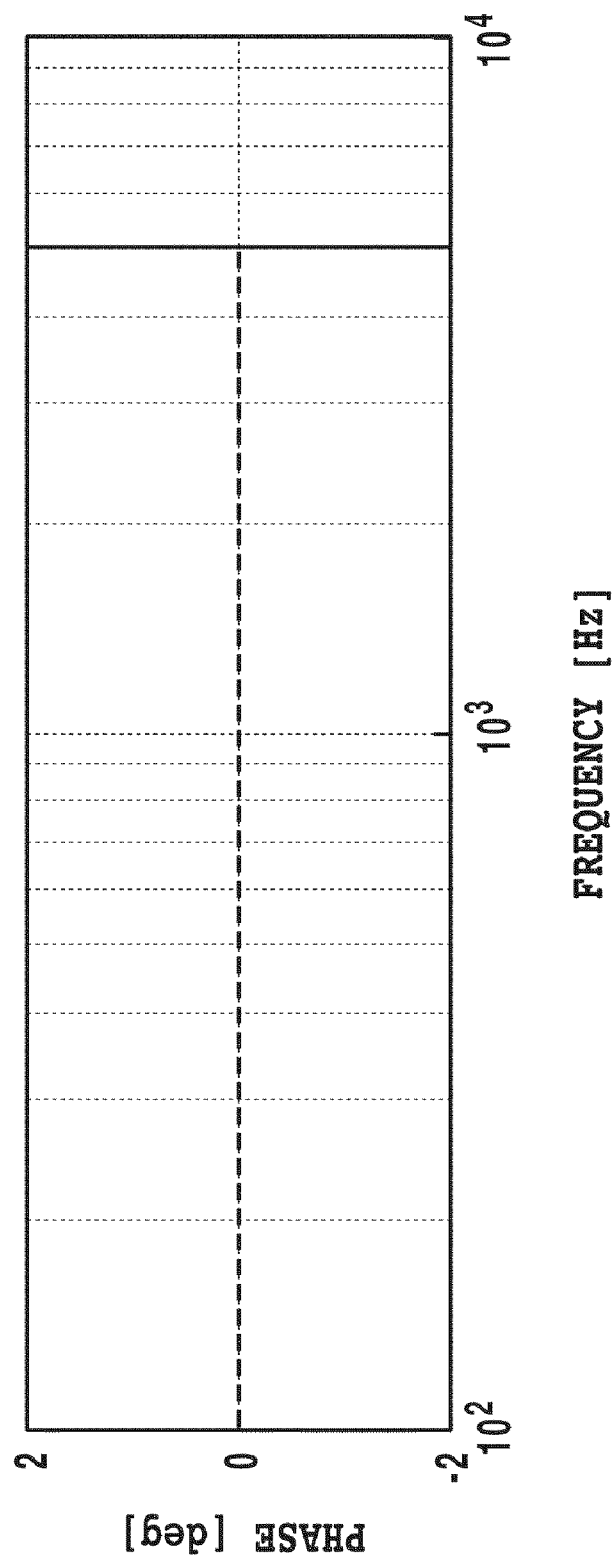
FIG. 51 is a diagram showing a frequency response from the Q filter.

Furthermore, a frequency response from the Q filter is shown in FIGS. 50 and 51.

(Simulation)

Figure 52:
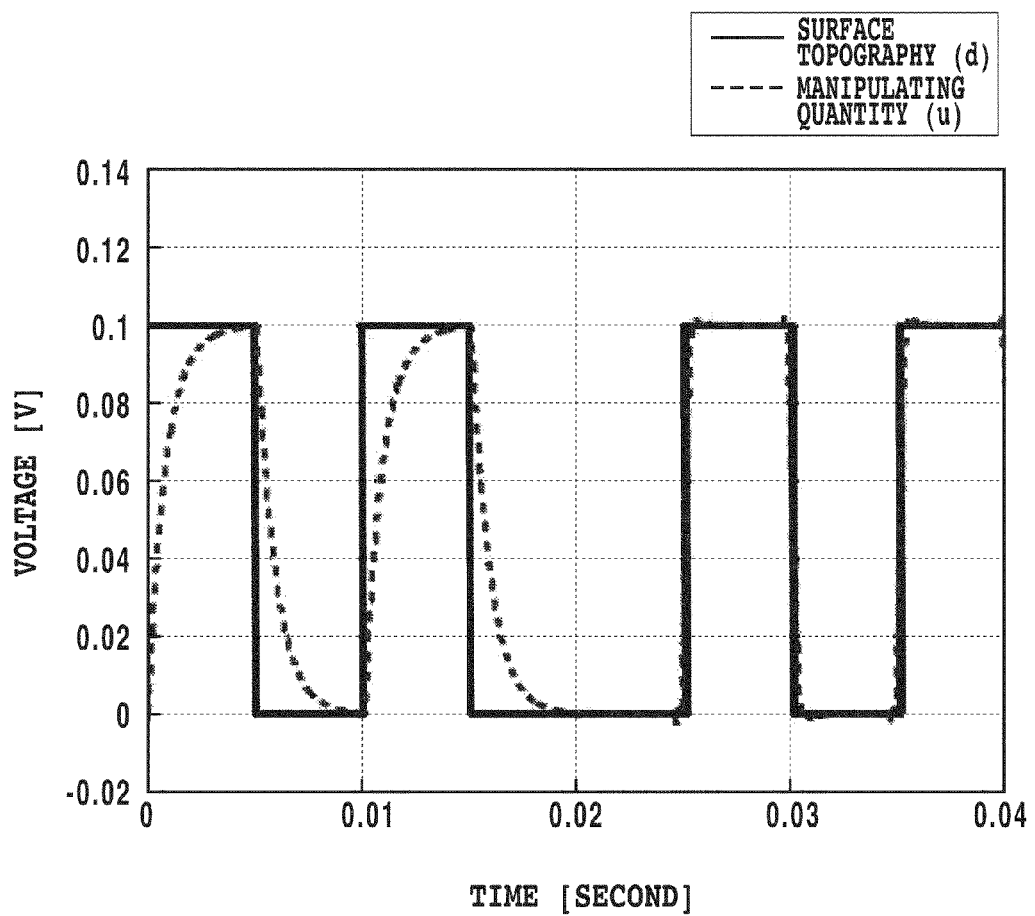
FIG. 52 is a diagram showing the results of simulation of scanning of a rectangular wave-like sample surface.
Figure 53:
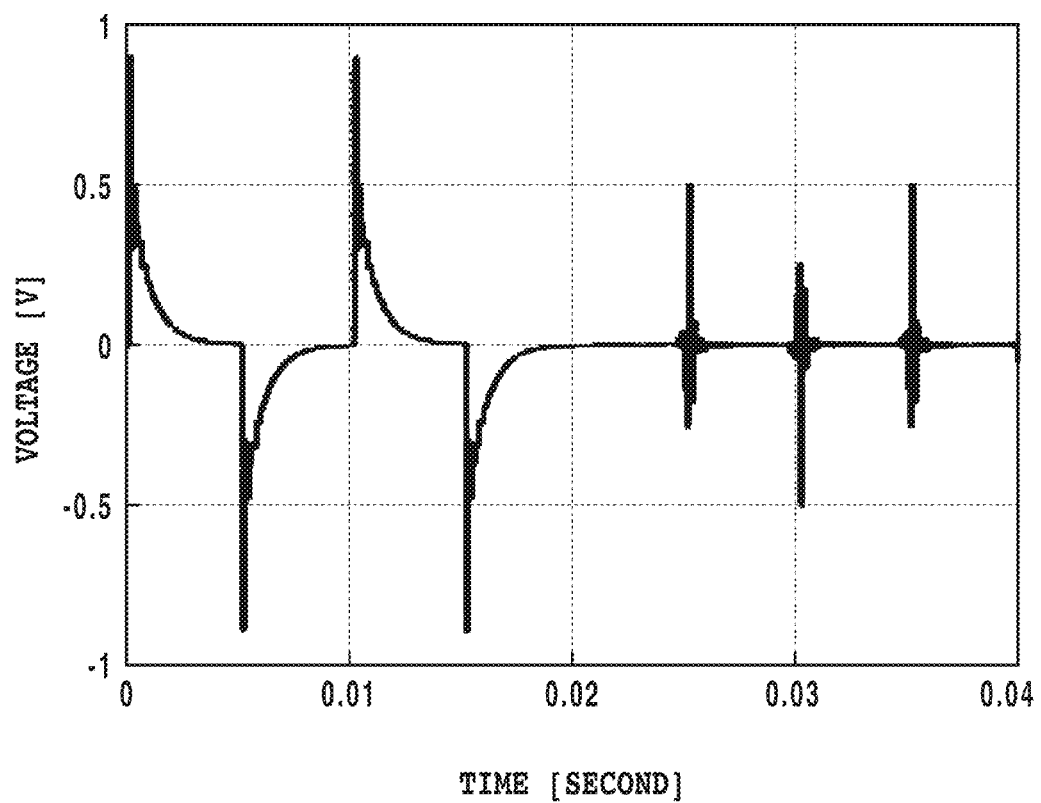
FIG. 53 is a diagram showing the results of simulation of scanning of the rectangular wave-like sample surface.

FIGS. 52 and 53 show the results of simulation in which a rectangular wave-like sample surface is scanned. In FIGS. 52 and 53, the period before 0.02 sec corresponds to the results of simulation of the conventional method, whereas the period after 0.02 sec corresponds to the results of simulation of the improved STL-PTC.

Here, FIG. 52 shows a temporal variation in the manipulating quantity u(t) of the piezo. FIG. 53 shows a temporal variation in output signal y(t).

Figure 54:
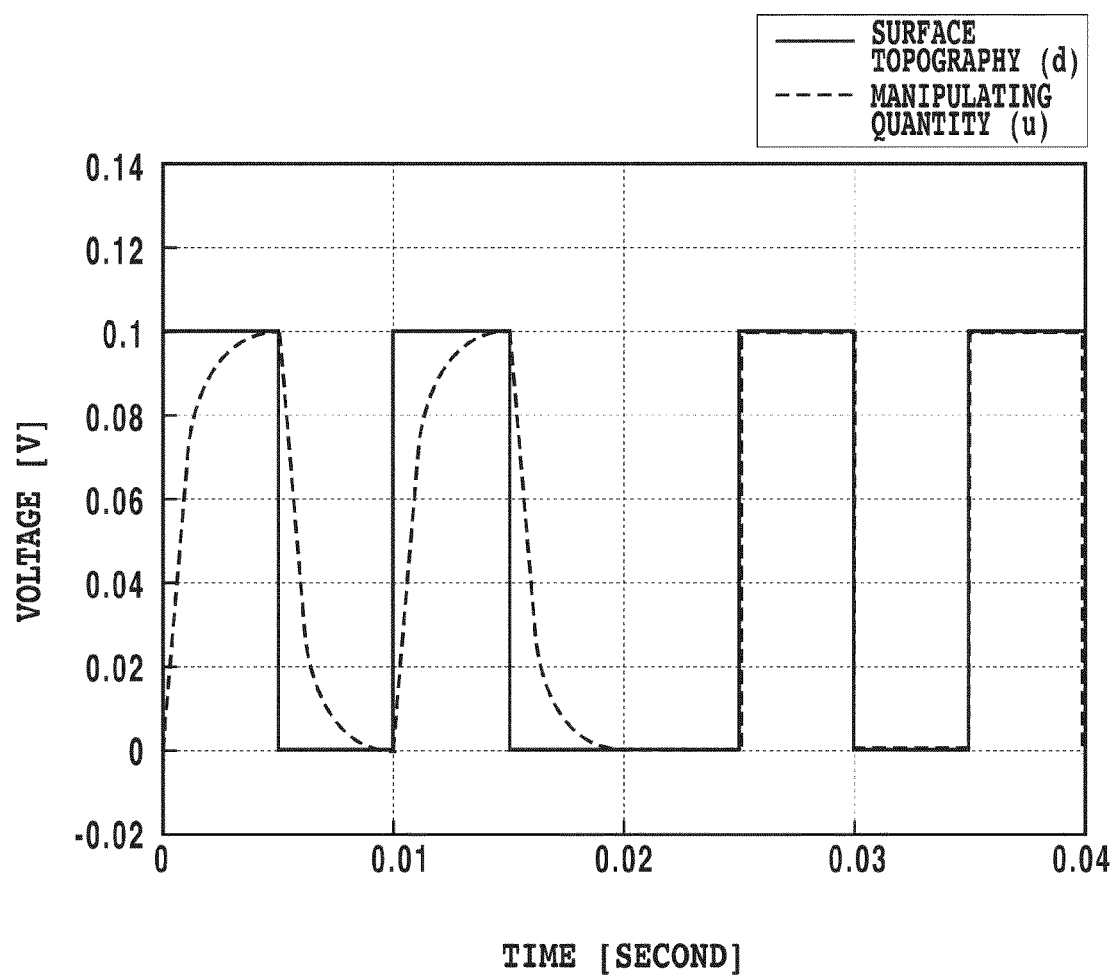
FIG. 54 is a diagram showing the results of simulation of scanning of the rectangular wave-like sample surface.
Figure 55:
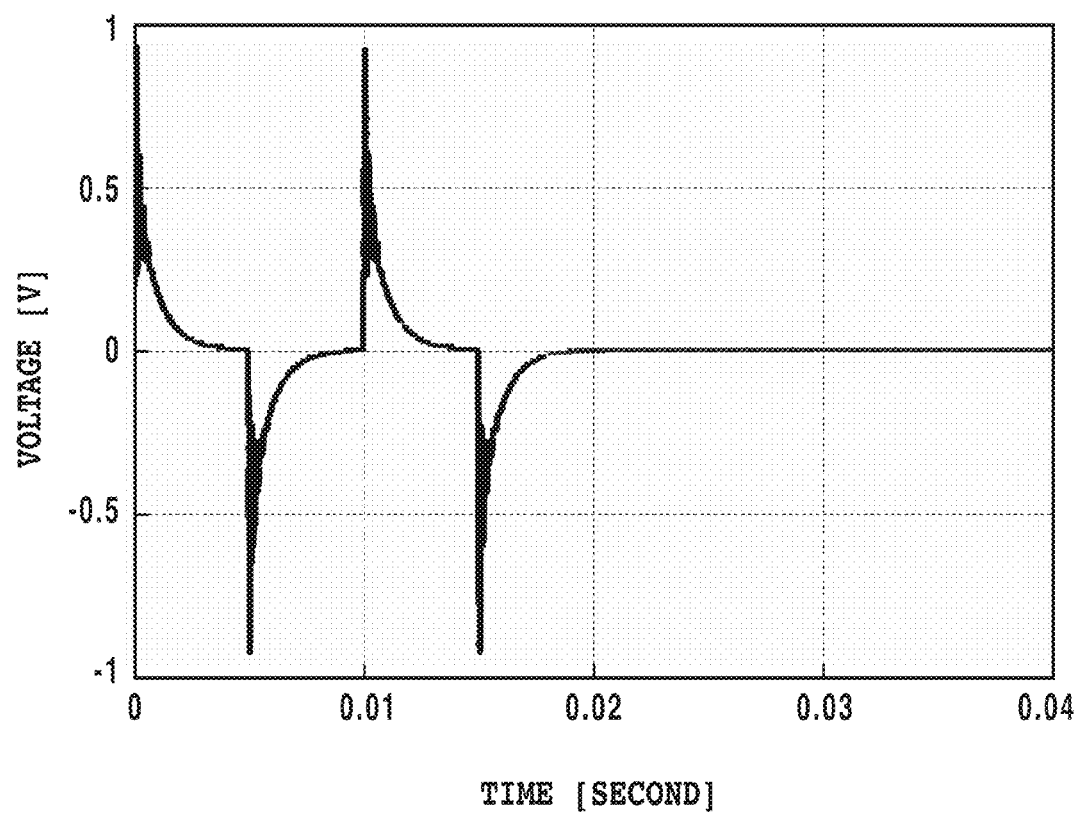
FIG. 55 is a diagram showing the results of simulation of scanning of the rectangular wave-like sample surface.

Furthermore, FIGS. 54 and 55 show the results of simulation in which a rectangular wave-like sample surface is scanned. In FIGS. 54 and 55, the period before 0.02 sec corresponds to the results of simulation of the conventional method, whereas the period after 0.02 sec corresponds to the results of simulation of the STLO.

Here, FIG. 54 shows a temporal variation in the manipulating quantity u(t) of the piezo. FIG. 55 shows a temporal variation in output signal y(t).

In the improved STL-PTC, the sampling time $T_r$ for the command value (the signal saved to the stack memory for learning) is 0.2 msec (milliseconds ($10^{-3}$ seconds)). Thus, the compensation fails to be achieved between the sample points for the sampling time $T_y$ (0.1 msec) for the output signal. Consequently, in FIG. 53, an error occurs after 0.02 sec. Moreover, the disturbance forms a step to affect the plant. Thus, the signal:

$$P(s)\hat{d} \quad \text{[Expression 39]}$$

learned during the FWS disadvantageously degrades the signal for the BWS. However, six Q filters are installed along the target trajectory to reduce this adverse effect.

In contrast, the STLO performs control such that the disturbance:

$$\hat{d} \quad \text{[Expression 40]}$$

is cancelled at the same time $T_y$ as that for the output signal, preventing a possible error between the sample points. Thus, such results as shown in FIG. 55 are obtained.

(Observation of the Grating Element)

Figure 56:
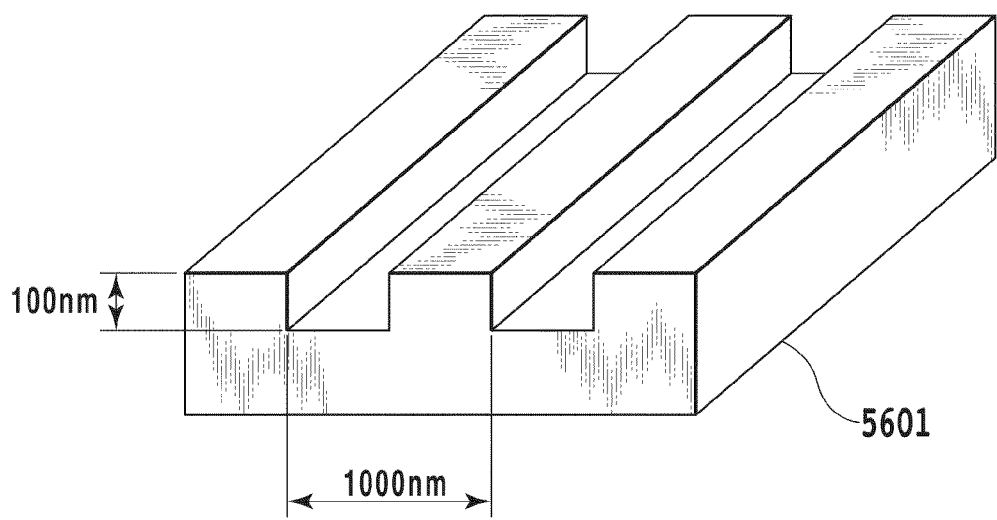
FIG. 56 is a diagram showing the shape of a grating element.

In sample observations with the AFM according to the present embodiment, the sample is, by way of example, a planar brazed holographic grating standard article manufactured by Shimadzu Corporation. The grating element is shaped like a rectangular wave, and includes a glass substrate of resin with grating grooves formed therein. The grooves are coated with a reflection film of Al or the like. FIG. 56 shows the shape and size of a grating element 5601 observed with the AFM according to the present embodiment.

Figure 64:
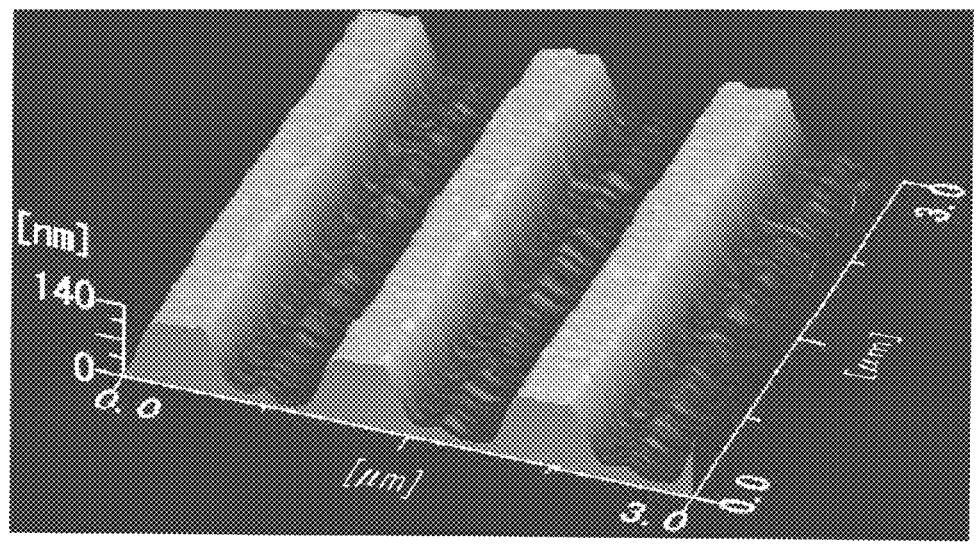
FIG. 64 is a diagram showing an image of a sample measured with the AFM.

FIG. 64 shows an image obtained by allowing the AFM to scan the surface of the grating element 5601 using the conventional method.

Figure 65:
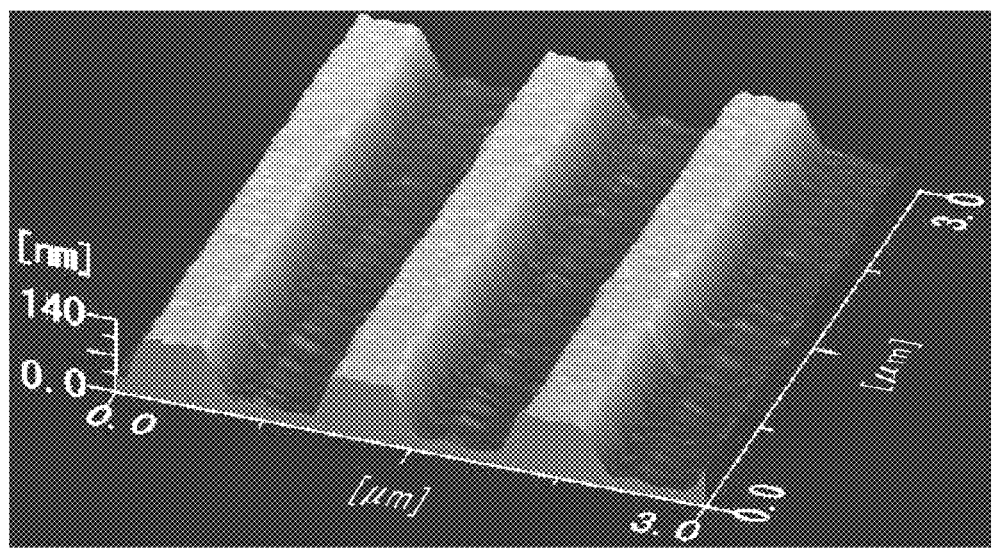
FIG. 65 is a diagram showing an image of the sample measured with the AFM.

FIG. 65 shows an image obtained by allowing the AFM to scan the surface of the grating element 5601 using the STO.

Figure 66:
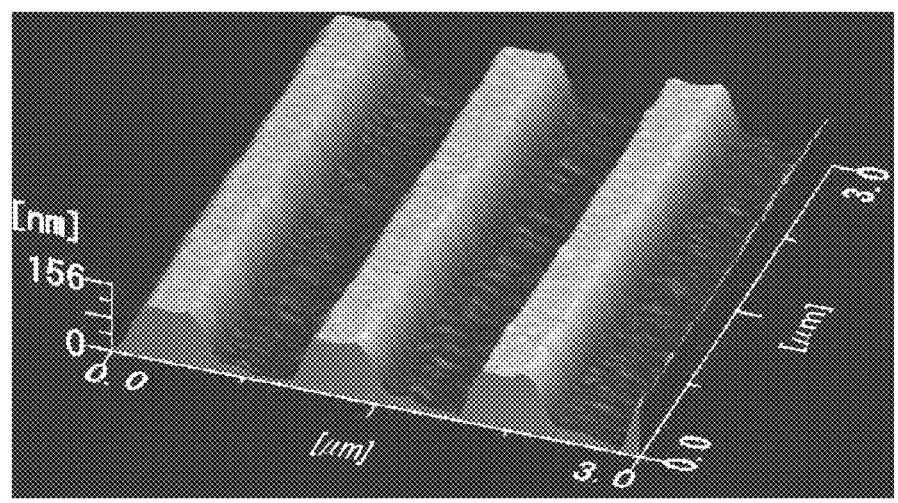
FIG. 66 is a diagram showing an image of the sample measured with the AFM.

FIG. 66 shows an image obtained by allowing the AFM to scan the surface of the grating element 5601 using the improved STL-PTC.

Figure 67:
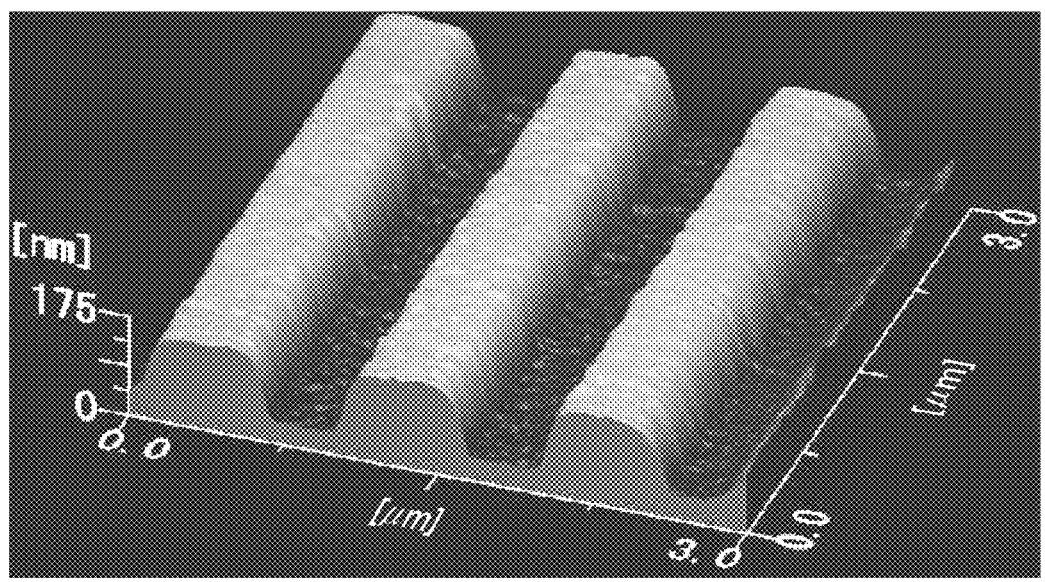
FIG. 67 is a diagram showing an image of the sample measured with the AFM.

FIG. 67 shows an image obtained by allowing the AFM to scan the surface of the grating element 5601 using the STLO.

Figure 68:
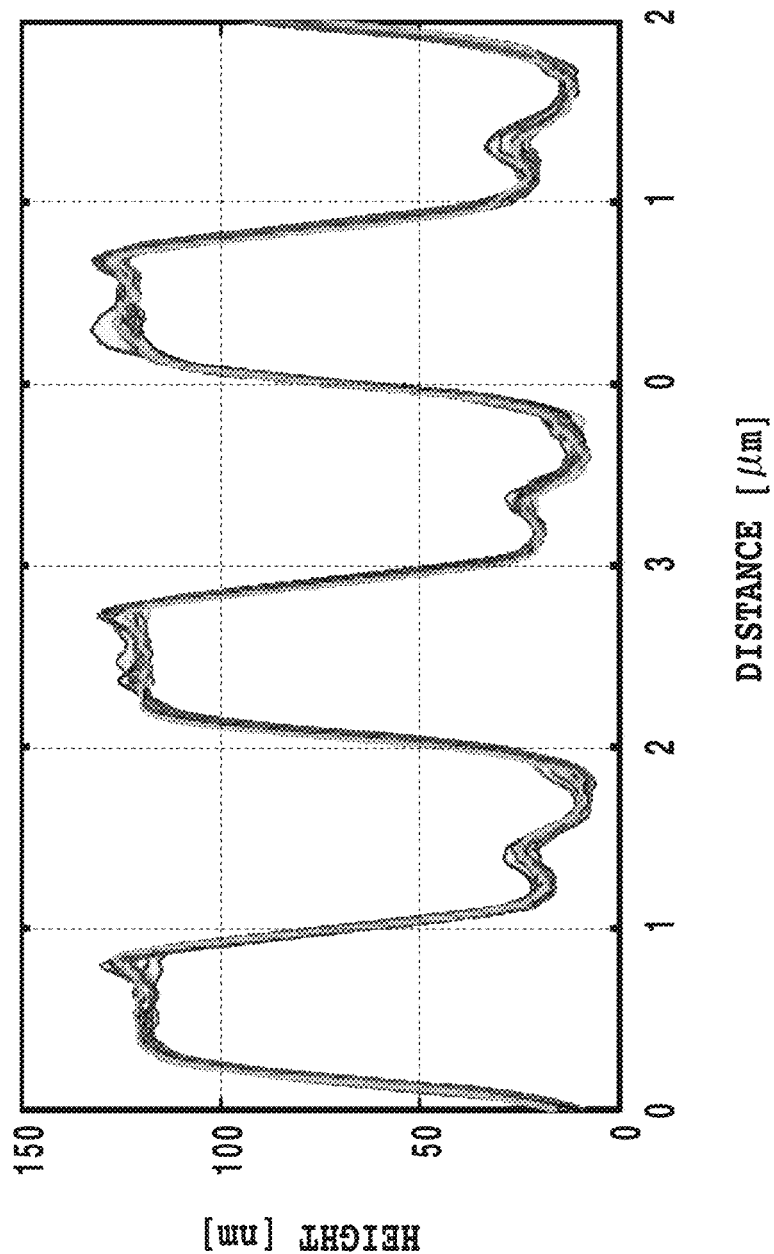
FIG. 68 is a diagram showing the sectional waveform of the sample measured with the AFM.

FIG. 68 shows a sectional waveform obtained by allowing the AFM to scan the surface of the grating element 5601 using the conventional method.

Figure 69:
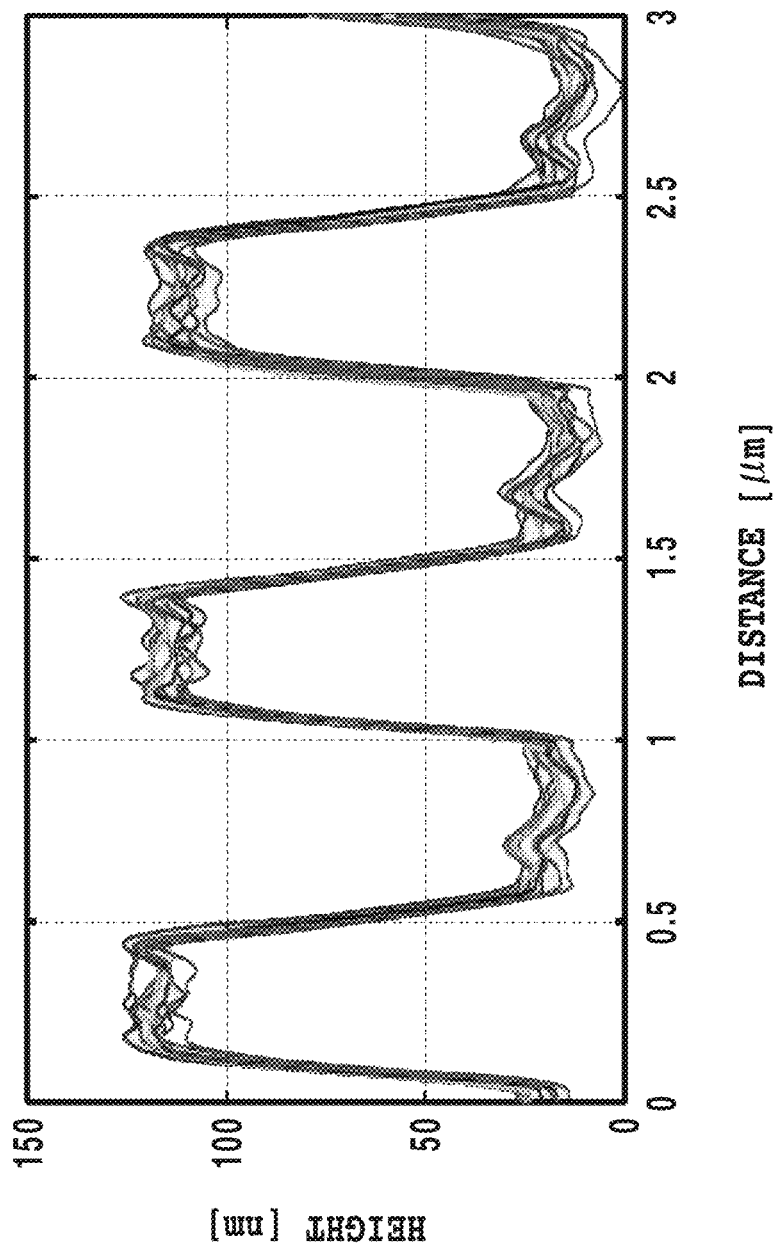
FIG. 69 is a diagram showing the sectional waveform of the sample measured with the AFM.

FIG. 69 shows a sectional waveform obtained by allowing the AFM to scan the surface of the grating element 5601 using the STO.

Figure 70:
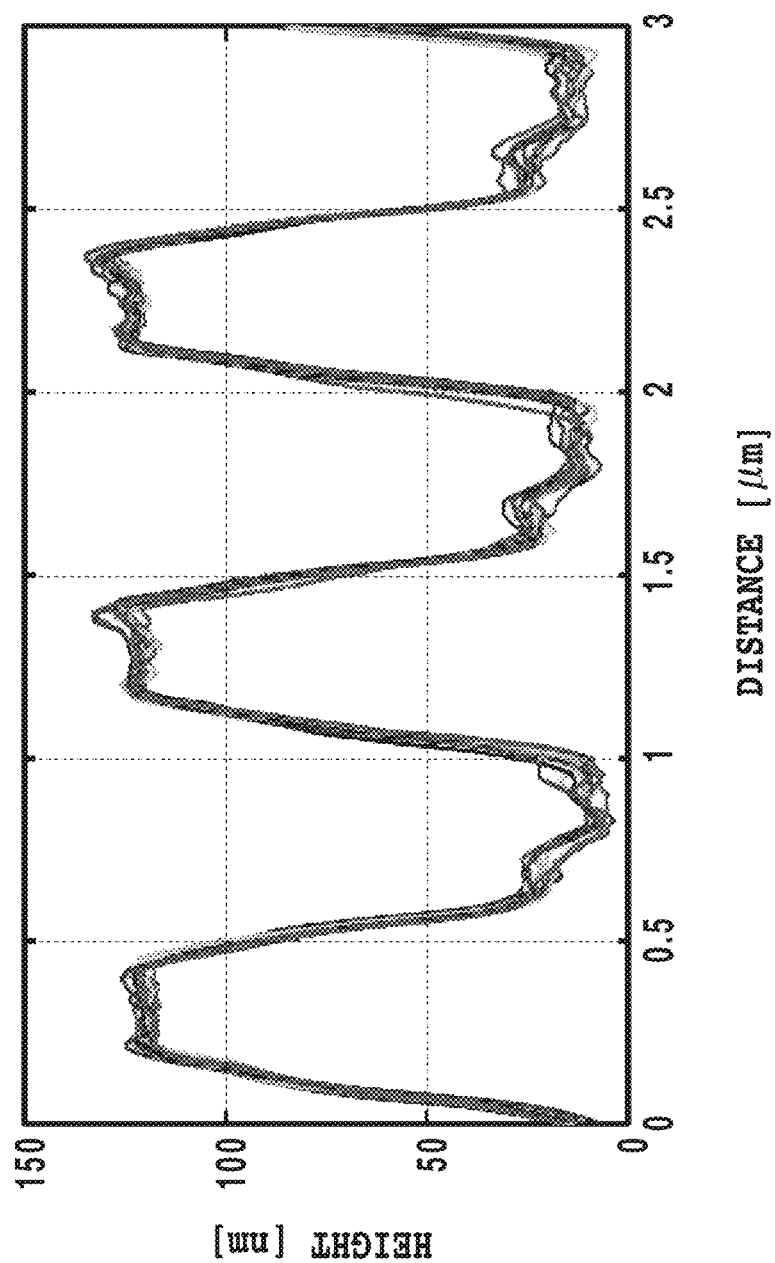
FIG. 70 is a diagram showing the sectional waveform of the sample measured with the AFM.

FIG. 70 shows a sectional waveform obtained by allowing the AFM to scan the surface of the grating element 5601 using the improved STL-PTC.

Figure 71:
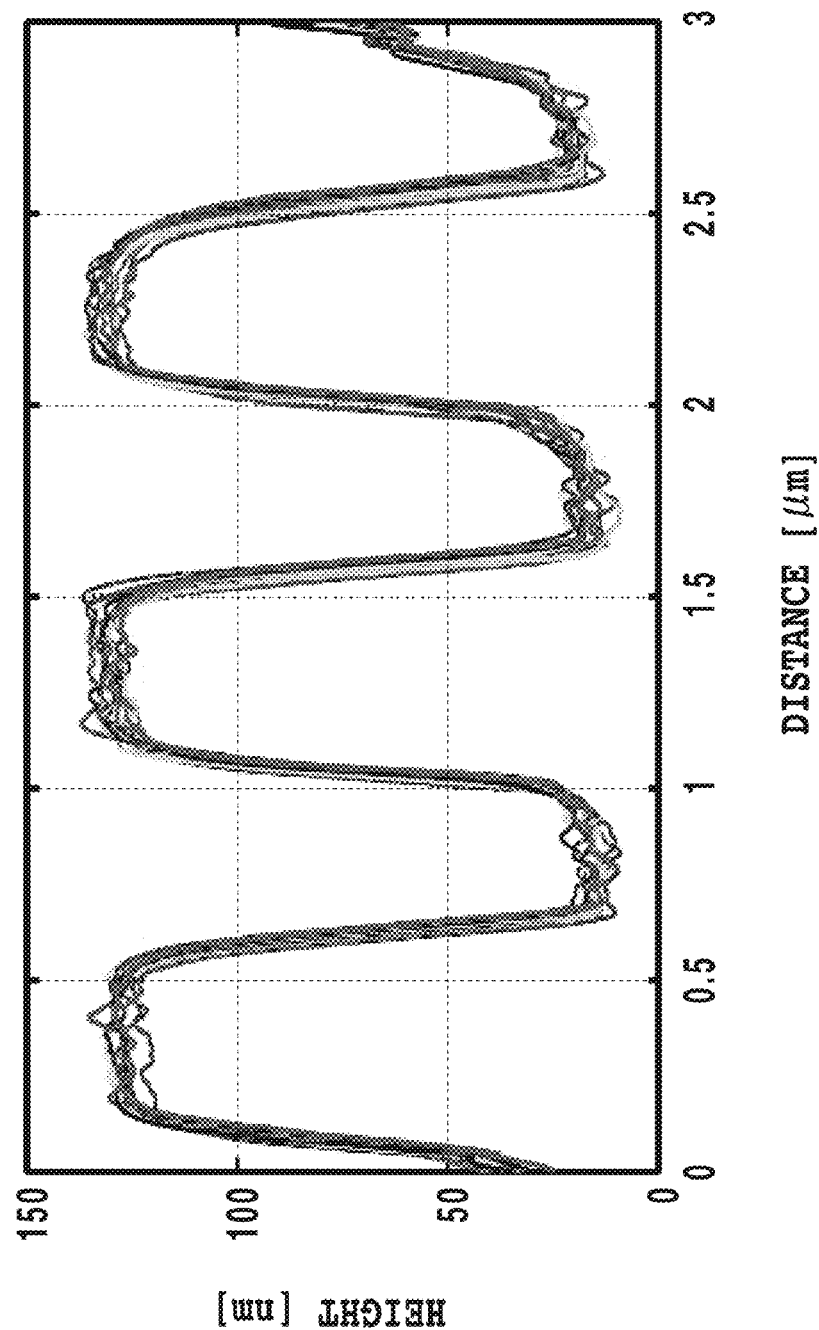
FIG. 71 is a diagram showing the sectional waveform of the sample measured with the AFM.

FIG. 71 shows a sectional waveform obtained by allowing the AFM to scan the surface of the grating element 5601 using the STLO.

In FIGS. 65 and 69, the poles of the low pass filter of the STO are at 2,000 Hz. Furthermore, in FIG. 64 to FIG. 67, the scan range of the AFM is 5.5 μm×5.5 μm (FIG. 64 to FIG. 67 are enlarged views of a scan area of 3 μm×3 μm). In FIG. 64 to FIG. 71, the scanning speed of the AFM is 32.2 μm/sec.

Figure 72:
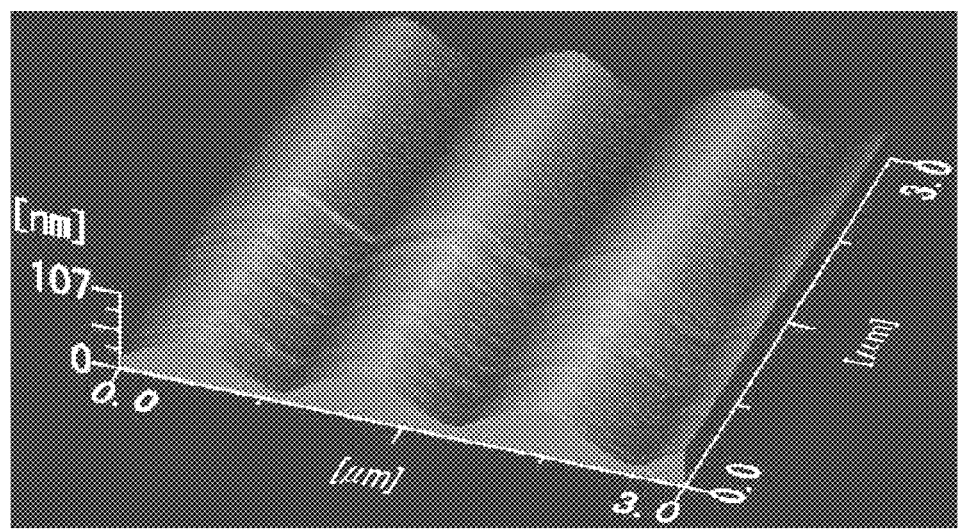
FIG. 72 is a diagram showing an image of a sample measured with the AFM.

FIG. 72 shows an image obtained by allowing the AFM to scan the surface of the grating element 5601 using the conventional method.

Figure 73:
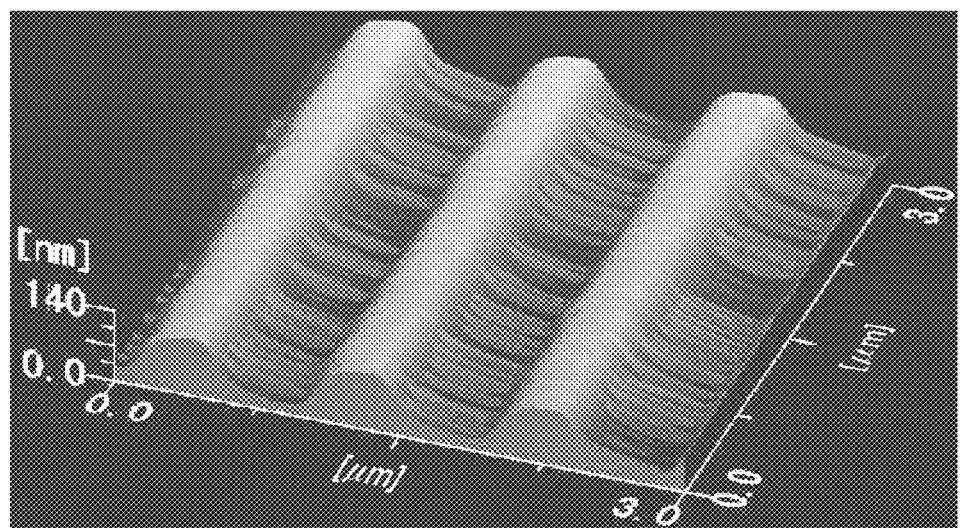
FIG. 73 is a diagram showing an image of the sample measured with the AFM.

FIG. 73 shows an image obtained by allowing the AFM to scan the surface of the grating element 5601 using the STO.

Figure 74:
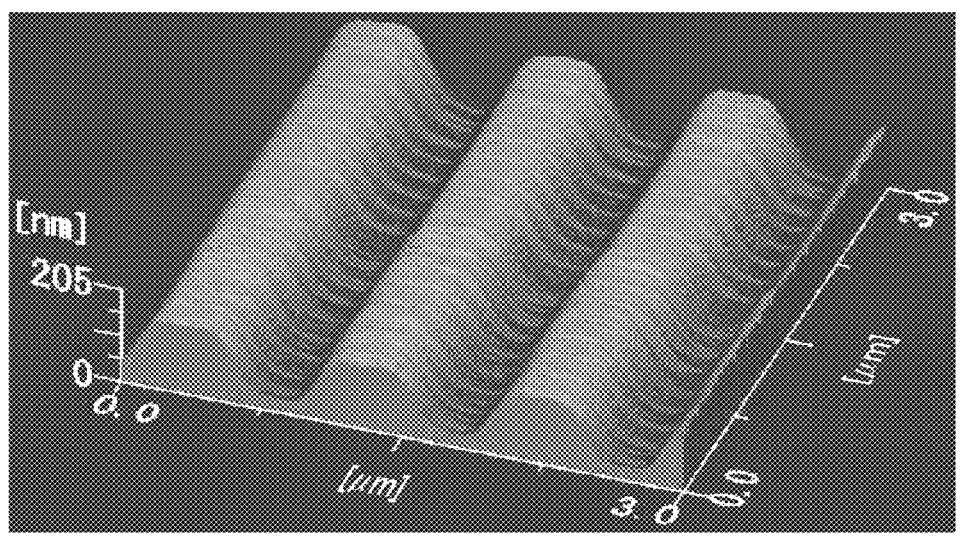
FIG. 74 is a diagram showing an image of the sample measured with the AFM.

FIG. 74 shows an image obtained by allowing the AFM to scan the surface of the grating element 5601 using the improved STL-PTC.

Figure 75:
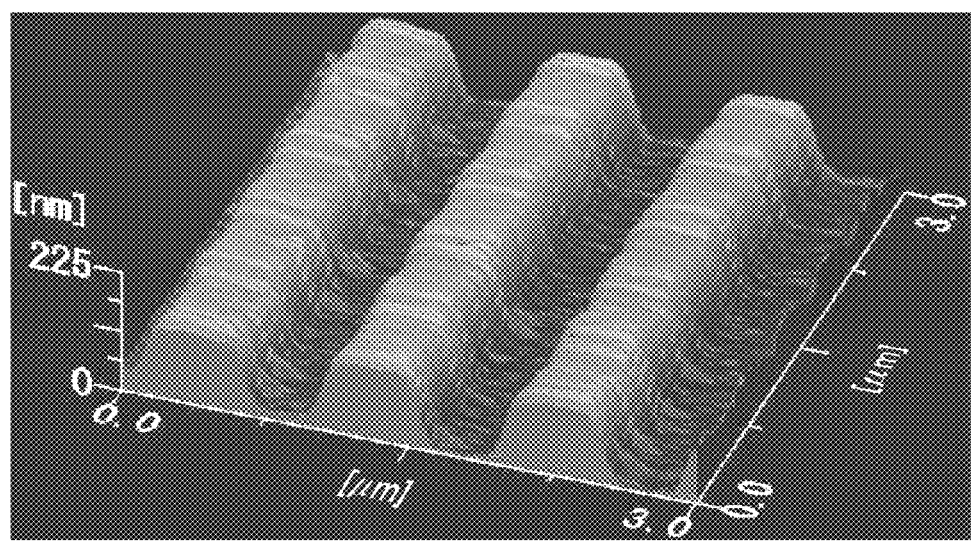
FIG. 75 is a diagram showing an image of the sample measured with the AFM.

FIG. 75 shows an image obtained by allowing the AFM to scan the surface of the grating element 5601 using the STLO.

Figure 76:
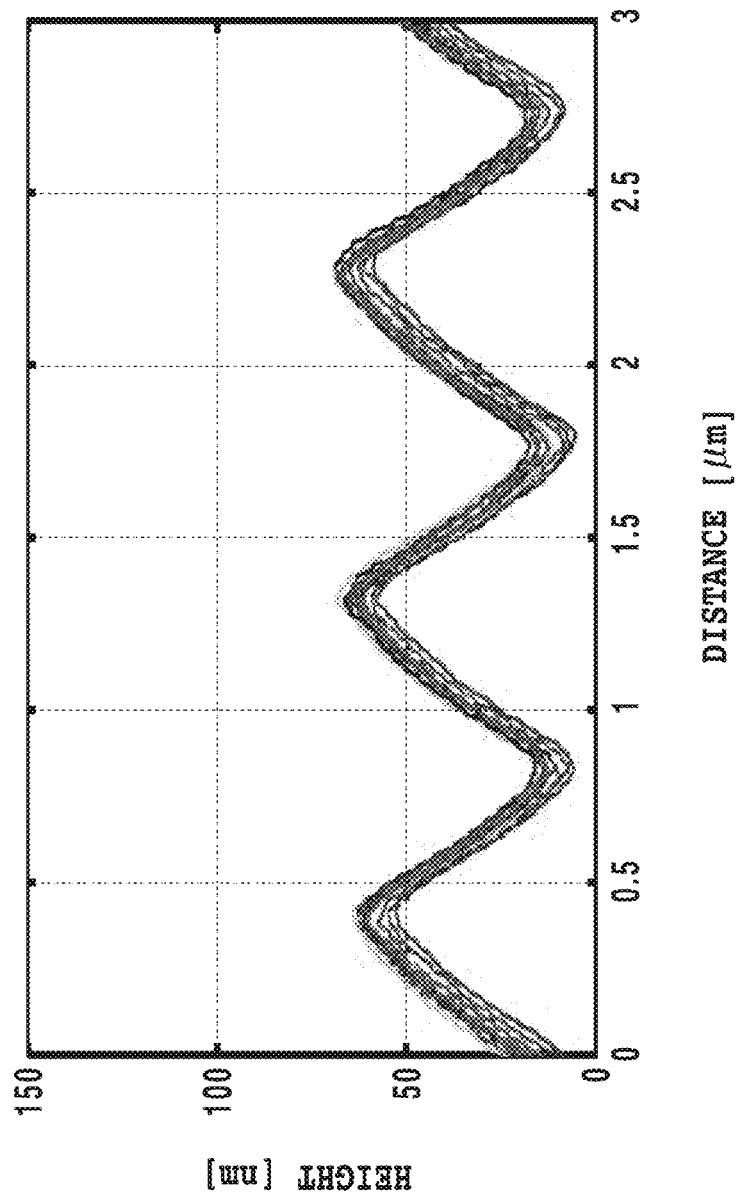
FIG. 76 is a diagram showing the sectional waveform of the sample measured with the AFM.

FIG. 76 shows a sectional waveform obtained by allowing the AFM to scan the surface of the grating element 5601 using the conventional method.

Figure 77:
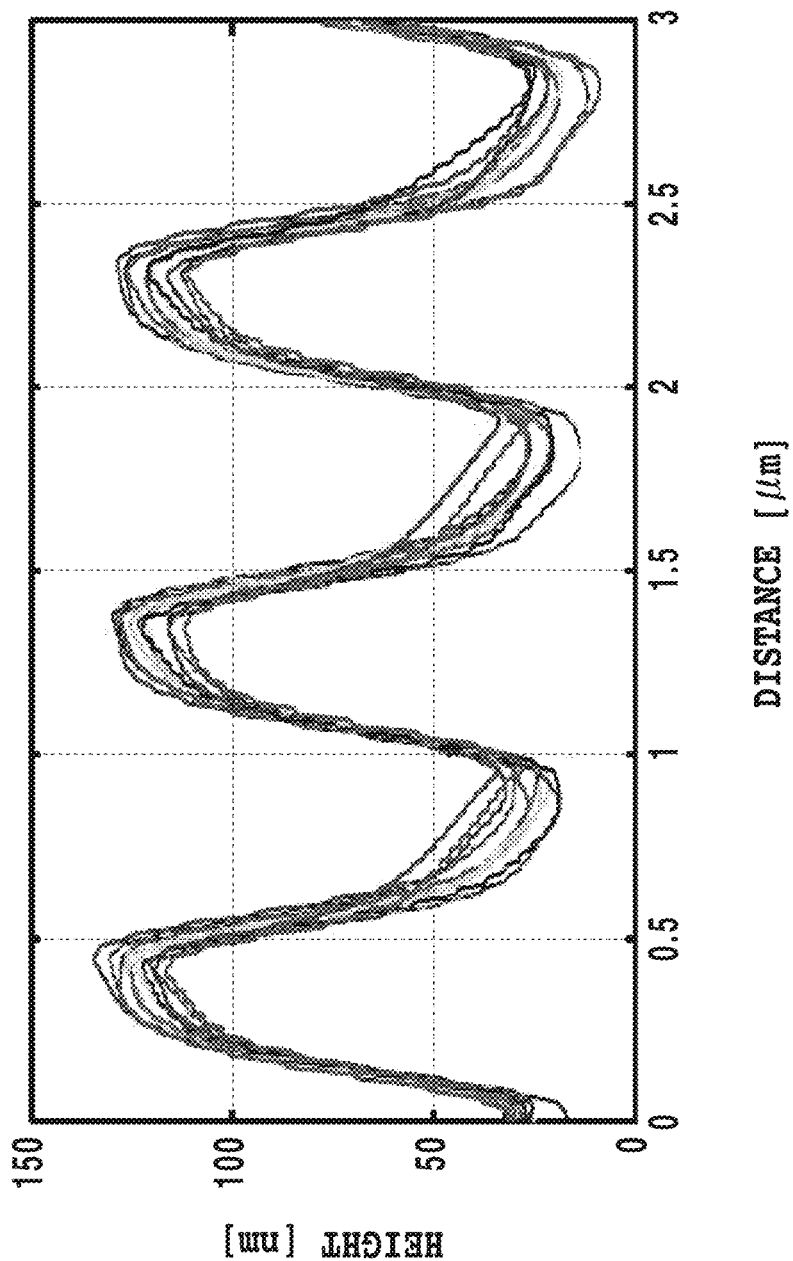
FIG. 77 is a diagram showing the sectional waveform of the sample measured with the AFM.

FIG. 77 shows a sectional waveform obtained by allowing the AFM to scan the surface of the grating element 5601 using the STO.

Figure 78:
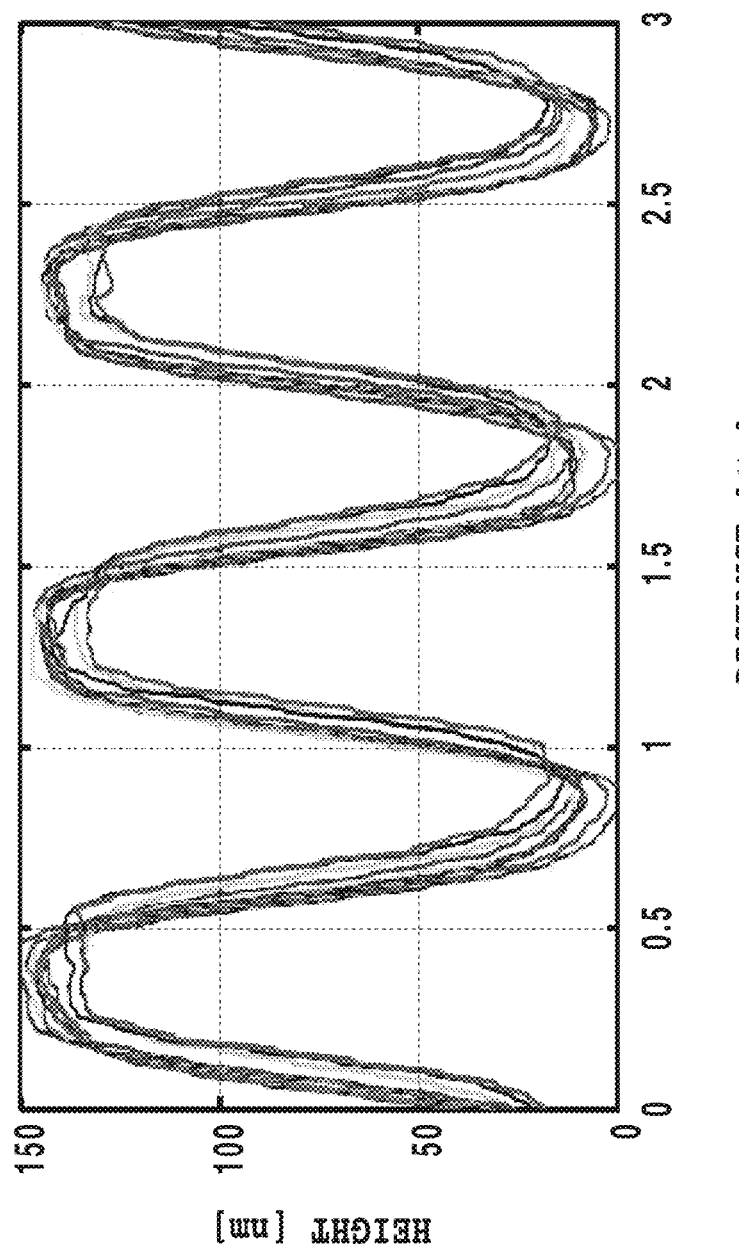
FIG. 78 is a diagram showing the sectional waveform of the sample measured with the AFM.

FIG. 78 shows a sectional waveform obtained by allowing the AFM to scan the surface of the grating element 5601 using the improved STL-PTC.

Figure 79:
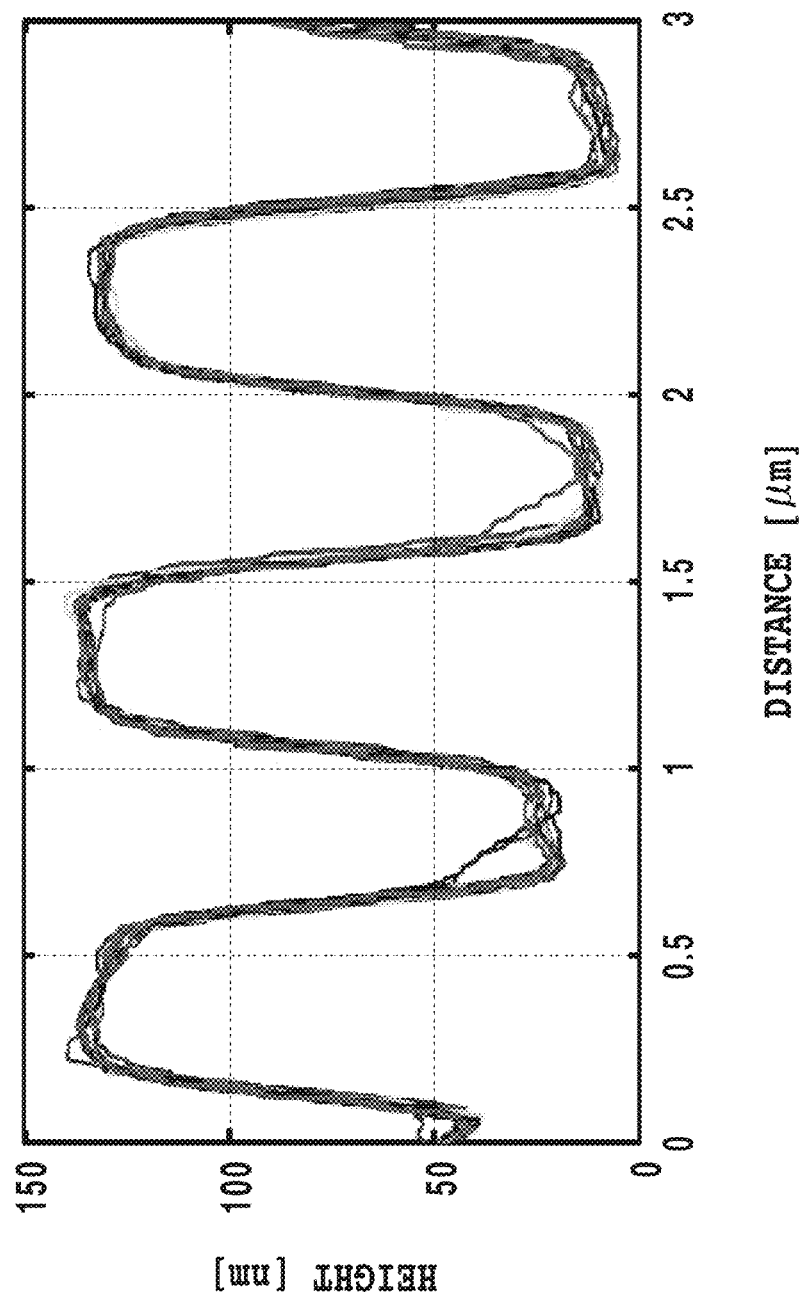
FIG. 79 is a diagram showing the sectional waveform of the sample measured with the AFM.

FIG. 79 shows a sectional waveform obtained by allowing the AFM to scan the surface of the grating element 5601 using the STLO.

In FIGS. 73 and 77, the poles of the low pass filter of the STO are at 2,000 Hz. Furthermore, in FIG. 72 to FIG. 75, the scan range of the AFM is 5.5 μm×5.5 μm (FIG. 72 to FIG. 75 are enlarged views of a scan area of 3 μm×3 μm). In FIG. 72 to FIG. 79, the scanning speed of the AFM is 322 μm/sec.

A comparison of FIG. 64 (FIG. 68) with FIG. 72 (FIG. 76) indicates that with the conventional method, increasing the scanning speed of the AFM significantly degrades the image. Furthermore, a comparison of FIG. 72 (FIG. 76) with FIG. 73 (FIG. 77) indicates that with the STO, the degradation of the image is reduced even with an increase in the scanning speed of the AFM. However, FIG. 73 indicates that when the scanning speed of the AFM is increased for high-speed scanning, then even with the STO, the high-speed scanning causes the tracking capability of the u(t) to be significantly degraded. In this case, the modeling error increases, preventing the rectangular wave-like shape from being accurately shaped.

In contrast, FIG. 74 (FIG. 78) indicates that the surface topography imaged by the improved STL-PTC is nearer rectangular than that imaged by the STO. This is expected to be because the feedforward compensation reduces possible error signals to improve the tracking capability of the u (t). However, even with the improved STL-PTC, the modeling error and the inter-sample-point response make the surface topography in the image appear larger than the actual one having the desired pitch.

On the other hand, the STLO cancels the disturbance in a feedforward manner based on the estimated one. Thus, the STLO compensates for the modeling error through feedback to improve the tracking capability of the u(t) compared to the improved STL-PTC. Consequently, FIG. 75 (FIG. 79) shows that the STLO allows the rectangular wave-like shape to be accurately imaged.

To quantitatively evaluate the reduction of possible error signals, FIG. 57 shows ±3α for the conventional method, the improved STL-PTC, and the STLO. The standard deviation indicates evaluation for error signals obtained through about 100 scans.

FIG. 58 to FIG. 63 show waveforms each obtained by superimposing the above-described error signals on one another.

Figure 58:
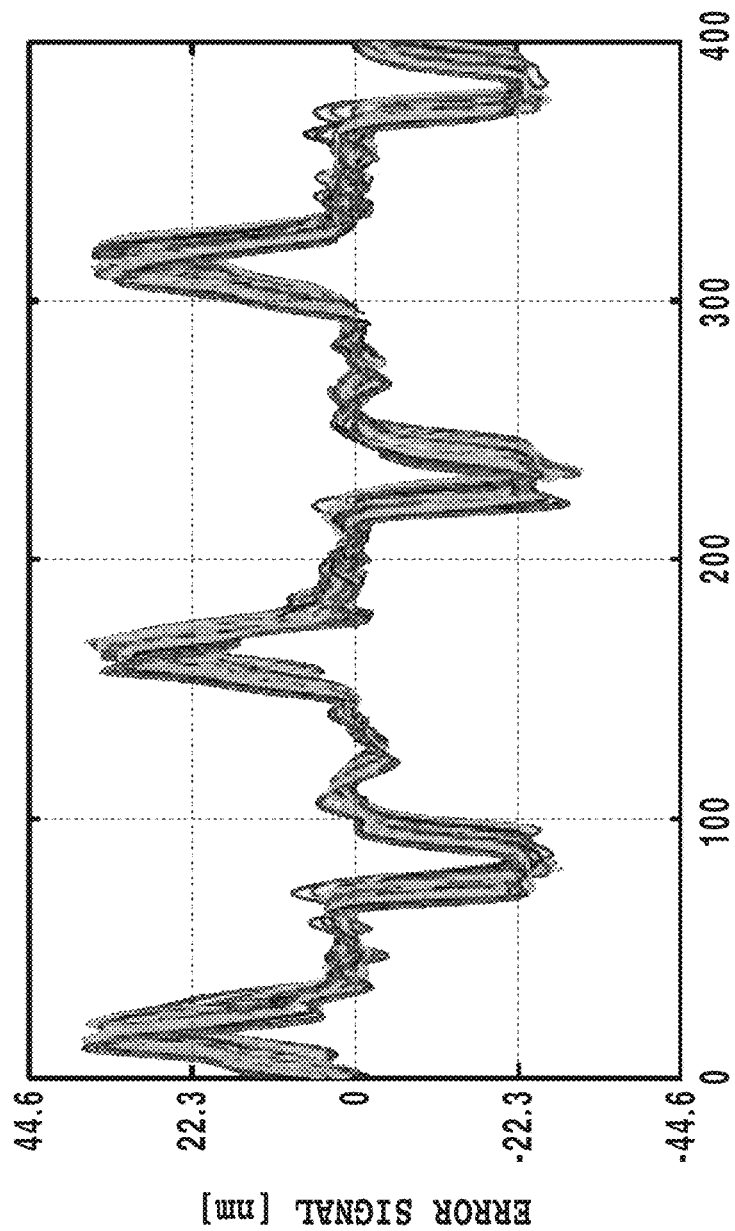
FIG. 58 is a diagram showing a waveform in which error signals are superimposed on one another.
Figure 59:
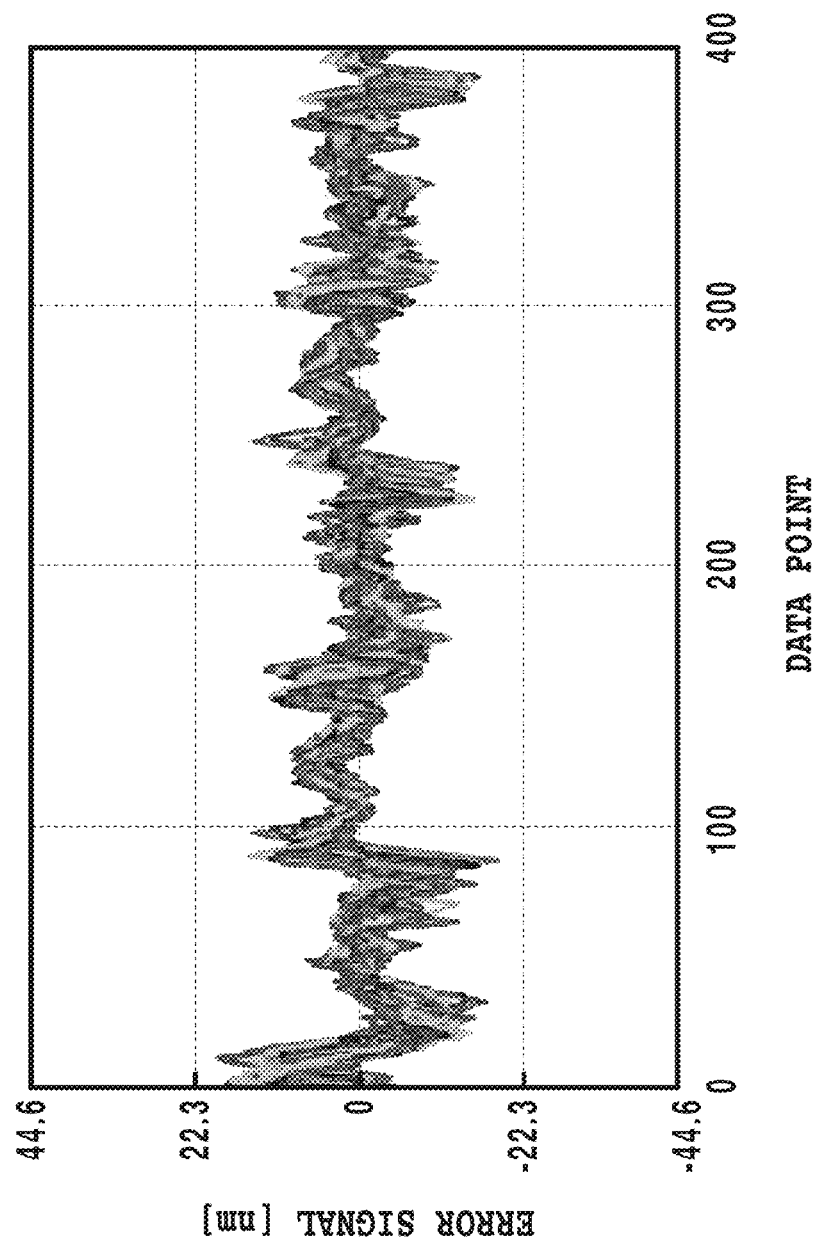
FIG. 59 is a diagram showing a waveform in which error signals are superimposed on one another.
Figure 60:
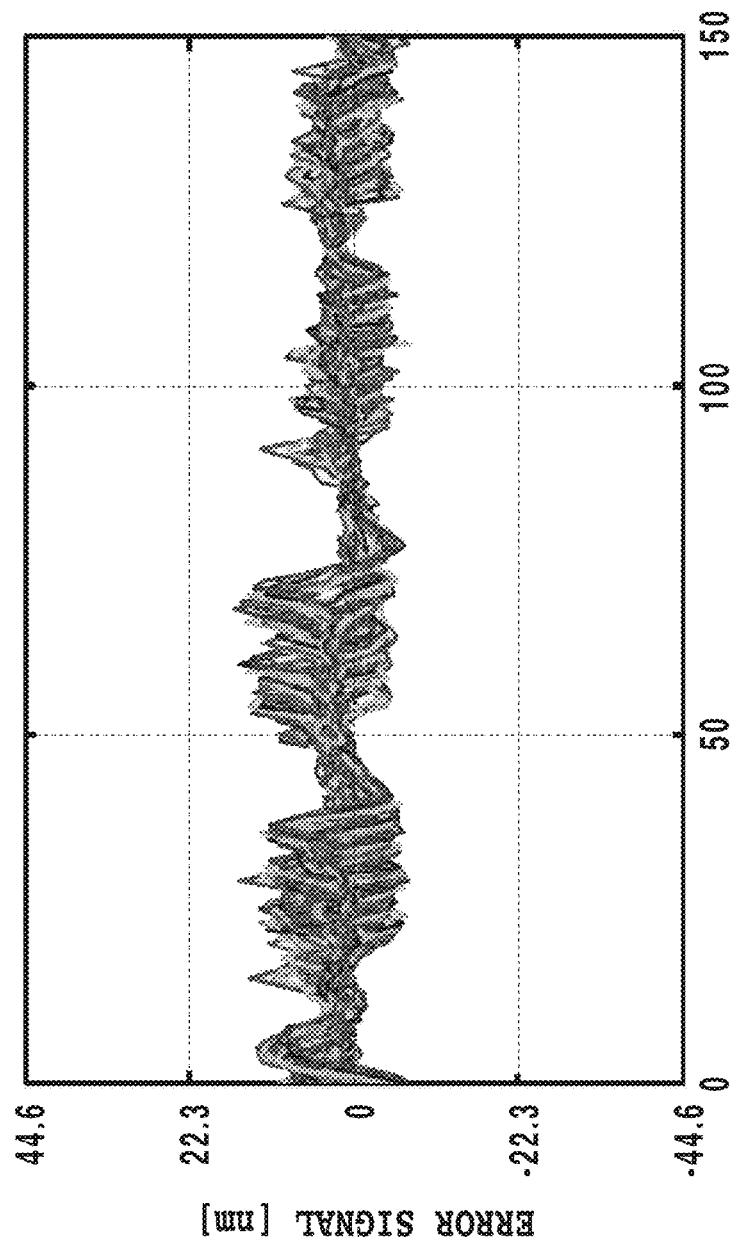
FIG. 60 is a diagram showing a waveform in which error signals are superimposed on one another.

FIG. 58 to FIG. 60 show error signals obtained when the scanning speed of the AFM is 32.2 μm/sec. FIG. 58 shows error signals obtained when the AFM uses the conventional method. FIG. 59 shows error signals obtained when the AFM uses the improved STL-PTC. FIG. 60 shows error signals obtained when the AFM uses the STLO.

Figure 61:
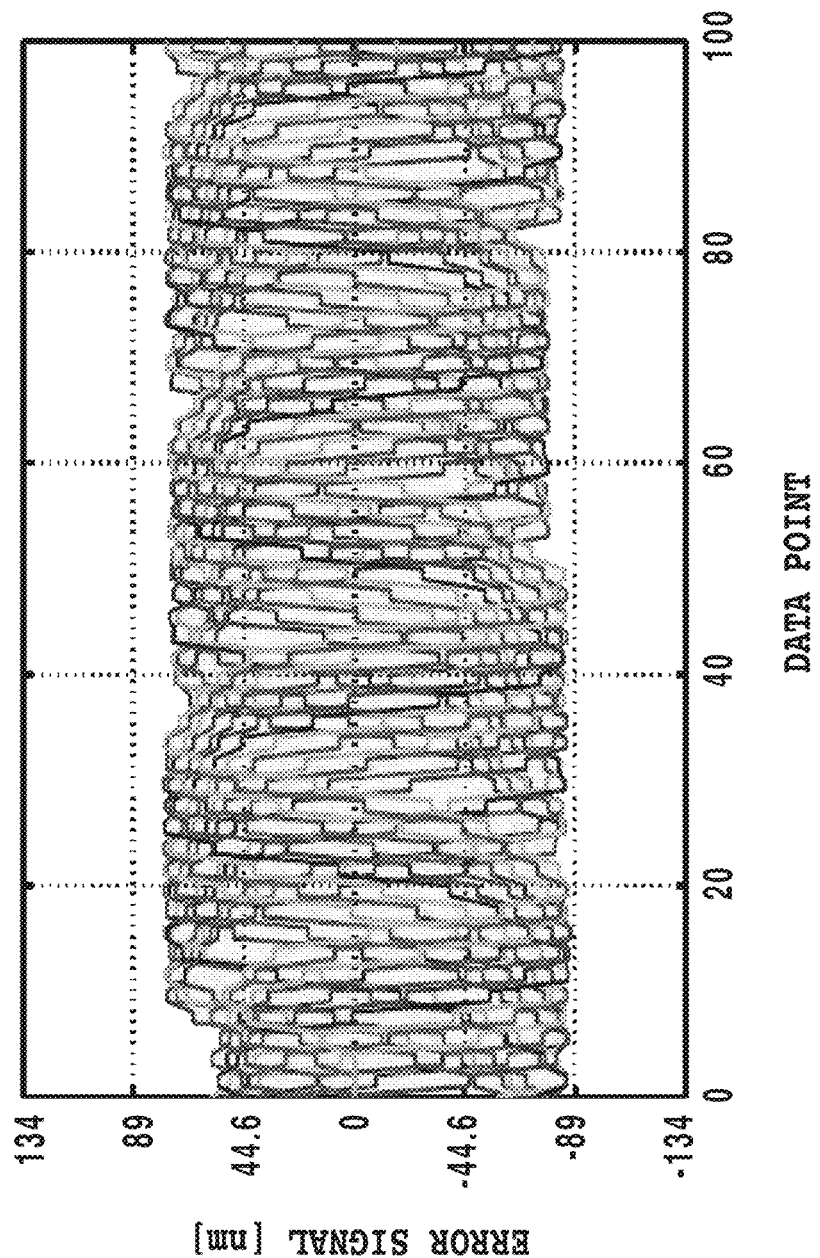
FIG. 61 is a diagram showing a waveform in which error signals are superimposed on one another.
Figure 62:
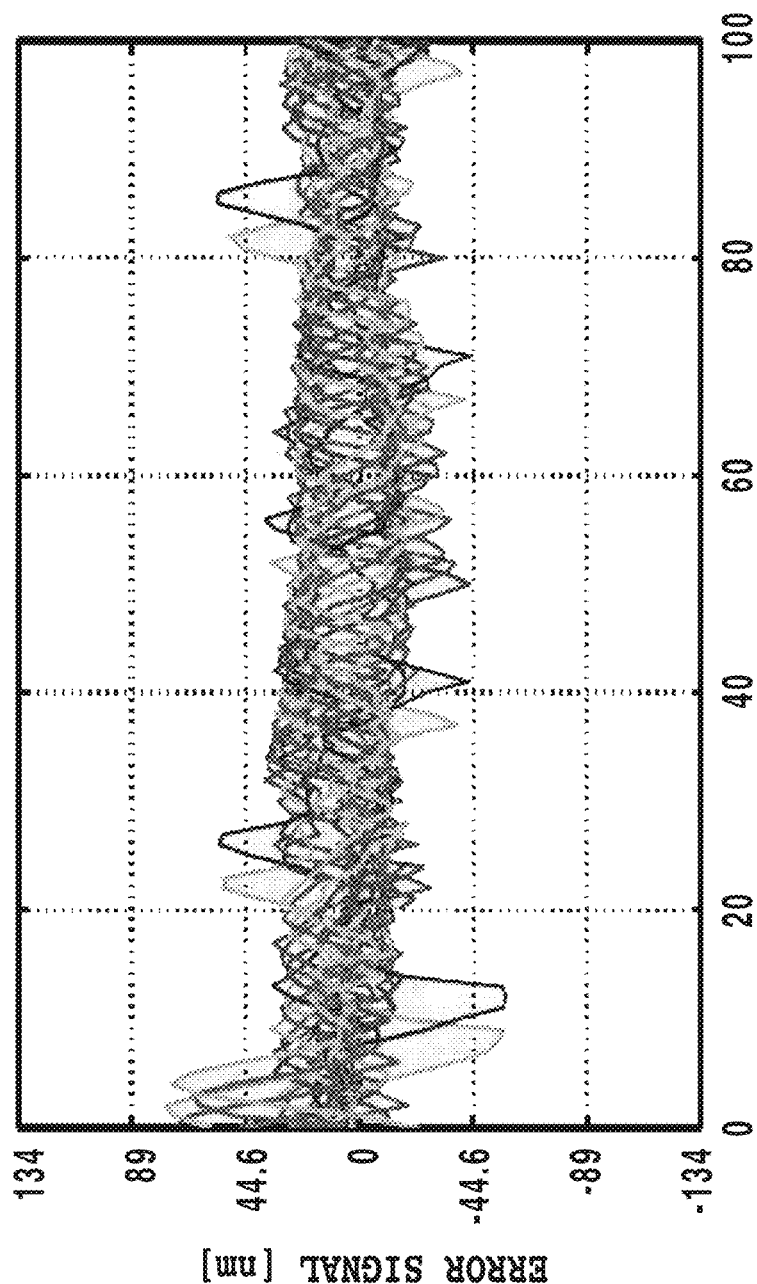
FIG. 62 is a diagram showing a waveform in which error signals are superimposed on one another.
Figure 63:
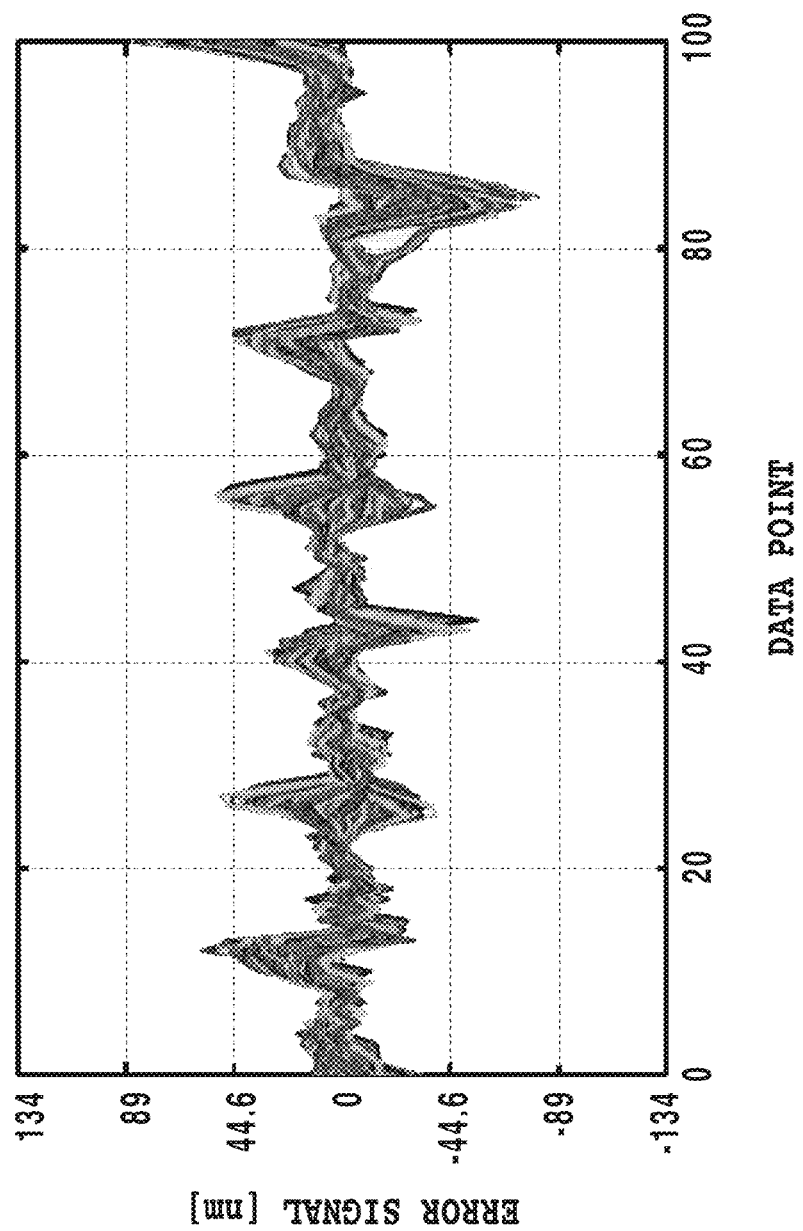
FIG. 63 is a diagram showing a waveform in which error signals are superimposed on one another.

FIG. 61 to FIG. 63 show error signals obtained when the scanning speed of the AFM is 322 μm/sec. FIG. 61 shows error signals obtained when the AFM uses the conventional method. FIG. 62 shows error signals obtained when the AFM uses the improved STL-PTC. FIG. 63 shows error signals obtained when the AFM uses the STLO.

As shown in FIG. 57, when the scanning speed of the AFM is 32.2 μm/sec, the improved STL-PTC improves the ±3α by 54.6% compared to the conventional method. The STLO improves the ±3α by 68.1% compared to the conventional method. Furthermore, when the scanning speed of the AFM is 322 μm/sec, the improved STL-PTC improves the ±3α by 69.8% compared to the conventional method. The STLO improves the ±3α by 81.0% compared to the conventional method.

Third Embodiment

As described below, the present embodiment includes a simple identification method for the STLO which uses a low-order model to allow the frequency characteristics of a plant to be easily identified, and an STLO improved by using zeroth-order phase error inverse model (ZPEI).
(Internal Configuration of the AFM)

The AFM according to the present embodiment is a special model of a JSPM-5200 manufactured by JEOL Ltd. However, this is only an example, and any AFM is applicable provided that the present embodiment can be incorporated into the AFM. Alternatively, dSPACE1104 may be used to modify the control mechanism for the AFM so that the control mechanism allows the present embodiment to be implemented.

FIG. 3 is a block diagram showing the flow of signals inside the AFM according to the present embodiment.

As shown by reference numeral 310 in FIG. 3, when a sample surface 103 is scanned, the displacement of the tip 102 of the cantilever is detected by a PD (four-piece PhotoDiode) 105 and is output as a signal. The signal is subjected to AD conversion by an AD (AD converter) 305. The resulting signal is input to a DSP (Digital Signal Processor) as y [i].

First, an output x [V] from the PD (four-piece PhotoDiode) is provided according to a force curve (the relation expression between a force exerted on the tip of the cantilever and the distance between the cantilever tip and the sample). In the present embodiment, the output x [V] from the PD can be converted into the displacement y [nm] of the cantilever using the conversion expression y [nm]×$K_{PD}$ [V/nm]=x [V]. In the present embodiment, based on the force curve, $K_{PD}$=4.2804×$10^{-2}$ [V/nm].

In the present embodiment, $K_{PD}$ is determined by first-order-approximating the measurement data of the force curve (Non-Patent Document 2) obtained with the JSPM-5200, by way of example.

Furthermore, as shown by reference numeral 320 in FIG. 3, a manipulating quantity u[i] resulting from DA conversion by a DA (DA converter) 301 in the DSP is amplified by an amplifier 302. The amplified manipulating quantity u[i] is applied to a PZT (piezo) 107 as a driving voltage. A gain provided by the amplifier 302 is $K_g$=20, and the rate of elongation of the PZT subjected to the driving voltage is $K_{PZT}$=15.59 [nm/V]. That is, the calculation u [V]×$K_{PZT}$ [nm/V] allows the u [V] to be converted into the displacement of the piezo.

Additionally, the gain of the AD/DA in the DSP is adjusted to 1.

In the present embodiment, a motion equation as shown in formula (1) is given for the tip 102 of the cantilever with a mass (m), using a model based on a contact mode and relating to the interaction between the sample surface 103 and the tip 102 of the cantilever as shown in FIG. 2.

The model may use recesses and protrusions on the sample surface 103 as an input disturbance according to the method described in Non-Patent Document 2. In the present embodiment, the displacement (y) of the cantilever is measured using the photodiode and laser light. Thus, the transfer function for the plant is multiplied by a given gain (g). In the present embodiment, formula (1) is identified as described below.

(Simple Identification Method)

The simple identification method according to the present embodiment performs fitting based on a frequency response from a standard second-order system determined on the basis of frequency characteristics identified when an identification input is a swept sine. The identification algorithm of the simple identification method will be described.
(Identification Algorithm)

A transfer function for the standard second-order system is:

[Expression 41]

$$G(s) = \frac{\omega_n^2}{s^2 + 2\xi\omega_n s + \omega_n^2} \quad (22)$$

The amplitude value of Equation (22) may be determined. At a peak angular frequency:

$$\omega_p = \sqrt{1-2\xi^2}\,\omega_n \quad \text{[Expression 42]}$$

at which the gain exhibits the maximum value, the peak width $M_p$ of the gain shown in formula (23) can be obtained.

[Expression 43]

$$M_p = \frac{1}{2\xi\sqrt{1-\xi^2}} \quad (23)$$

Furthermore, $M_p$ is measured based on $M_p = g_m - g_s$ [dB] (formula (24)). Here, $g_m$ denotes a peak gain, and $g_s$ denotes a DC gain.

The use of $M_p$ resulting from formula (24) allows a damping coefficient to be uniquely determined based on formula (23).

A general form of the standard second-order system is obtained by making a program such that the DC gain, the peak gain, and the peak frequency are automatically acquired from the experimentally obtained frequency response as described above.

According to the above-described procedure, a transfer function for a second-order model as shown in formula (25) is obtained.

[Expression 44]

$$P(s) = \frac{7.209 \times 10^9}{s^2 + 1086s + 1.192 \times 10^9} \quad (25)$$

For comparison, a high-order (fourth-order) model is used which is identified based on frequency characteristics acquired by a servo analyzer, using an invfreqs command provided in Matlab (registered trade mark) (Signal Processing Toolbox).

[Expression 45]

$$P(s) = \frac{b_0 s^2 + b_1 s + b_2}{s^4 + a_0 s^3 + a_1 s^2 + a_2 s + a_3} \quad (26)$$

Here, $b_0$=9.46×$10^8$, $b_1$=1.149×$10^{12}$, $b_2$=2.809×$10^{18}$, $a_0$=8414, $a_1$=1.648×$10^9$, $a_2$=6.378×$10^{12}$, $a_3$=4.387×$10^{17}$.

Figure 80:
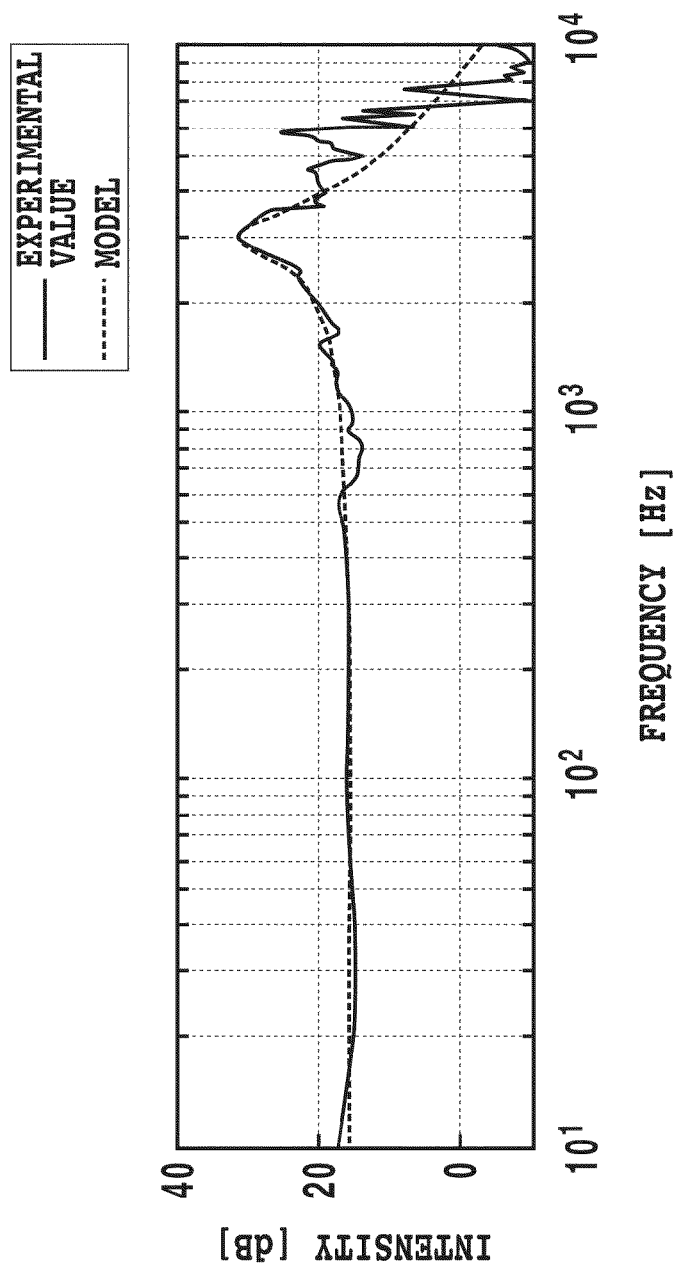
FIG. 80 is a diagram showing frequency characteristics.
Figure 81:
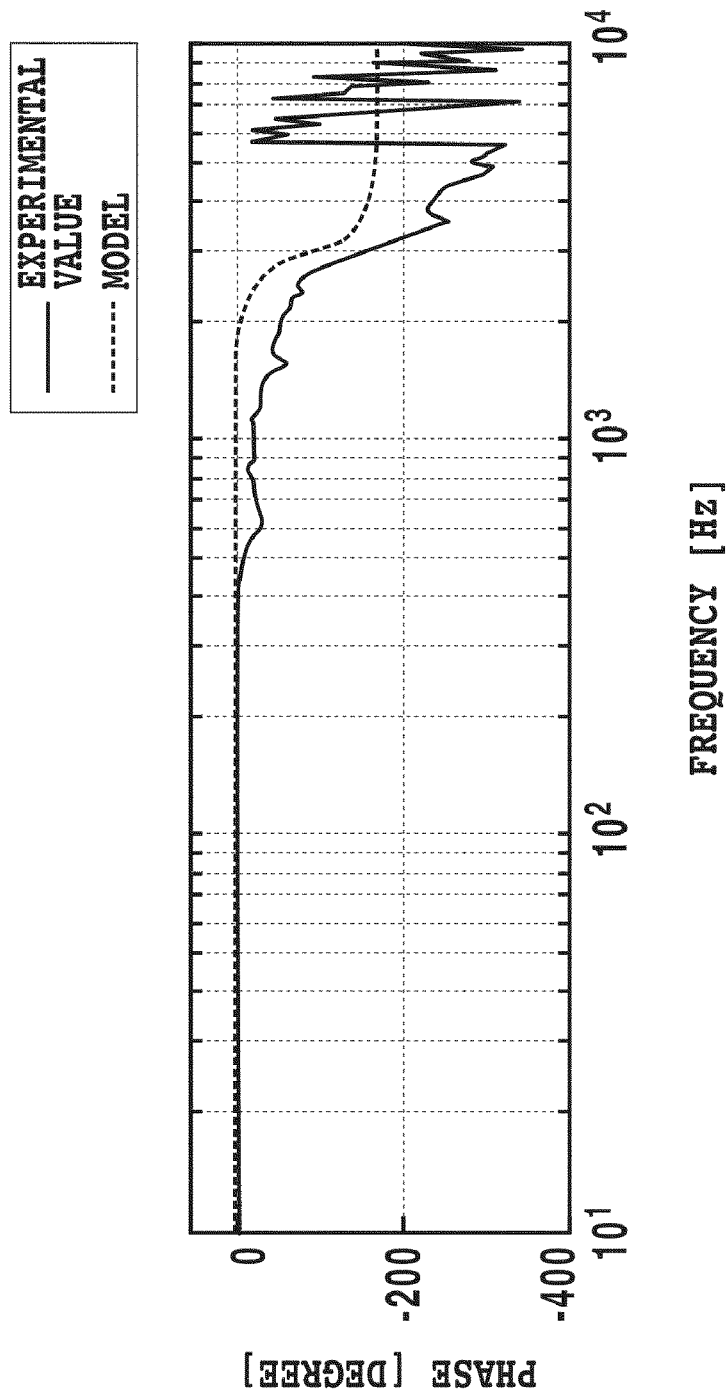
FIG. 81 is a diagram showing frequency characteristics.
Figure 82:
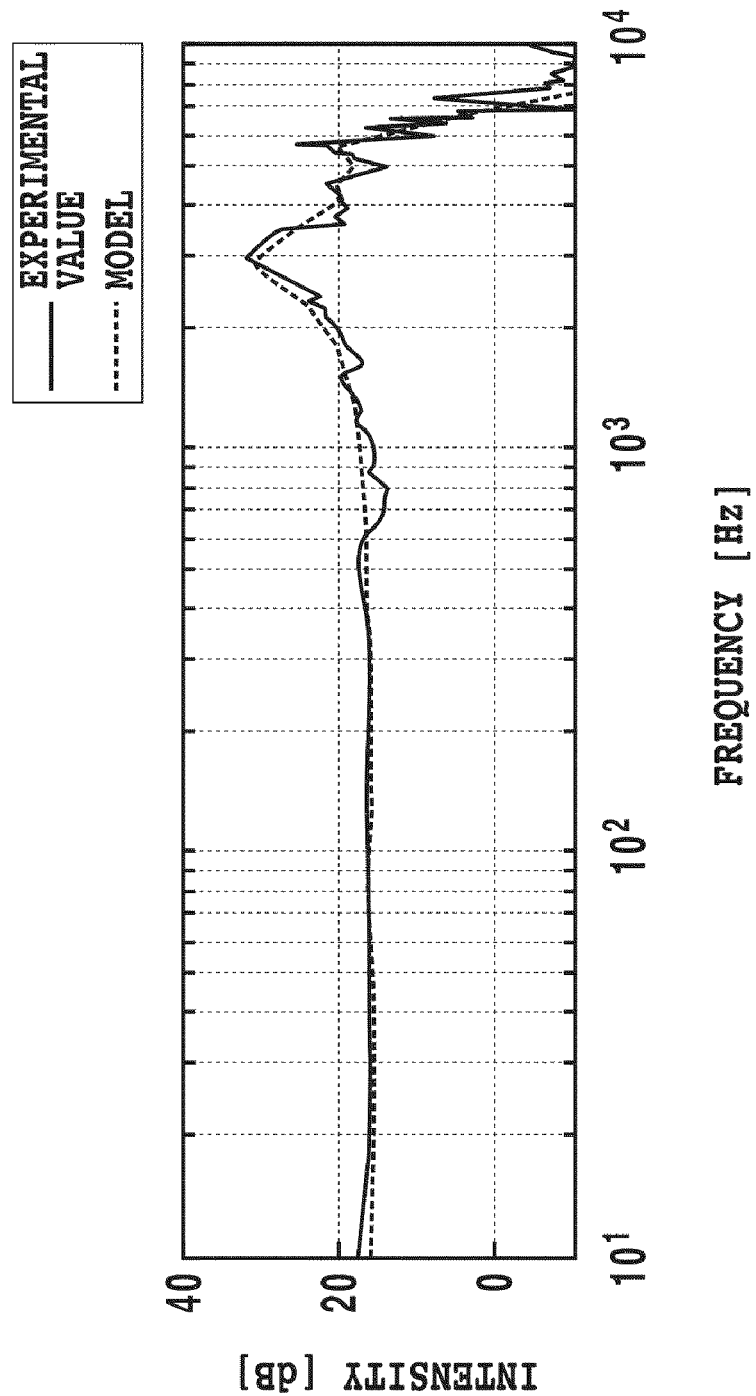
FIG. 82 is a diagram showing frequency characteristics.
Figure 83:
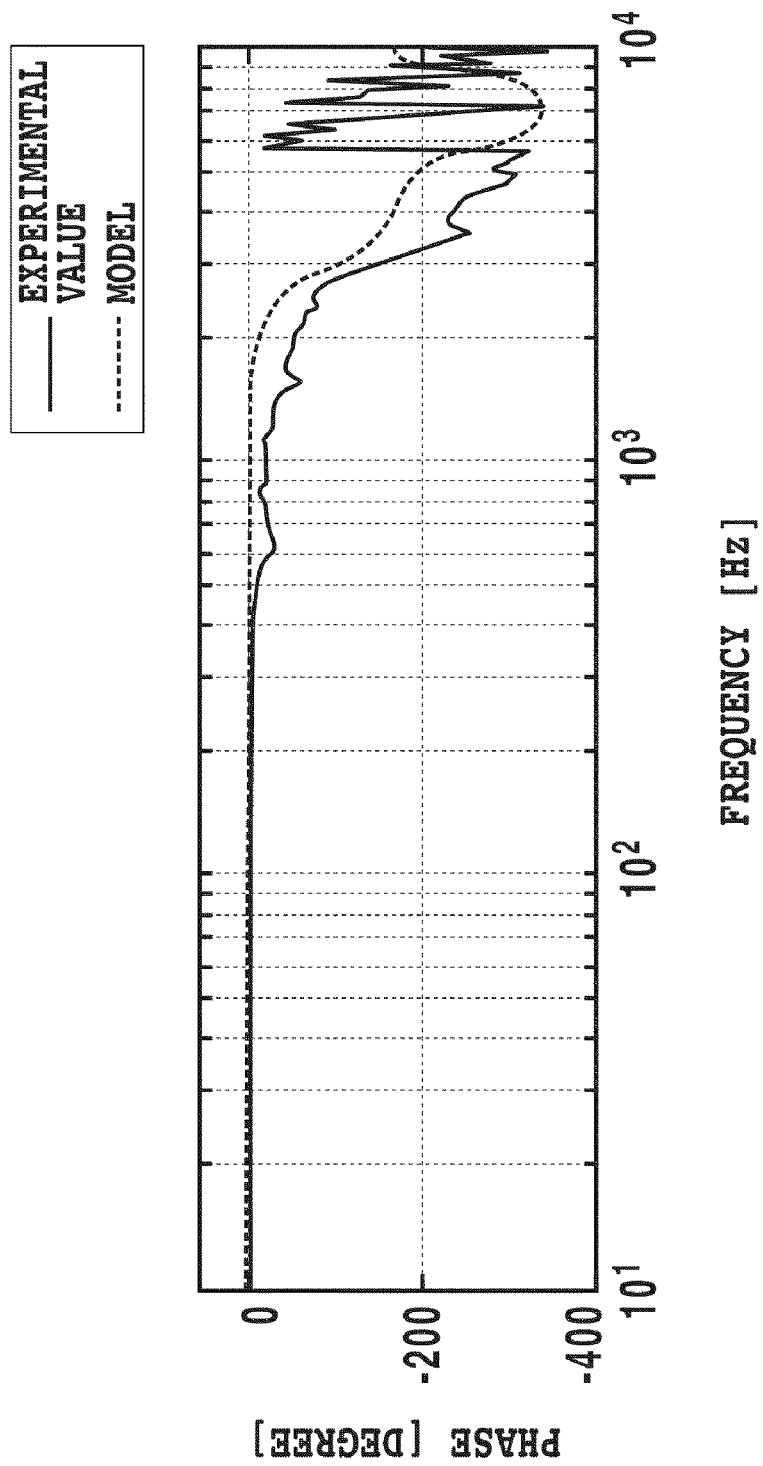
FIG. 83 is a diagram showing frequency characteristics.

FIGS. 80 and 81 show the frequency characteristics (dotted line) of the low-order (second-order) model obtained by the simple identification method and the frequency characteristics (solid line) obtained by the servo analyzer. FIGS. 82 and 83 show the frequency characteristics (dotted line) of the high-order (fourth-order) model obtained by the invfreqs command and the frequency characteristics (solid line) obtained by the servo analyzer. A comparison of FIG. 80 (81) with FIG. 82 (83) indicates that the low-order model obtained by the simple identification method can accurately approximate the high-order model obtained by the invfreqs command.

(Design of the Controller)

The controller according to the conventional method to be compared with the embodiment of the present invention is a phase delay compensator used in a product. A transfer function for the controller according to the conventional method is as shown in formula (3).

Here, the controller according to the conventional method is tuned such that the gain margin and the phase margin are 12.2 [dB] and 83.7 [deg], respectively, and that the proportional gain $k_p=64$, $\omega_c=2\pi f_c$ ($f_c=0.5$ [Hz]), and the cutoff frequency of an open loop=206 [Hz].

(STLO Using a Zeroth-Order Phase Error Inverse Model (ZPEI) (Non-Patent Document 23))

The STLO using the ZPEI compensates for the disadvantages of a single direction-surface topography learning observer (SD-STLO) described below.

Figure 7:
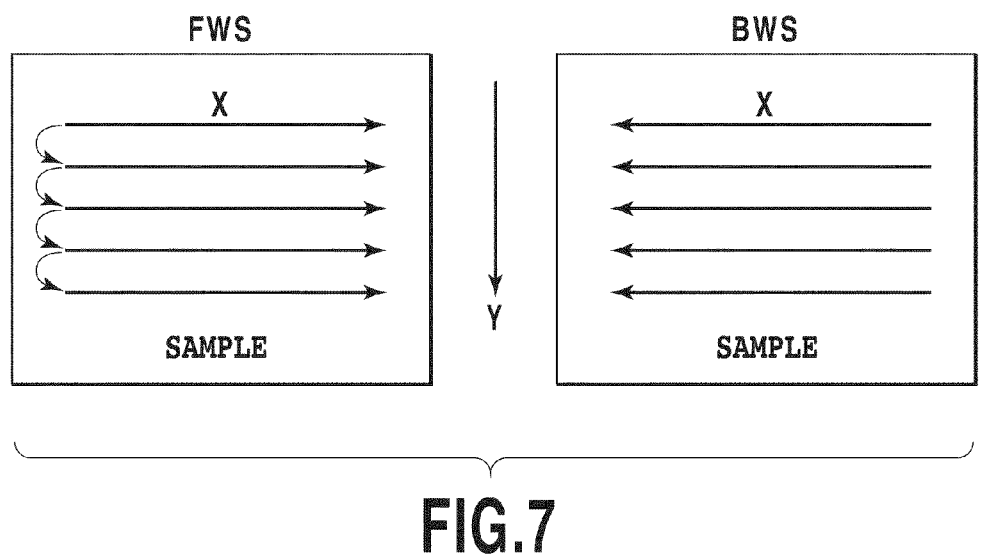
FIG. 7 is a diagram showing a surface scan path.
Figure 84:
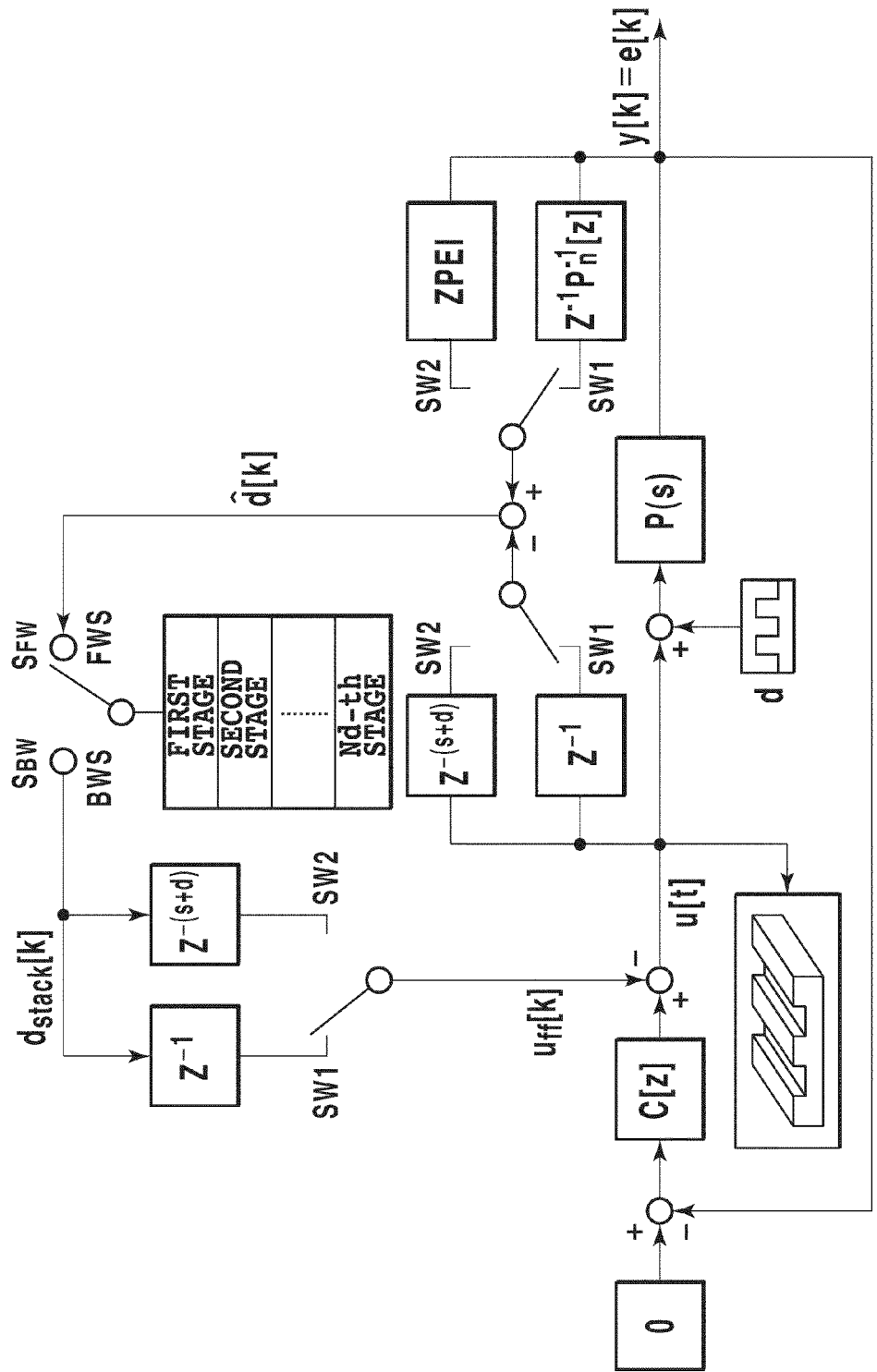
FIG. 84 is a diagram showing a control mechanism according to the present embodiment.

The single direction-surface topography learning observer (SD-STLO) provides surface topography data obtained during a forward scan (FWS) along a scan path shown in FIG. 7, as a feedforward signal for a backward scan (BWS). Thus, the accuracy with which the surface topography is tracked is improved. A control mechanism for the SD-STLD is configured such that the switches SW shown in FIG. 84 are all switches SW1. That is, the control mechanism is the same as that shown in FIG. 49. However, on the assumption that the discretized plant has the minimum phase, when the inverse system of the discretized plant is created, the disturbance during the FWS is estimated to be:

[Expression 46]

$$\hat{d}[k] = \frac{1}{zP_n[z]}y[k] - \frac{1}{z}u[k] = \frac{1}{z}d[k] \qquad (27)$$

Thus, a learned disturbance $d_{stack}[k]$ output by the stack memory has a data structure in which:

$$\hat{d}[k] \qquad \text{[Expression 47]}$$

is reversed in the direction of a time axis at the beginning of the BWS. Consequently, $d_{stack}[k]=zd[k]$. For the BWS, a learned disturbance $u_{ff}[k]=z^{-1}d_{stack}[k]$ corrected for a phase lead perfectly matches the actual disturbance. However, $d[k]$ is approximate to the actual disturbance subjected to zeroth-order hold.

The SD-STLO can be adapted for non-periodic disturbances (Non-Patent Document 22) but is not applicable to a discrete-time non-minimum phase plant owing to the use of the inverse system in discrete time. When discretized using a zeroth-order hold, a continuous-time model with at least a third relative order may result in unstable zeroes (Non-Patent Document 24). Thus, the SD-STLO cannot be designed for high-order models.

For example, when a model identified by invfreqs is discretized at $T_s=0.05$ [ms], formula (28) is given.

[Expression 48]

$$P[z] = \frac{b'_0 z^3 + b'_1 z^2 + b'_2 z + b'_3}{z^4 + a'_0 z^3 + a'_1 z^2 + a'_2 z + a'_3} \qquad (28)$$

$b'_0=1.319$, $b'_1=3.95$, $b'_2=3.75$, $b'_3=1.067$ $a'_0=-0.7179$, $a'_1=1.188$, $a'_2=-0.5511$, $a'_3=0.6566$ [Expression 49]

The model thus has unstable zeros $z_0=-1.2375\pm0.1560i$.

Thus, in the present embodiment, to allow a stable inverse model to be designed even for a high-order model, a zeroth-order phase error inverse model (ZPEI) is used to allow the STLO to be applied to the high-order model.

The zeroth-order phase error inverse model (ZPEI) is derived as follows.

Now, the controlled object discretized using the zeroth-order hold is expressed as:

[Expression 50]

$$P[z^{-1}] = \frac{z^{-d}B[z^{-1}]}{A[z^{-1}]} \qquad (29)$$

where $z^{-1}$ denotes a delay operator. In polynomials of a denominator and a numerator in formula (29), $B[z^{-1}]=b'_0+b'_1 z^{-1}+\ldots+b'_m z^{-m}$, $b'_m \neq 0$ [Expression 51]

$A[z^{-1}]=1+a'_0 z^{-1}+\ldots+a'_n z^{-n}$ [Expression 52]

$d=n-m$. Here, $A[z^{-1}]$ is assumed to be stable. To allow unstable zeroes to be dealt with, the numerator of the controlled object is divided into two portions including stable zeros and unstable zeros, respectively.

[Expression 53]

$$B[z^{-1}]=B^-[z^{-1}]B^+[z^{-1}] \qquad (30)$$

Here, $B^-[z^{-1}]$ is an sth-order monic polynomial having unstable zeros and stable limit zeros as roots. $B^+[z^{-1}]$ is a $(m-s)$th-order polynomial having stable zeros as roots. In this case, the zeroth-order phase error inverse model (ZPEI) of the plant is expressed as:

[Expression 54]

$$P_{ZPIE}[z^{-1}] = \frac{A[z^{-1}]B^-[z]}{B^+[z^{-1}](B^-[1])^2} z^{-s} \qquad (31)$$

Here, $B^-[z]=B^-[z^{-1}]z^s$.

If formula (31) is applied to a tracking control system, the expression is placed before the controlled object, and a future value $r[k+s+d]$ of a target value advanced by $[s+d]$ steps is given. Then, zero phase characteristics are obtained in which a transfer function from a set point (r) to an output (Y) avoids undergoing phase delay at all the frequencies (Non-Patent Document 23). If the SD-STLO is applied to the ZPEI, no future value needs to be given. This is because the learning signal during the FWS delayed by $[s+d]$ steps can be corrected during the BWS. In this case, the control mechanism for the STLO is such that the switches shown in FIG. 84 are all switches SW2. The control algorithm of the SD-STLO using the ZPEI will be described below.

First, stable zeros and unstable zeros in formula (28) are determined. An output equation from a disturbance d[k] to an estimated disturbance:

$$\hat{d}[k] \quad \text{[Expression 55]}$$

is expressed as:

[Expression 56]

$$\hat{d}[k] = \frac{B^-[z^{-1}]B^-[z]}{(B^-[1])^2} z^{-(s+d)} d[k] \quad (32)$$

For a disturbance:

$$\hat{d}[k] \quad \text{[Expression 57]}$$

estimated with a delay of s+d steps, during the FWS, $S_{FW}$ in FIG. 84 is kept on for $T_{FW}$ seconds. The relevant data is stored in the stack memory. Then, during the BWS, the stack memory outputs a signal expressed as:

[Expression 58]

$$d[k] = \frac{B^-[z^{-1}]B^-[z]}{(B^-[1])^2} z^{(s+d)} d[k] \quad (33)$$

Figure 87:
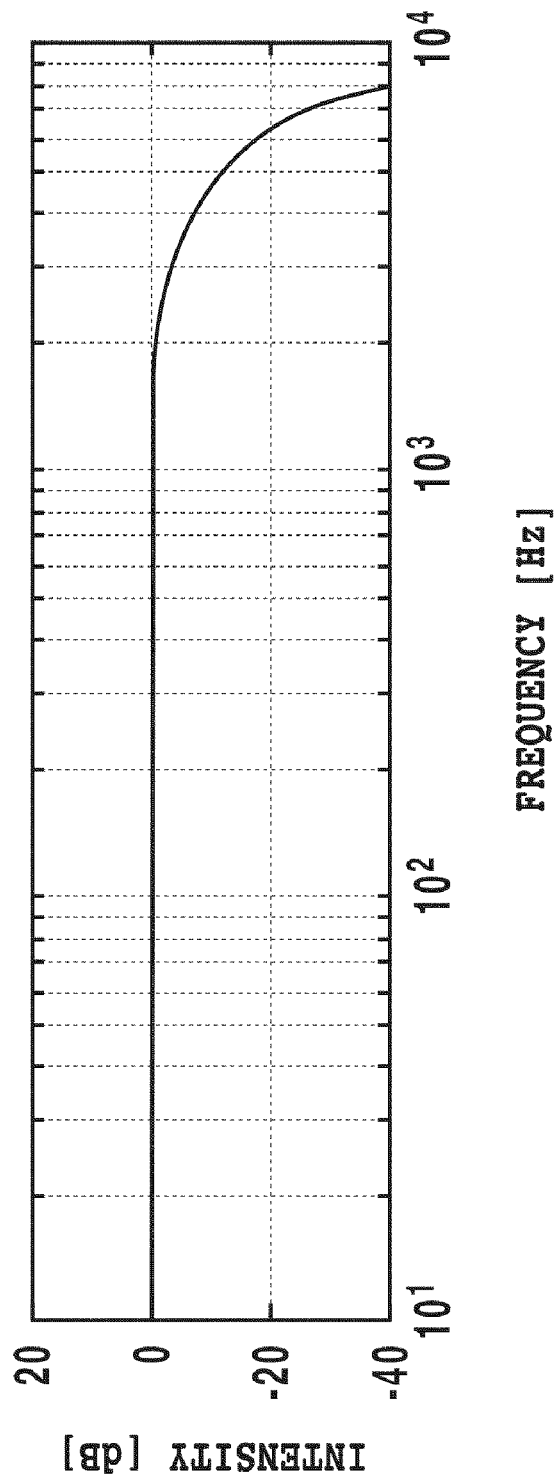
FIG. 87 is a diagram showing the results of simulation.
Figure 88:
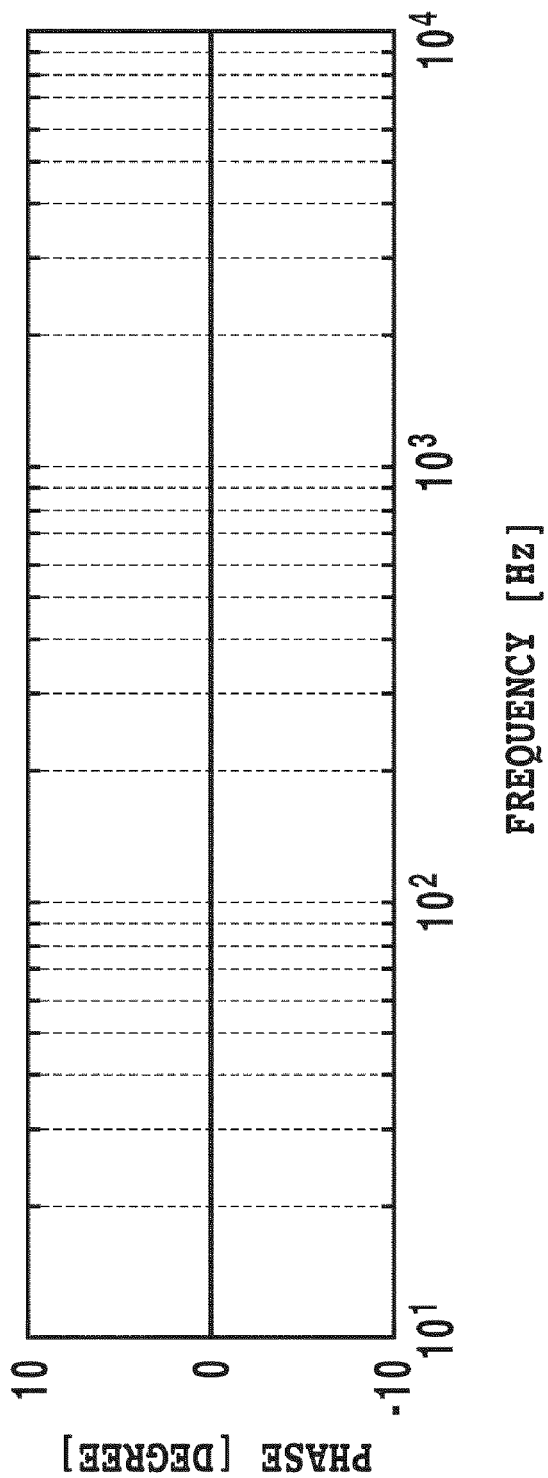
FIG. 88 is a diagram showing the results of simulation.

Thus, the estimated disturbance matches the actual disturbance d[k] only in a low frequency region where $u_{ff}[k]=z^{-(s+d)}d_{stack}[k]$ is based on formula (33). Thus, the actual disturbance during the BWS is reduced at sample points based on control periods only in the low frequency region. For a high frequency region, as shown in FIGS. 87 and 88, a reduced gain prevents the learned disturbance from matching the actual disturbance. Switching timings are controlled based on the observation of X scan waveforms as shown in FIG. 5.

(Comparison of the SD-STLO with the Second-Order Model and Fourth-Order Model)

The ratio of the actual disturbance (d) and the learned disturbance $u_{ff}$ and the frequency characteristics of $u_{ff}/d$ in the second-order model are compared with those in the fourth-order model.

(Comparison Through Simulation)

FIGS. 85 to 88 show the results of simulation of $u_{ff}/d$.

Figure 85:
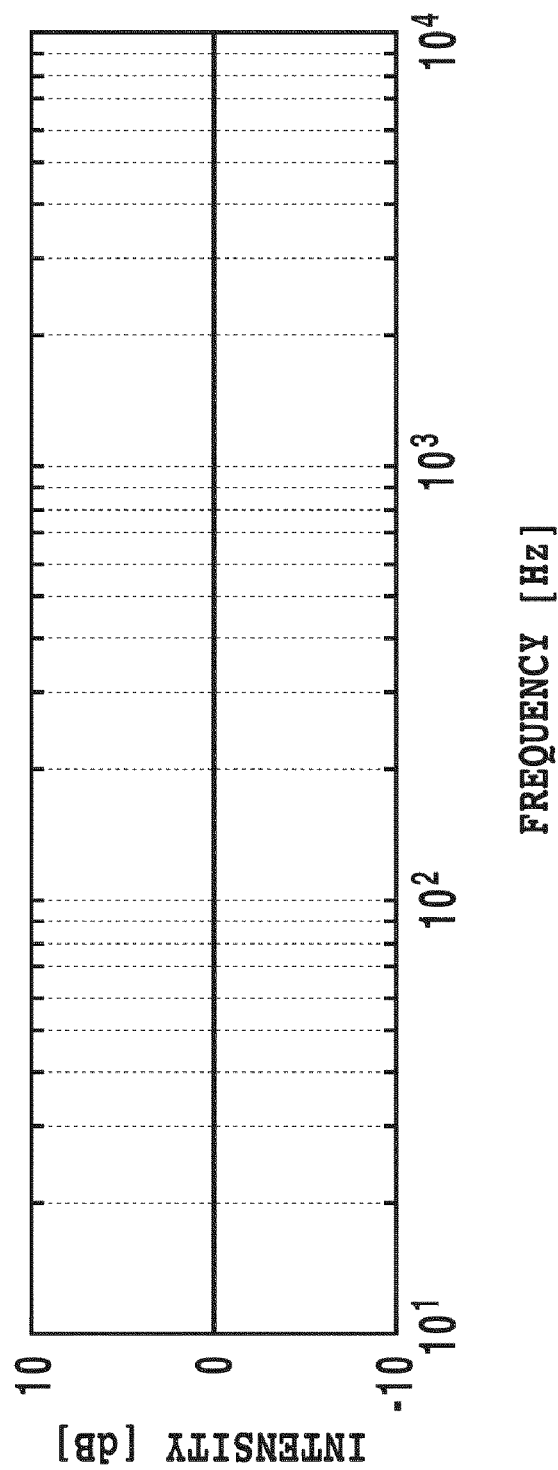
FIG. 85 is a diagram showing the results of simulation.
Figure 86:
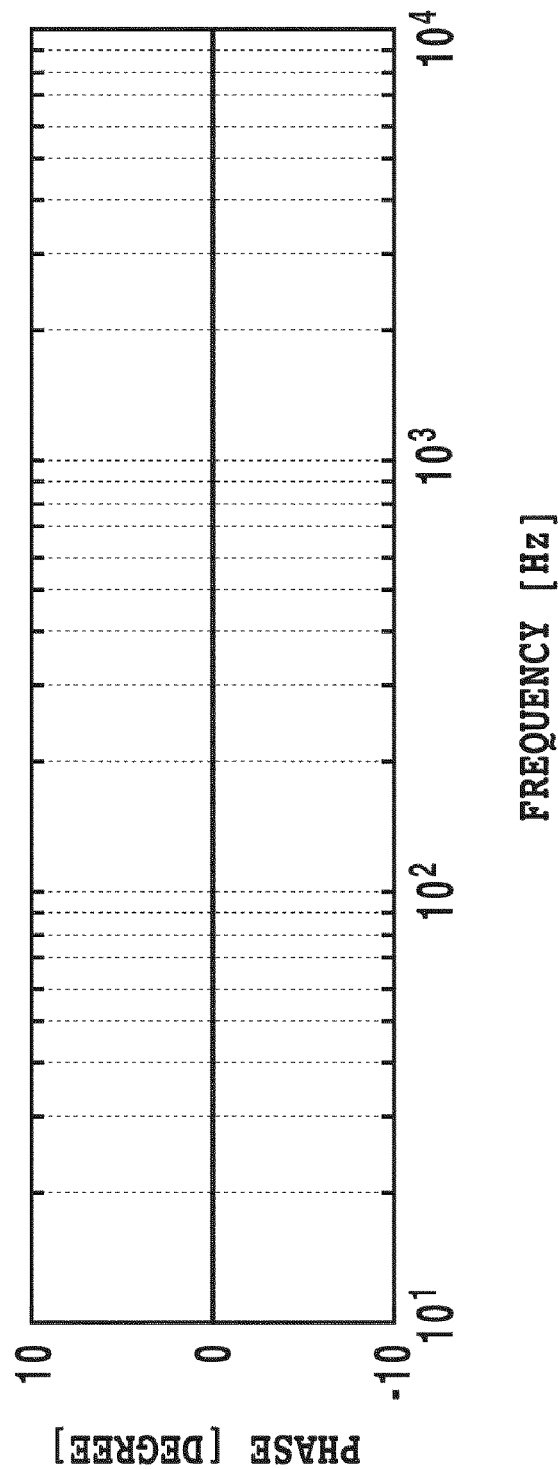
FIG. 86 is a diagram showing the results of simulation.

FIGS. 85 and 86 show the results of simulation of a frequency response from the $u_{ff}/d$ during the BWS observed when the second-order model identified by the simple identification method according to the present embodiment is used in the SD-STLO. FIGS. 85 and 86 show that when the second-order model identified by the simple identification method according to the present embodiment is used in the SD-STLO, the nominal plant can be estimated without a decrease in gain or a phase delay.

FIGS. 87 and 88 show the results of simulation of a frequency response from the $u_{ff}/d$ during the BWS observed when the fourth-order model and the ZPEI are used in the SD-STLO. FIGS. 87 and 88 show no phase delay but a decrease in gain in the high frequency region, indicating the characteristics of the zeroth-order phase error inverse model (ZPEI).

(Comparison Through Experiments)

FIG. 89 to FIG. 92 show the $u_{ff}/d$ in the actual AFM.

Figure 89:
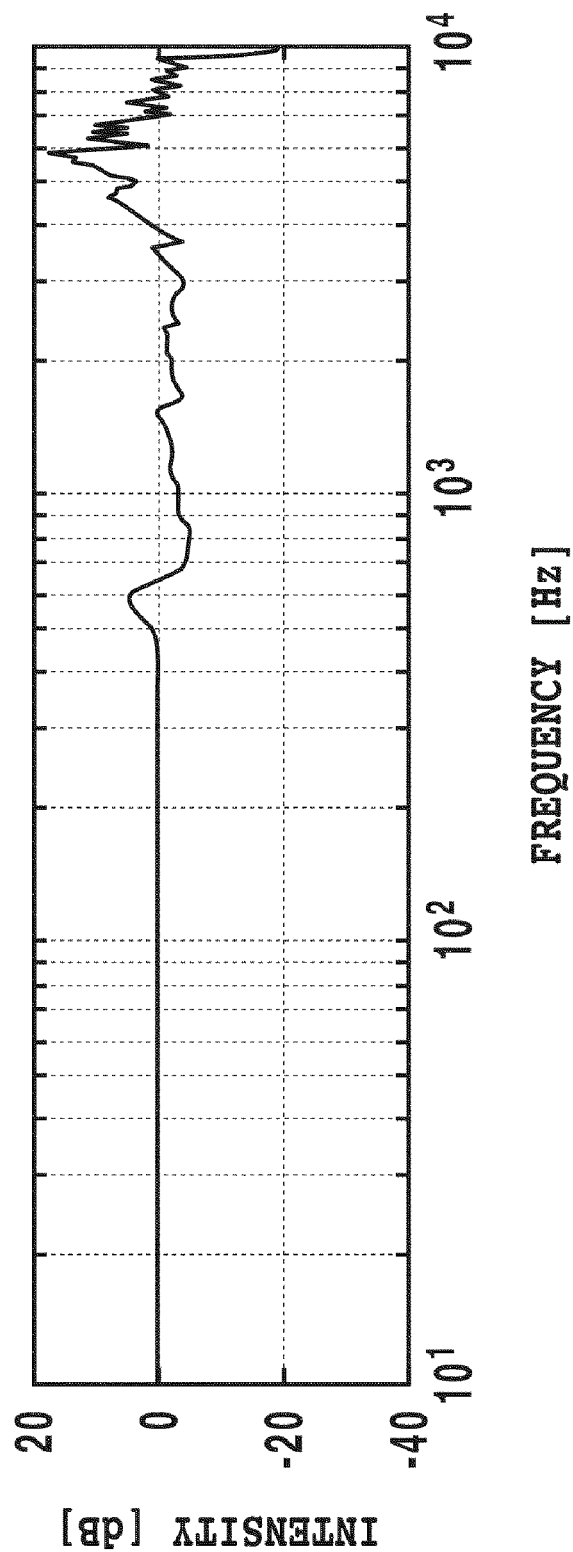
FIG. 89 is a diagram showing frequency characteristics.
Figure 90:
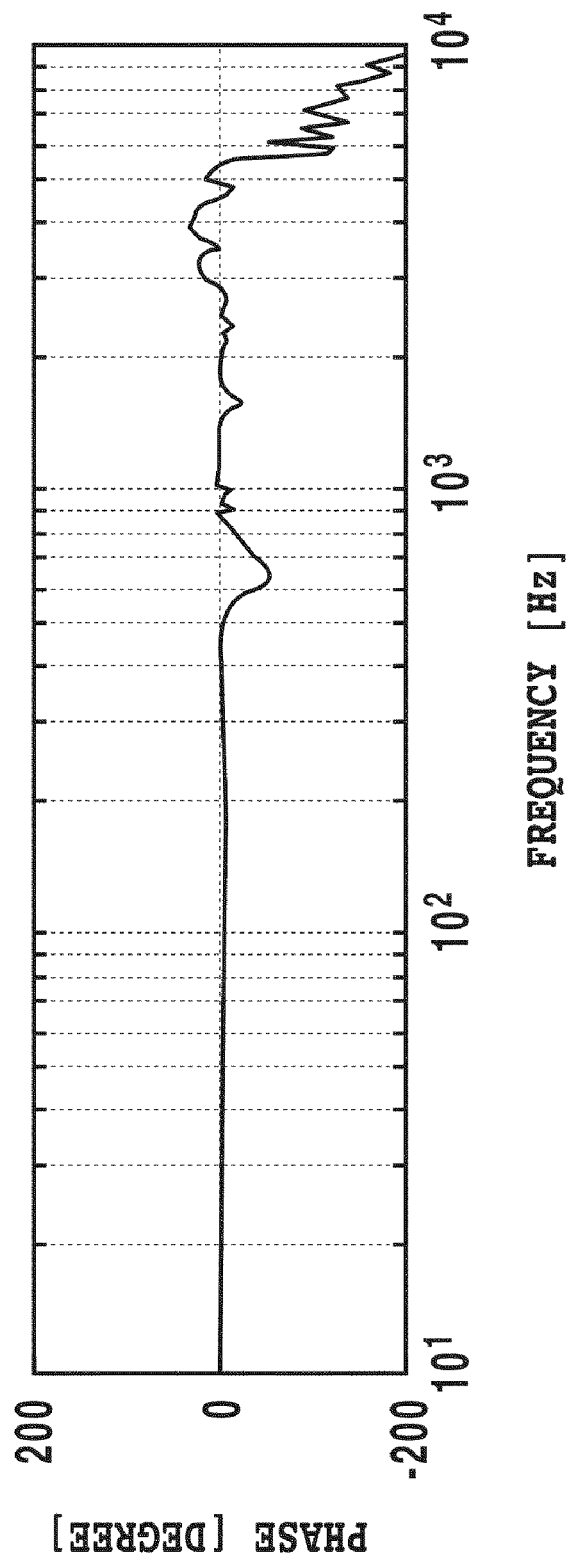
FIG. 90 is a diagram showing frequency characteristics.

FIGS. 89 and 90 show the results of a frequency response from the $u_{ff}/d$ during the BWS observed when the second-order model identified by the simple identification method according to the present embodiment is used in the SD-STLO. Gain characteristics shown in FIGS. 89 and 90 show an increase in gain from about 4 [kHz] to 7 [kHz]. This is expected to reflect the impact of the modeling error between the second-order model $P_n(s)$ shown in FIGS. 80 and 81 and the actual controlled object. Phase characteristics also reflect the impact of the modeling error and exhibit a significant delay in high frequency.

Figure 91:
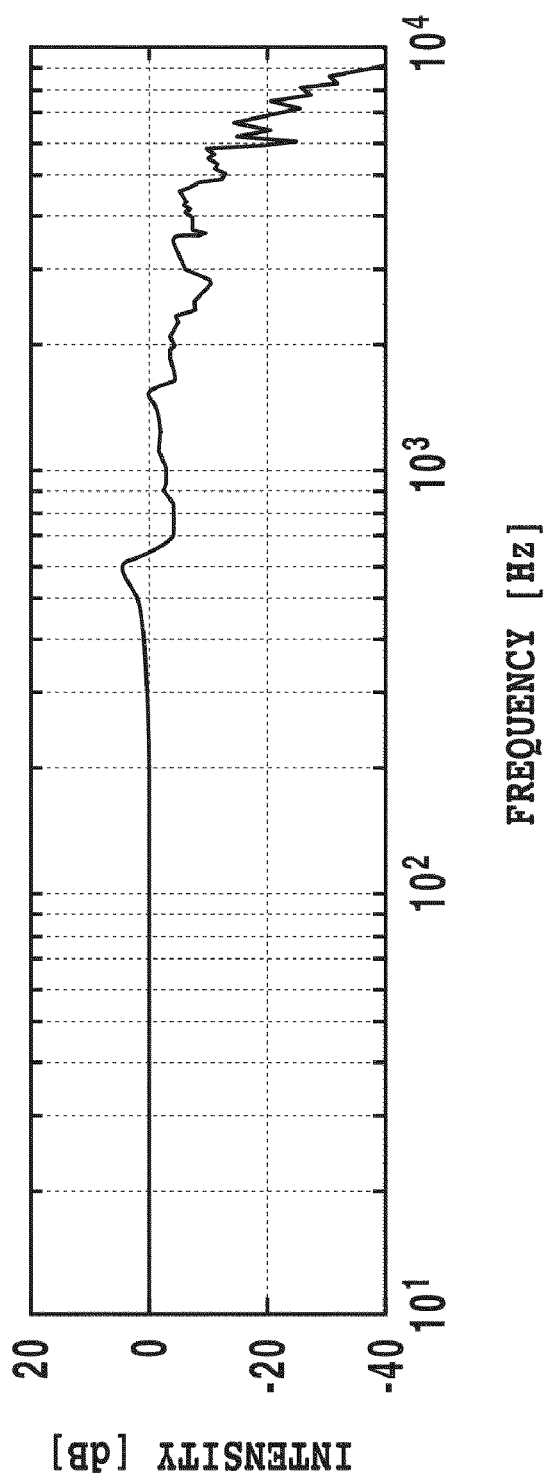
FIG. 91 is a diagram showing frequency characteristics.
Figure 92:
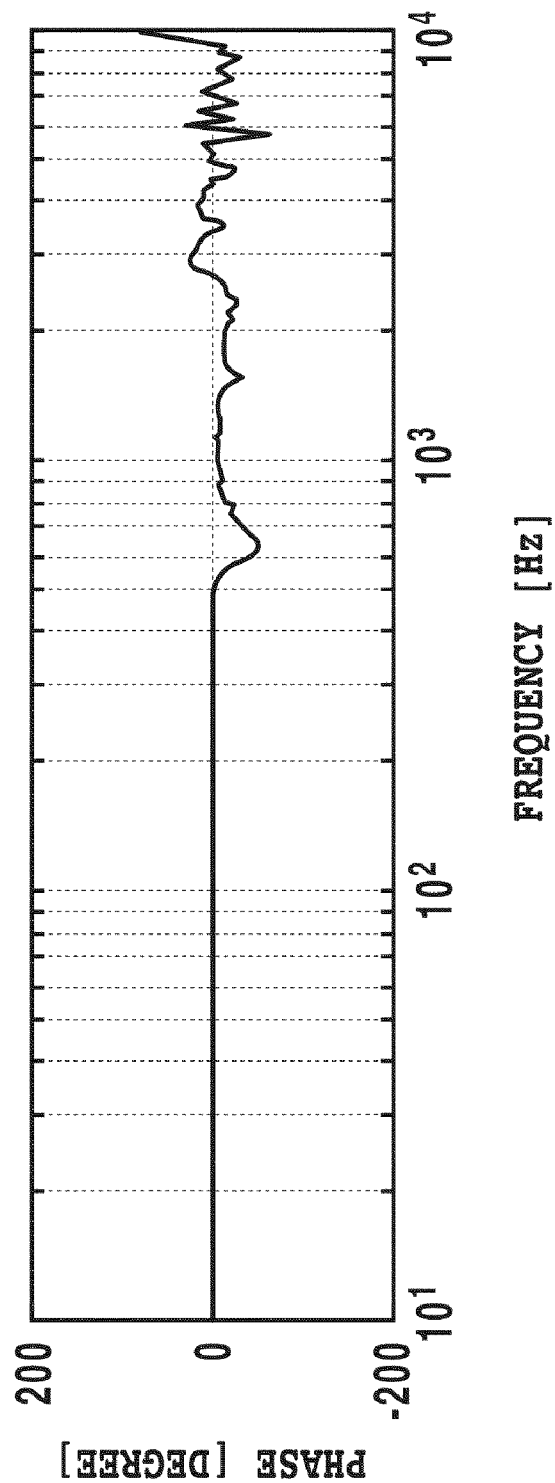
FIG. 92 is a diagram showing frequency characteristics.

FIGS. 91 and 92 show the results of a frequency response from the $u_{ff}/d$ during the BWS obtained from the actual AFM when the fourth-order model and the ZPEI are used in the SD-STLO.

FIGS. 91 and 92 indicate that the fourth-order model reduces the impact of the modeling error and that the results are similar to those of the simulation.

As described above, the discrete-time minimum phase plant for the low-order model is prevented from suffering a decrease in gain in the high frequency region. However, in this case, the modeling error may vary the estimated disturbance:

$$\hat{d} \quad \text{[Expression 59]}$$

thus significantly varying the frequency characteristics of the $u_{ff}/d$. The high-order model is not substantially affected by the modeling error but suffers a decrease in gain in the high frequency region. As a result, the estimated disturbance:

$$\hat{d} \quad \text{[Expression 60]}$$

may be degraded.

(Measurement of the Sample)

The results of measurement will be described below in which the AFM according to the present embodiment is used to measure a sample that was a planar brazed holographic grating standard article (grating element) manufactured by Shimadzu Corporation. A grating element 1801 shown in FIGS. 18A, 18B, which is measured with the AFM according to the present embodiment is shaped like saw teeth and includes a glass substrate of resin with grating grooves formed therein. The grooves are coated with a reflection film of aluminum or the like.

Figure 93:
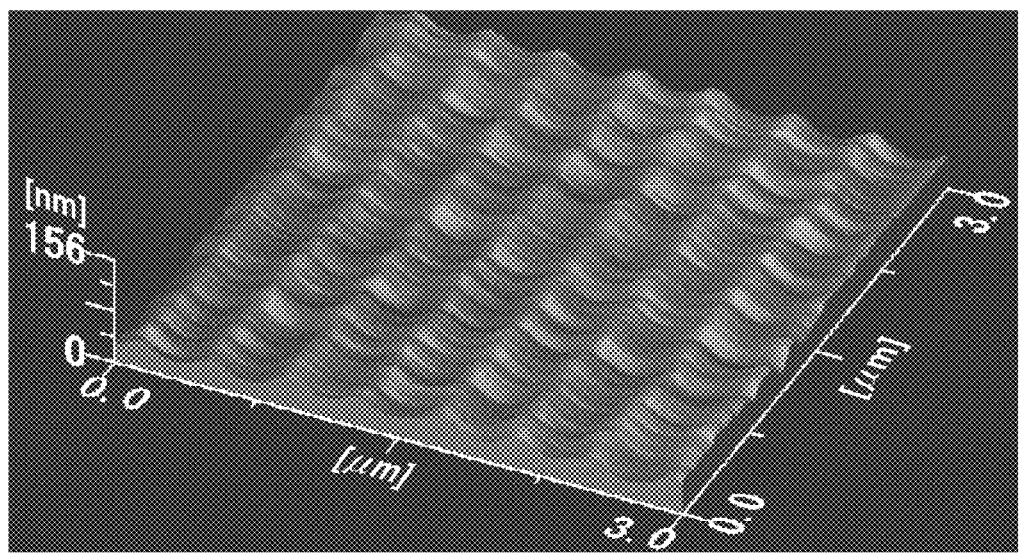
FIG. 93 is a diagram showing an image of a sample measured with the AFM.

FIG. 93 shows a three-dimensional image of the sample surface obtained when the surface of the grating element 1801 is scanned by using the conventional method for the AFM according to the present embodiment.

Figure 94:
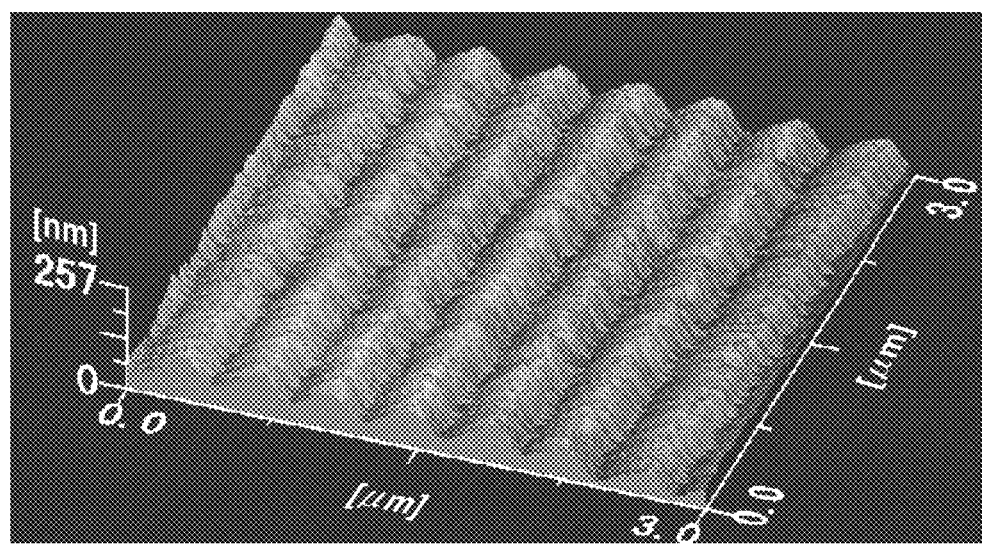
FIG. 94 is a diagram showing an image of the sample measured with the AFM.

FIG. 94 shows a three-dimensional image of the sample surface obtained when the surface of the grating element 1801 is scanned using the second-order model in the SD-STLO for the AFM.

Figure 95:
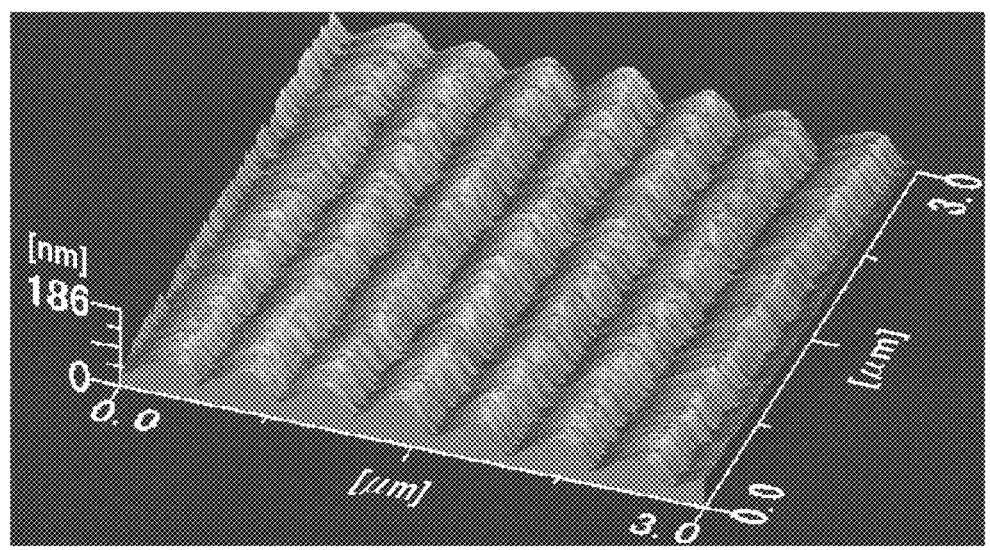
FIG. 95 is a diagram showing an image of the sample measured with the AFM.

FIG. 95 shows a three-dimensional image of the sample surface obtained when the surface of the grating element 1801 is scanned using the fourth-order model and ZPEI in the SD-STLO for the AFM.

In the measurements shown in FIG. 93 to FIG. 95, the scan range is 3 μm×3 μm. FIG. 93 to FIG. 95 are centrally enlarged views of the sample over the range of 5.5 μm×5.5 μm. Furthermore, in the measurements shown in FIG. 93 to FIG. 95, the scanning speed is 322 μm/s, and time required for the whole scan is about 20 seconds.

As shown in FIG. 93 to FIG. 95, when used for the AFM, the SD-STLO using the second-order model or the fourth-order model enables a reduction in the degradation of three-dimensional images of the sample surface compared to the conventional method.

Figure 96:
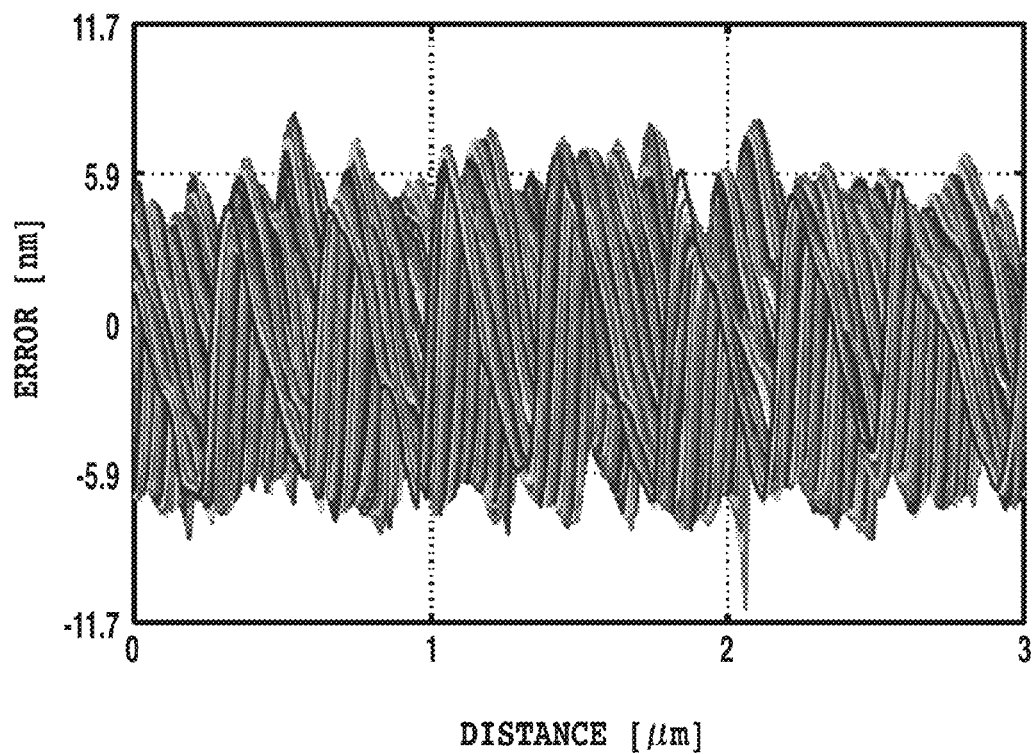
FIG. 96 is a diagram showing a waveform in which error signals are superimposed on one another.

FIG. 96 shows superimposed error signals (errors) obtained when the surface of the grating element 1801 is scanned by using the conventional method for the AFM according to the present embodiment.

Figure 97:
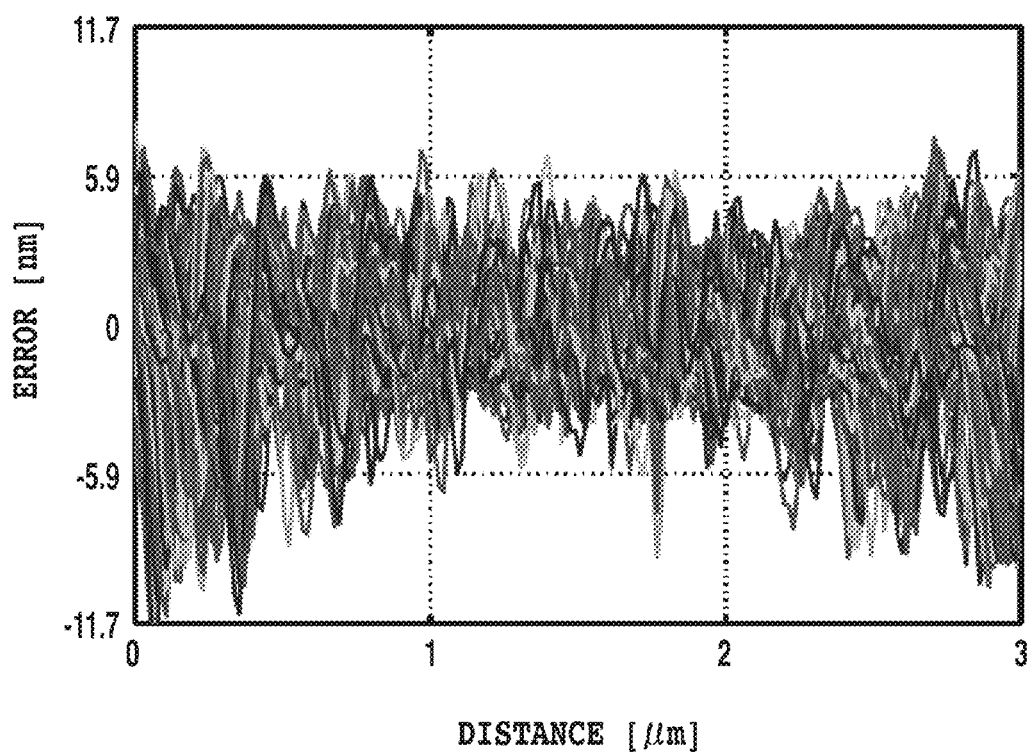
FIG. 97 is a diagram showing a waveform in which error signals are superimposed on one another.

FIG. 97 shows superimposed error signals (errors) obtained when the surface of the grating element 1801 is scanned by using the second-order model in the SD-STLO for the AFM.

Figure 98:
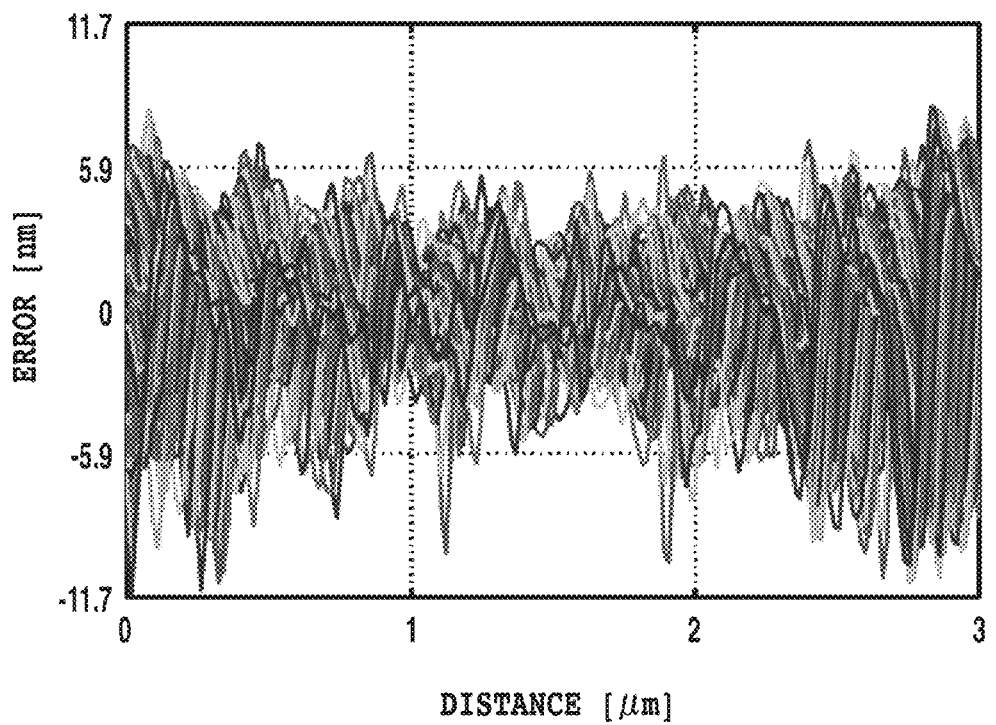
FIG. 98 is a diagram showing a waveform in which error signals are superimposed on one another.

FIG. 98 shows superimposed error signals (errors) obtained when the surface of the grating element 1801 is scanned by using the fourth-order model and ZPEI in the SD-STLO for the AFM.

As shown in FIG. 96 to FIG. 98, when used for the AFM, the SD-STLO using the second-order model or the fourth-order model enables a reduction in error signal (error) compared to the conventional method.

That is, adopting the SD-STLO using the second-order model or the fourth-order model in the AFM can reduce error signal (the impact of the disturbance), and improve the tracking capability of control input with respect to the surface topography.

Furthermore, the error signals can be quantitatively evaluated as follows. When the scanning speed is 32.2 μm/s, the ±3σ for the conventional method is 62.4 [nm], the ±3σ for the STLO is 38.6 [nm], and the ±3σ for the STLO using the ZPEI is 40.3 [nm]. Thus, both the ±3σ for the STLO and the ±3σ for the STLO using the ZPEI are smaller than that for the conventional method. Consequently, the STLO and the STLO using the ZPEI allow the shape topography to be measured more accurately than the conventional method.

As described above, the STLO using the ZPEI allows designing of an inverse model that is stable even for a discrete-time non-minimum phase plant. This enables even a high-order model to provide a control algorithm similar to that provided by a low-order model. Thus, when used for the AFM, the STLO using the ZPEI allow the topography of the sample to be measured more accurately than the conventional method.

Fourth Embodiment

The present embodiment includes PLS-STLPTC as described below.
(Pre-Line Scanning Surface Topography Learning with PTC (PLS-STLPTC))

The pre-line scanning surface topography learning with PTC (PLS-STLPTC) according to the present embodiment compensates for the disadvantages of single-direction scanning surface topography learning with PTC (SD-STLPTC) (Non-Patent Document 11) described below.

For the SD-STLPTC, a disturbance estimation mechanism (FIG. 47) needs to be installed so as to minimize the difference between the actual signal and the learning signal. As shown in FIG. 48, a switch 1 (SW1) for an FWS is kept on for T (=the number $N_d$ of stages in a memory×the sampling period $T_y$) seconds. An output end disturbance:

$$P(s)\hat{d} \qquad \text{[Expression 61]}$$

estimated by the disturbance estimation mechanism is stored in a stack memory 4801. The stored disturbance:

$$P(s)\hat{d} \qquad \text{[Expression 62]}$$

passes through a sensitivity function 4802:

$$\frac{1}{1+CP} \qquad \text{[Expression 63]}$$

and is thus converted into an output signal for the BWS. During the BWS, a switch 2 (SW2) is turned on to allow a signal generator to generate a target trajectory allowing the error to be adjusted to 0. Thus, the PTC reduces the possible error in a feedforward manner.

Here, since the controlled object is of a second order, when the state variable (x) is:

$$x=[y,\dot{y}] \qquad \text{[Expression 64]}$$

a signal generator for error signals can be designed as shown in FIG. 48. However, the speed command value:

$$\dot{r}[i] \qquad \text{[Expression 65]}$$

is as shown in formula (12).

Figure 99:
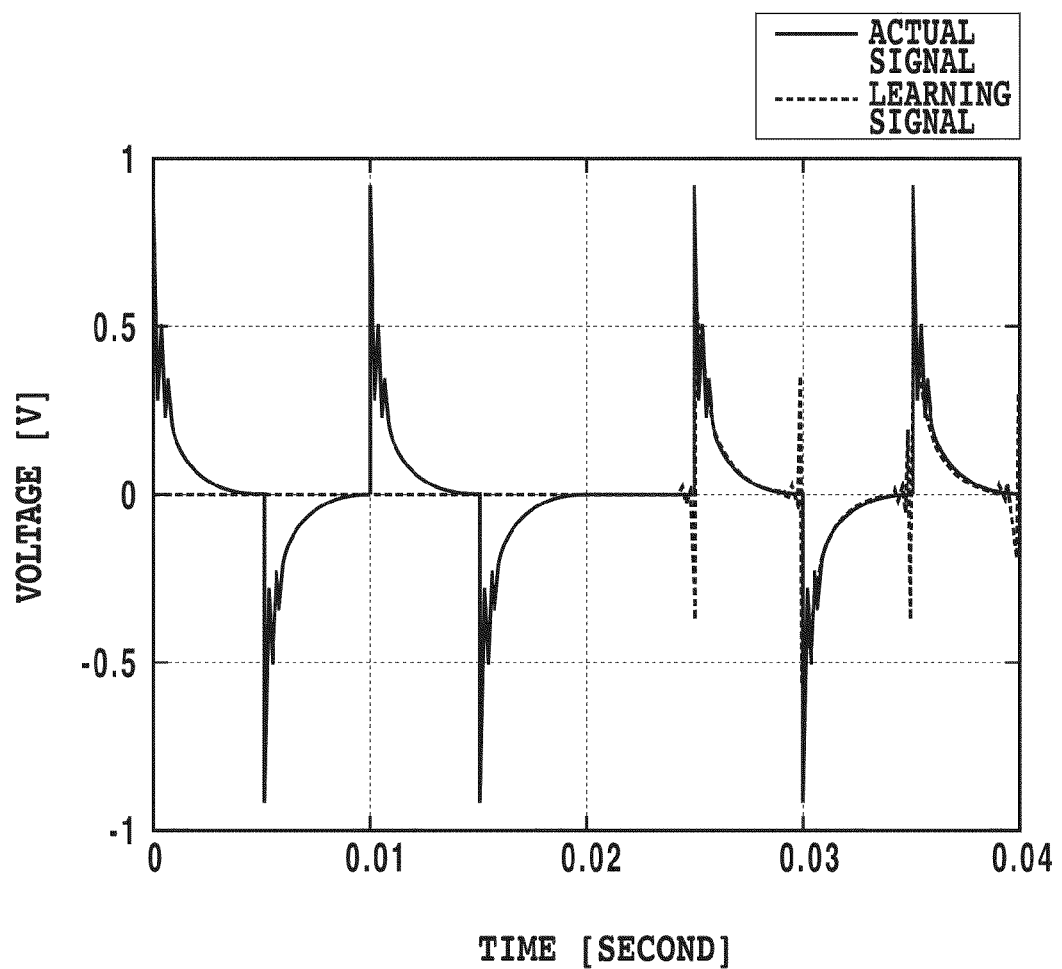
FIG. 99 is a diagram showing the results of simulation.
Figure 100:
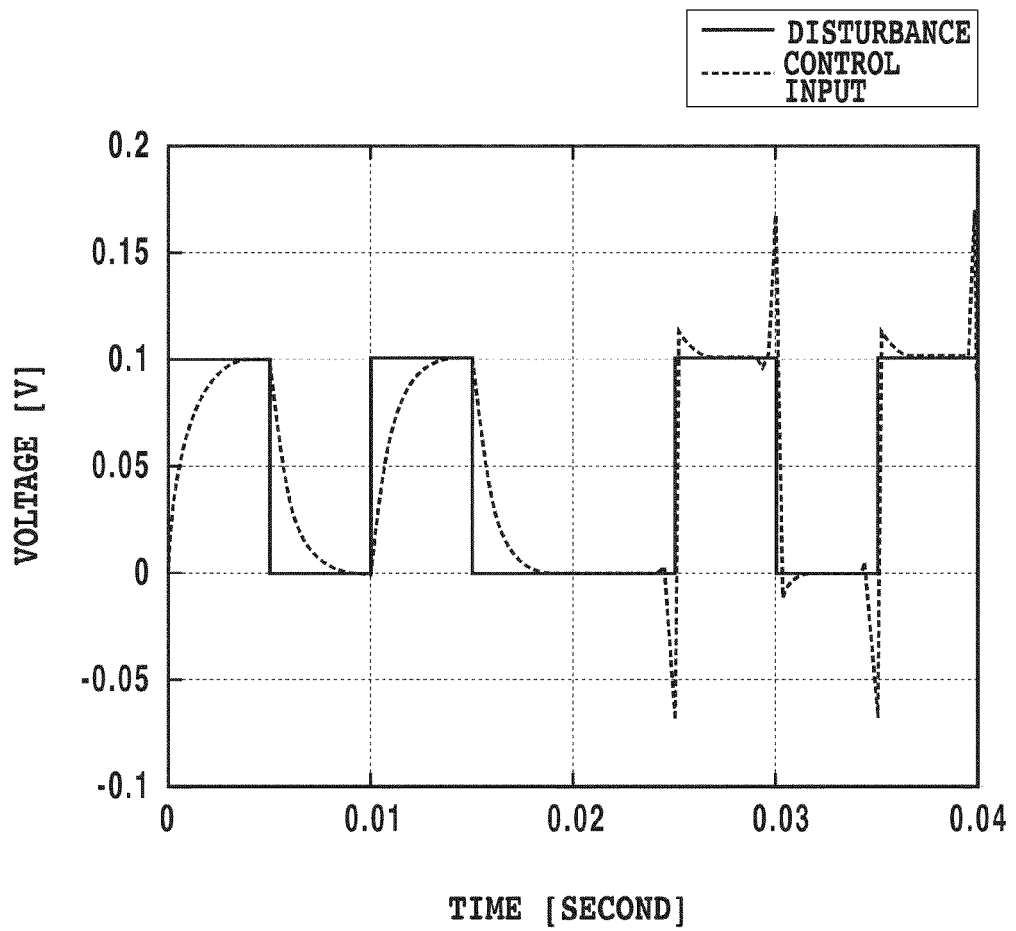
FIG. 100 is a diagram showing the results of simulation.
Figure 101:
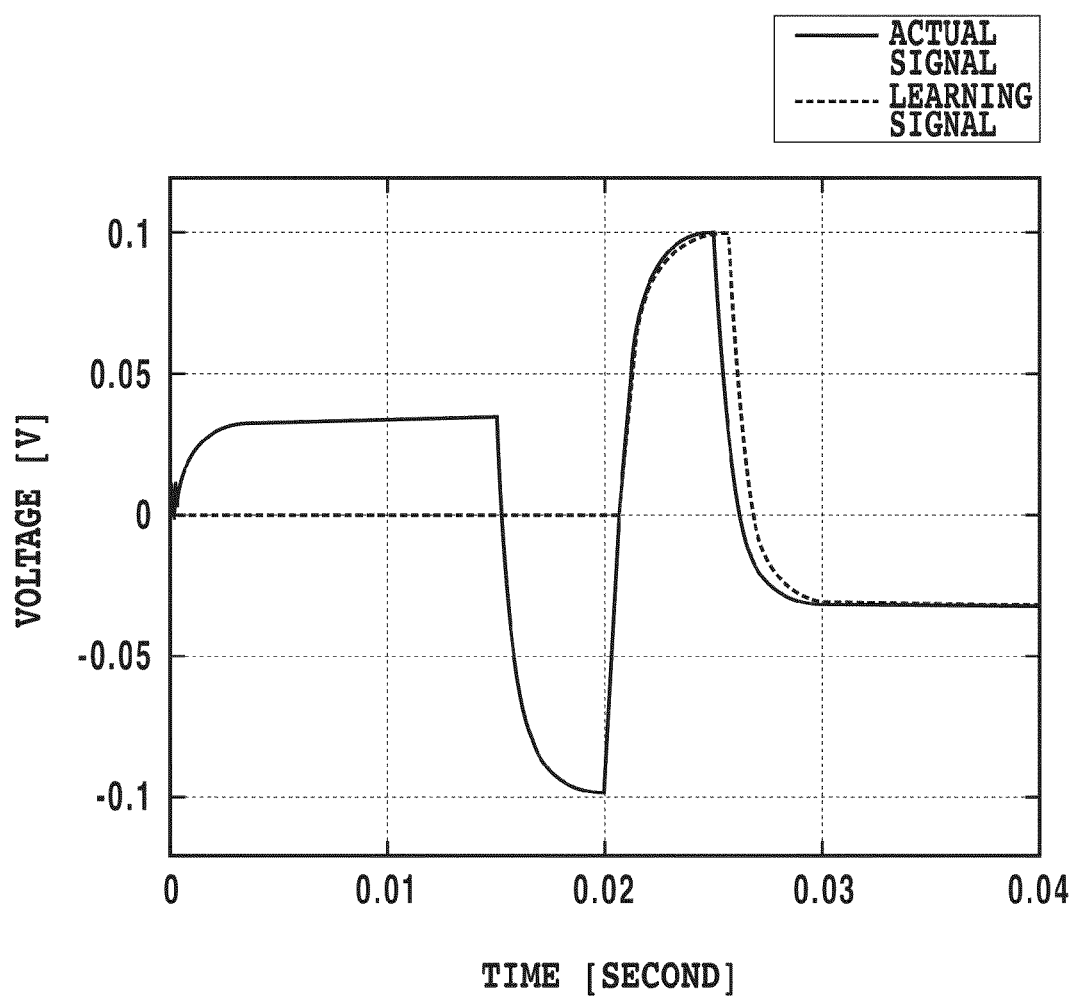
FIG. 101 is a diagram showing the results of simulation.
Figure 102:
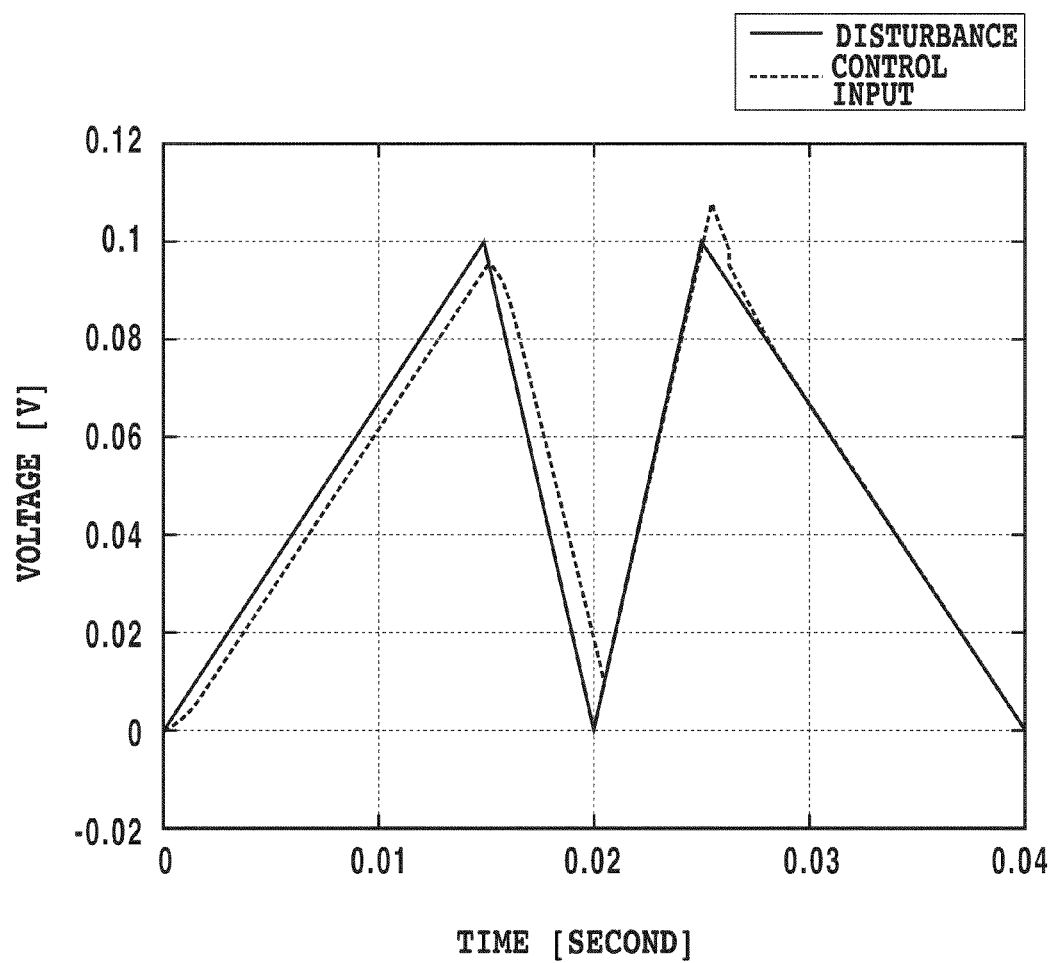
FIG. 102 is a diagram showing the results of simulation.

FIG. 99 to FIG. 102 show the results of simulation of the actual output signal (actual signal) and the leaning signal and of simulation of the disturbance and the control input; the simulation uses control based on the above-described SD-STLPTC. FIGS. 99 and 100 show the results of simulation of measurement of a rectangular-wave sample. FIGS. 101 and 102 show the results of simulation of measurement of a triangular-wave sample. The results of simulation of measurement of the rectangular-wave sample and the results of simulation of measurement of the triangular-wave sample both indicate that the learning signal does not exactly correspond to the folded-back form of the actual signal. This is because the shape of the disturbance varies between the FWS and the BWS, resulting in a difference in dynamics between the actual signal and the learning signal. That is, to prevent a possible difference in dynamics, the output signal for the BWS needs to be generated from the disturbance during the BWS. The method applied to the SD-STLO allows the disturbance to be estimated. However, conditions for the plant and the degradation of the learning signal in a high frequency region are disadvantageous. Thus, the input end disturbance needs to be converted into an output end disturbance. At this time, the output signal during the FWS is affected by the dynamics of the plant $P_n[z]$. Consequently, the learning signal cannot be perfectly matched with the output signal for the BWS.

Thus, in the PLS-STLPTC, the dynamics of the output signal during the FWS perfectly matches the dynamics of the output signal during the BWS. As a result, the above-described problems can be solved.

The PLS-STLPTC sequentially applies information obtained from the preceding scan line (preceding line) and including information for the FWS and information for the BWS, to the succeeding scan line (succeeding line). That is, for the PLS-STLPTC, provided that the surface topography in the preceding line is the same as that in the succeeding line, the dynamics of the output signal for the preceding scan line perfectly matches the dynamics of the output signal for the succeeding scan line. Thus, the PLS-STLPTC allows the output signal for the succeeding scan line to be completely reduced for every sample point ($T_y$). This enables the capability of the control input to be improved.

Figure 103:
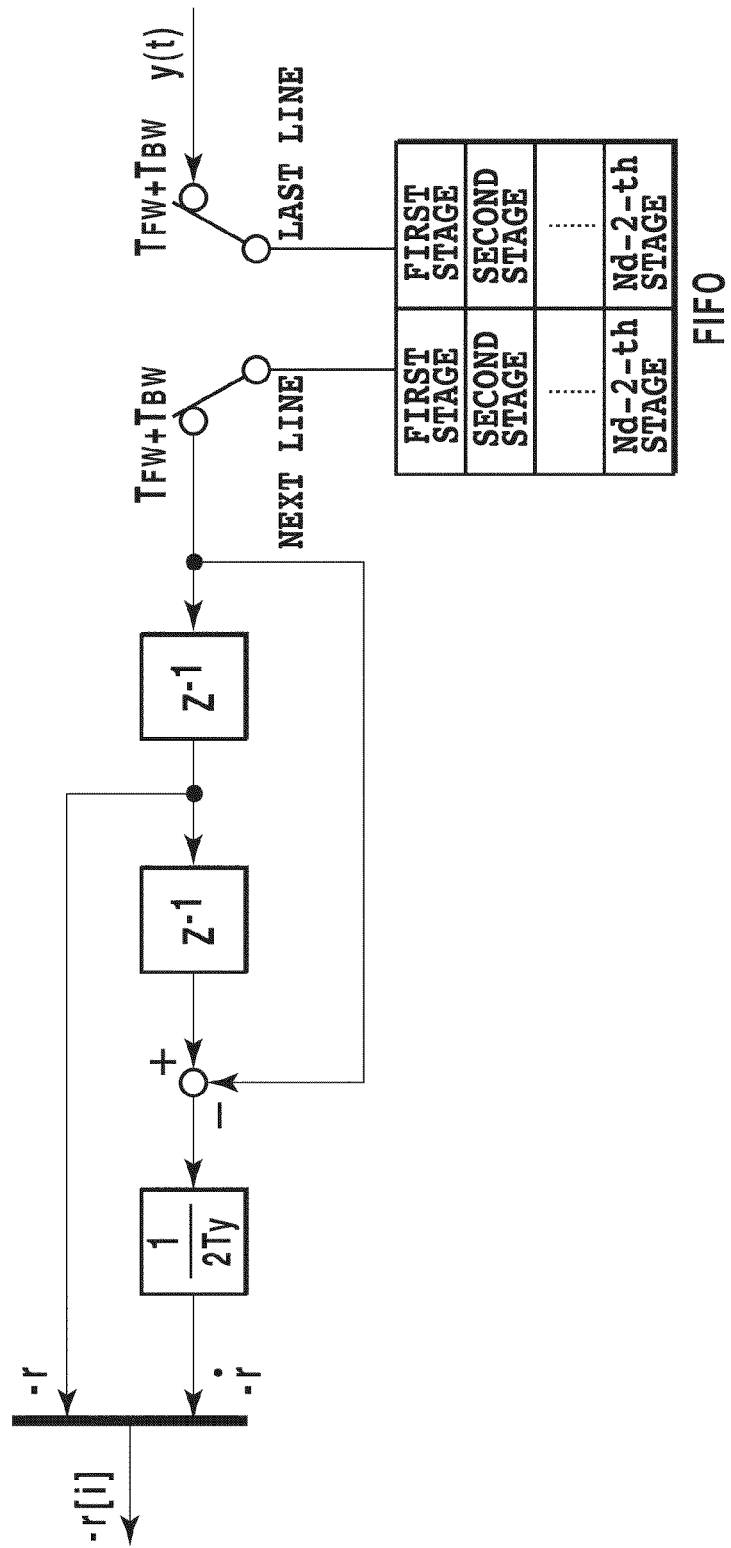
FIG. 103 is a diagram showing a signal generator.

A control mechanism for the PLS-STLPTC is similar to that shown in FIG. 12. However, the control algorithm in the present embodiment is not of the single direction type but of the pre-line scanning type. Furthermore, FIG. 103 shows the details of the signal generator.

The control algorithm performed by the signal generator in FIG. 103 will be described below. In FIG. 103, $T_{FW}$ denotes the scanning time during the FWS, and the scanning time during the BWS is defined as $T_{BW}$. Furthermore, the memory in this case is of an FIFO type. A switch 1 (SW1) is kept on for $T_{FW}+T_{BW}$ (=the number $N_d$ of stages in the memory×the sampling period $T_y$) seconds, and during this interval, the output signal is learned. Then, on the succeeding line, the learned output signal is output during the same interval as a set point for the PTC, enabling perfect tracking. However, also for the PLS-STLPTC, the speed command value:

$$\dot{r}[i]$$ [Expression 66]

is as shown in formula (12).

Figure 104:
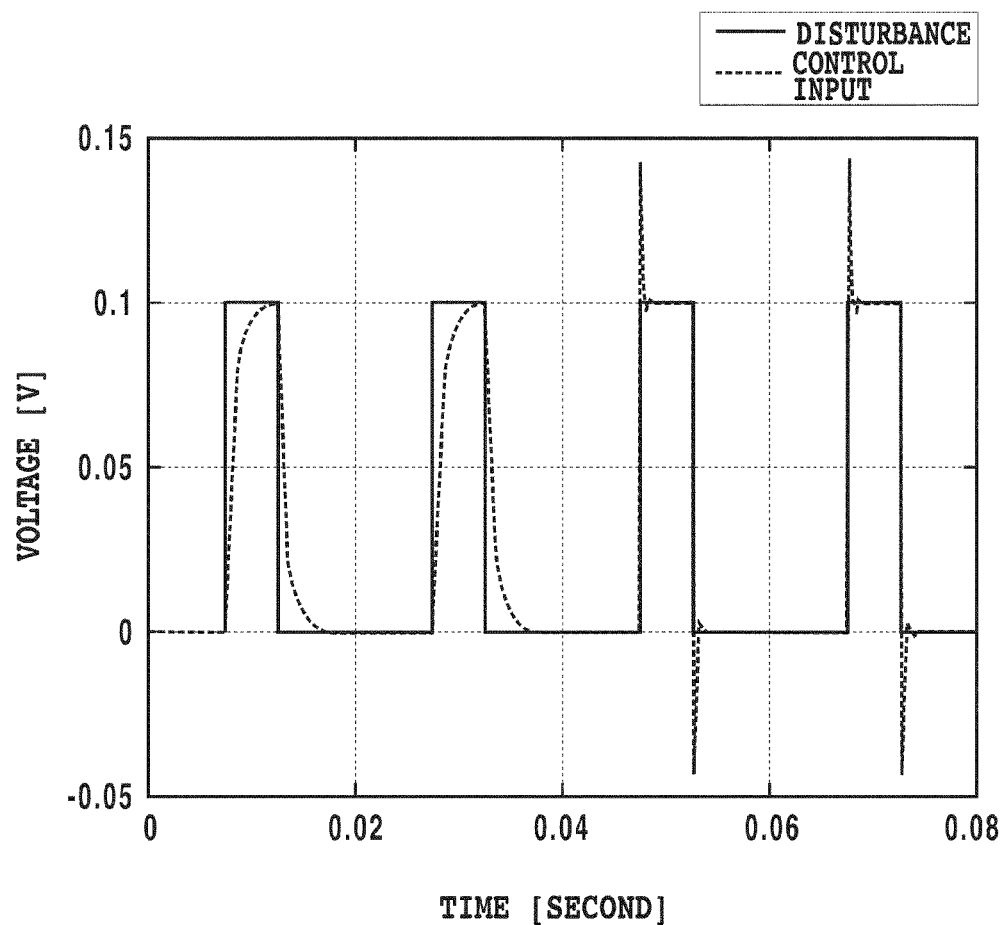
FIG. 104 is a diagram showing the results of simulation.
Figure 105:
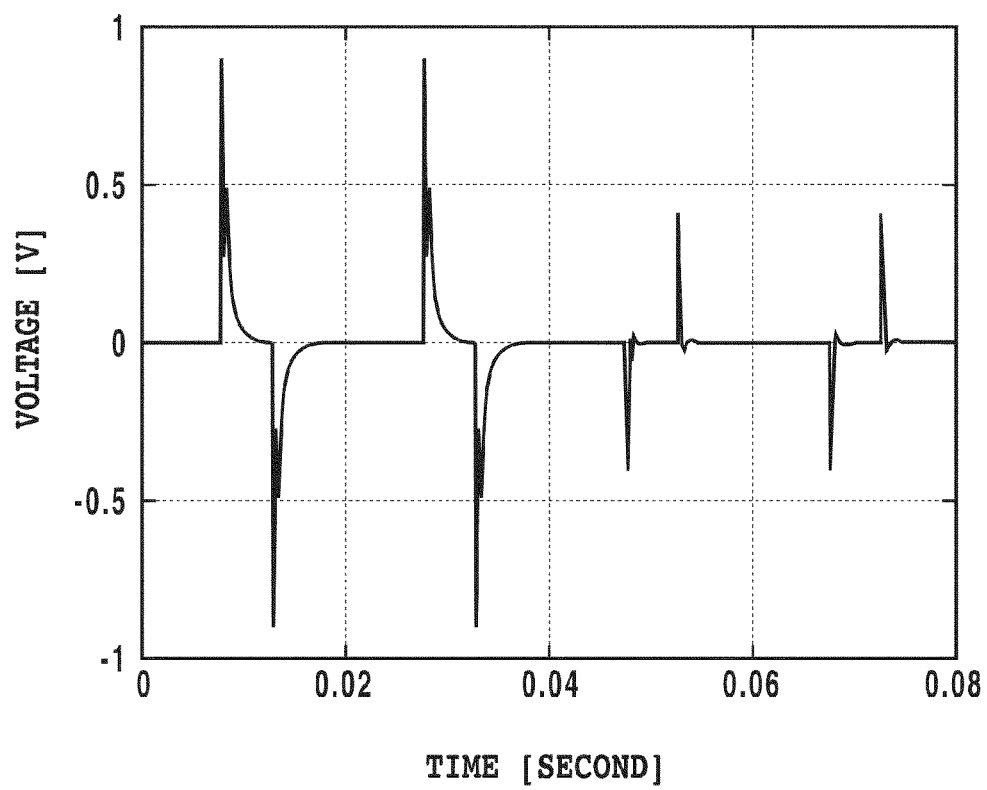
FIG. 105 is a diagram showing the results of simulation.
Figure 106:
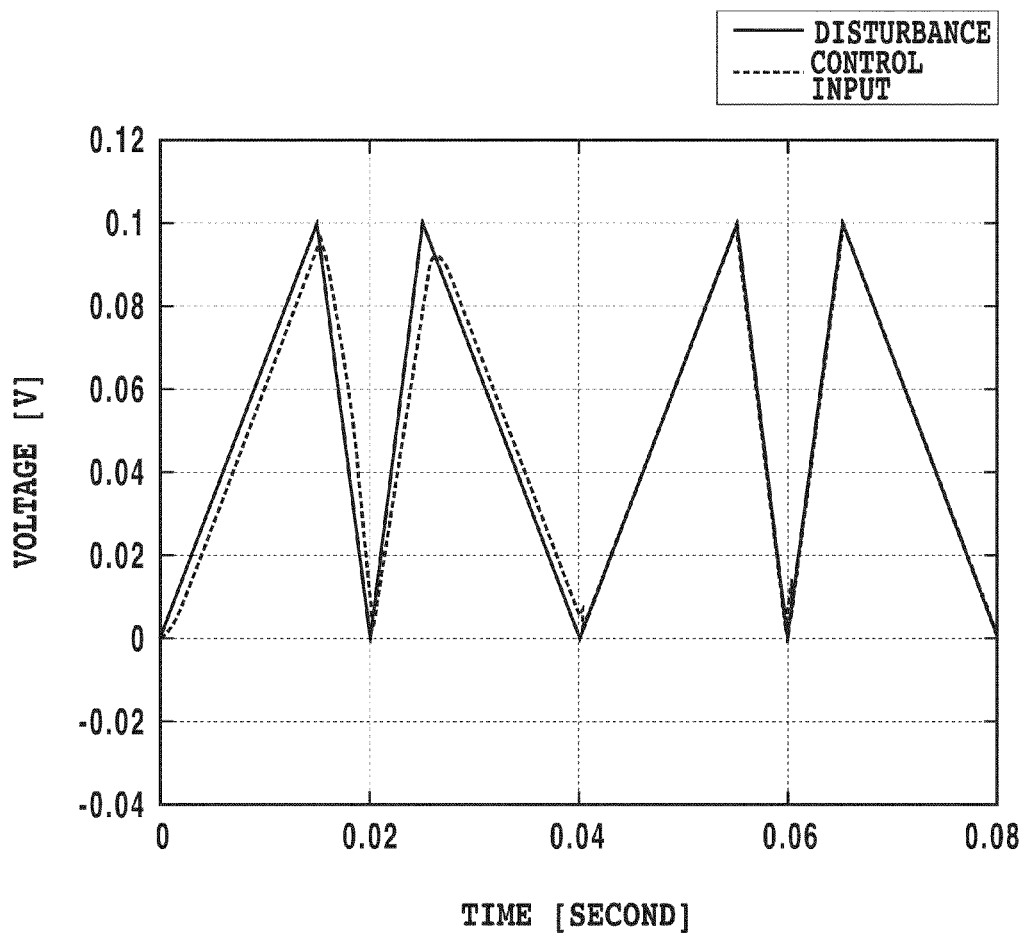
FIG. 106 is a diagram showing the results of simulation.
Figure 107:
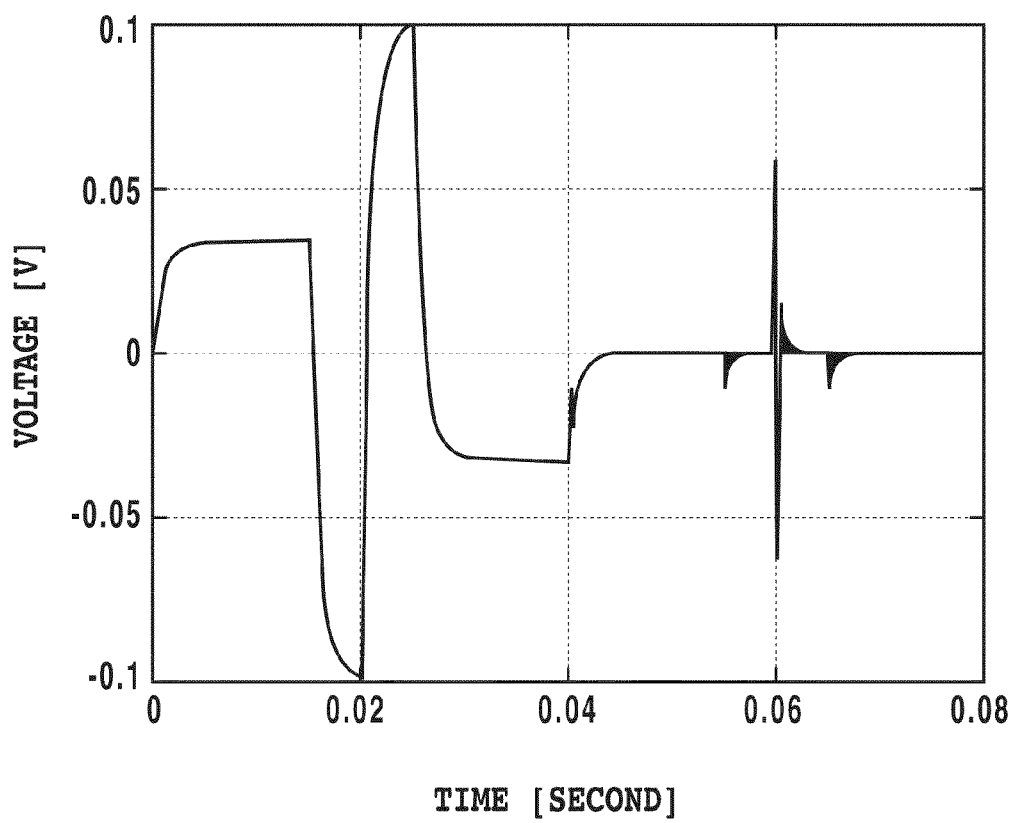
FIG. 107 is a diagram showing the results of simulation.

FIG. 104 to FIG. 107 show the results of simulation of the disturbance and the control input and output signals using control based on the above-described PLS-STLPTC. FIGS. 104 and 105 show the results of simulation of measurement of a rectangular-wave sample. FIGS. 106 and 107 show the results of simulation of measurement of a triangular-wave sample.

In the simulation in FIG. 104 to FIG. 107, the period before 0.02 [sec] is a learning period when the PLS-STLPTC is not performed. That is, during the period before 0.02 [sec], simulation is performed according to the conventional method.

In the simulation shown in FIG. 104 to FIG. 107, feedforward control based on the PLS-STLPTC is started at 0.02 [sec]. As shown in FIGS. 105 and 107, the feedforward control based on the PLS-STLPTC allows the output signal to be reduced for every sample point. Also during the subsequent scans, learning and control are simultaneously performed to perfectly reduce the disturbance.

Figure 108:
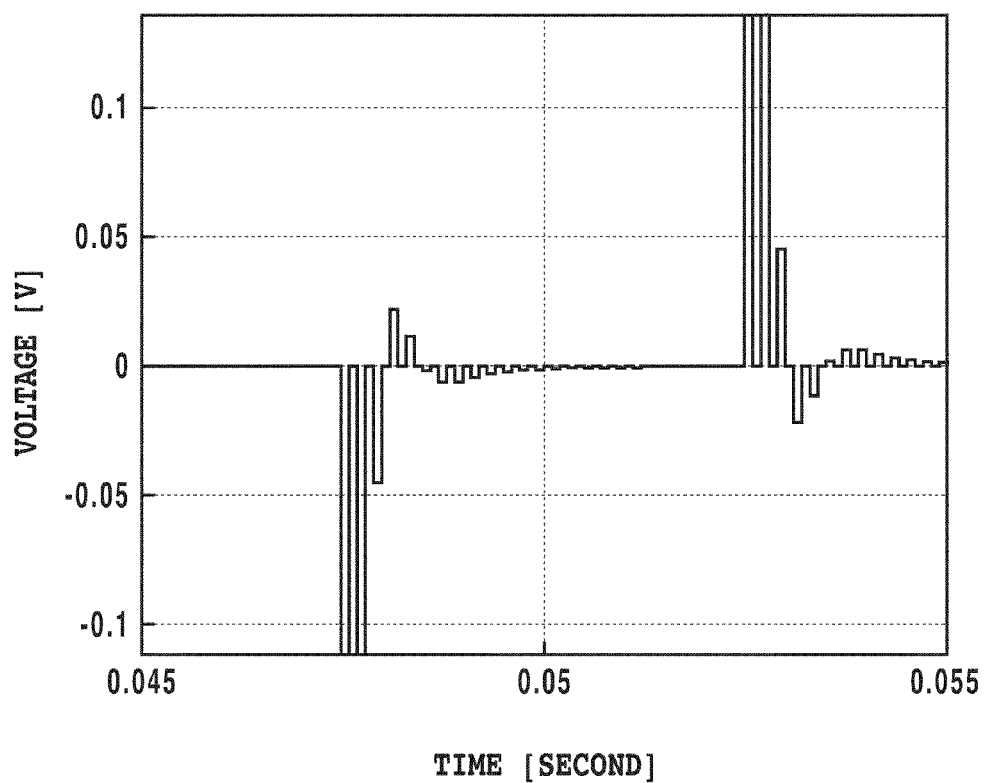
FIG. 108 is a diagram showing the results of simulation.
Figure 109:
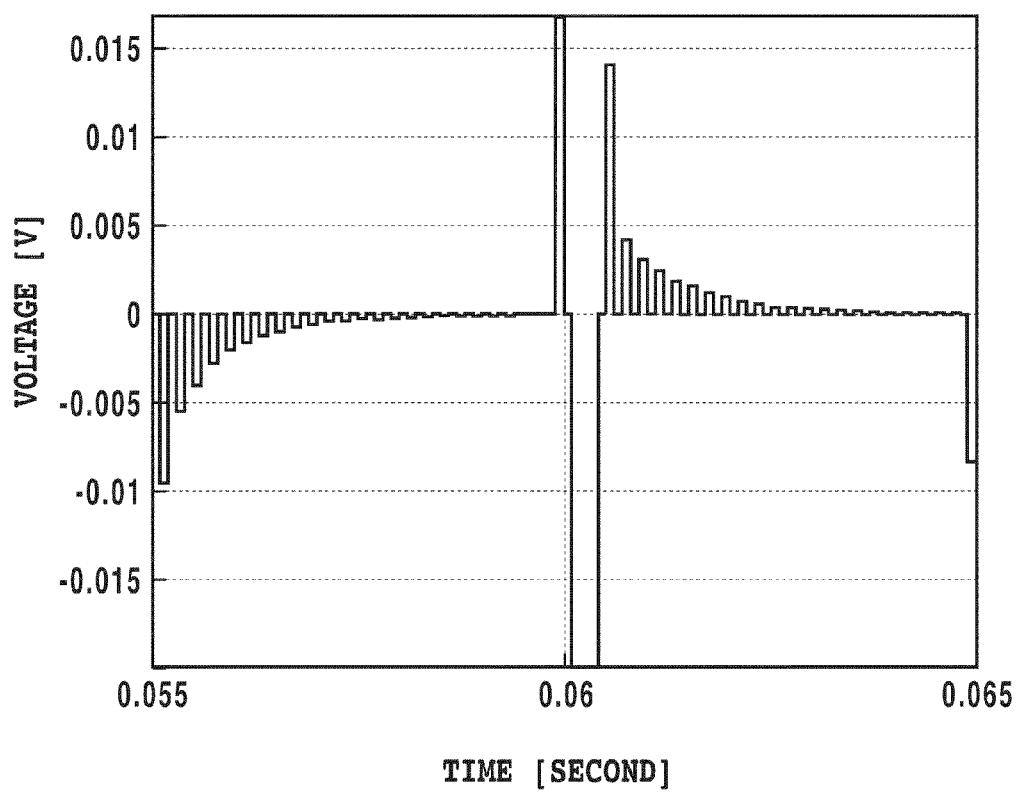
FIG. 109 is a diagram showing the results of simulation.

Furthermore, FIG. 108 is an enlarged view of FIG. 105. FIG. 109 is an enlarged view of FIG. 107. The results shown in FIGS. 108 and 109 indicate that the PLS-STLPTC enables perfect tracking provided that the preceding scan line has the same shape as that of the succeeding scan line regardless of the shape.

The invention claimed is:

1. An atomic force microscope apparatus imaging a surface topography of a sample in a contact mode, the apparatus comprising:
a cantilever having a probe interacting with the sample surface via an atomic force and being subjected to a deflection by the atomic force;
laser light provision means for allowing first laser light to enter the cantilever;
light detection means for detecting second laser light corresponding to the first laser light reflected by the cantilever;
a piezo element on which the sample is placed;
a controller inputting an input voltage to the piezo element to control the distance between the sample surface and the probe, detecting the deflection of the cantilever as an output voltage based on a relative change in light intensity in a vertical direction to which a photodiode is subjected owing to the second laser light, then during a forward scan, measuring and storing the surface topography, then during a backward scan of the same line as that for the forward scan, using the stored surface topography to generate a tracking error for the backward scan, and measuring the surface topography of the sample surface based on the tracking error; and
data storage means for recording the measured tracking error,
wherein the controller uses a means for perfect tracking control in which a sampling period and a control period for a target trajectory generated from the tracking error are different from each other and which uses multirate control, to reduce the tracking error to measure the surface topography of the sample surface.

2. An atomic force microscope apparatus imaging a surface topography of a sample in a contact mode, the apparatus comprising:
a cantilever having a probe interacting with the sample surface via an atomic force and being subjected to a deflection by the atomic force;
laser light provision means for allowing first laser light to enter the cantilever;
light detection means for detecting second laser light corresponding to the first laser light reflected by the cantilever;
a piezo element on which the sample is placed;
a controller inputting an input voltage to the piezo element to control the distance between the sample surface and the probe, detecting the deflection of the cantilever as an output voltage based on a relative change in light intensity in a vertical direction to which a photodiode is subjected owing to the second laser light, then during a forward scan, measuring and storing the surface topography, and during a backward scan of the same line as that for the forward scan, using the stored surface topography for control to estimate the surface topography of the sample surface; and
data storage means for recording the surface topography,
wherein the controller uses means for realizing an inverse system of a discretized plant derived from a state equation that discretizes a controlled object of the controller at a sampling period for a target trajectory generated from the tracking error, to estimate the surface topography of the sample surface.

3. The atomic force microscope apparatus according to claim 2, wherein to estimate the surface topography of the sample surface, the controller uses means for using a zeroth-order phase error inverse model including a polynomial having an unstable zero and a stable limit zero as roots and a polynomial having a stable zero as a root.

4. The atomic force microscope apparatus according to claim 1, further comprising a servo analyzer acquiring frequency characteristics of a transfer function from the input voltage to the piezo element to the output voltage,
wherein the transfer function is automatically identified by a standard second-order system based on a peak gain, a DC gain, and a peak frequency included in the frequency characteristics acquired by the servo analyzer.

* * * * *